United States Patent
Foret

(10) Patent No.: US 10,267,106 B2
(45) Date of Patent: Apr. 23, 2019

(54) SYSTEM, METHOD AND APPARATUS FOR TREATING MINING BYPRODUCTS

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 1387 days.

(21) Appl. No.: 14/215,742

(22) Filed: Mar. 17, 2014

(65) Prior Publication Data
US 2014/0238861 A1    Aug. 28, 2014

Related U.S. Application Data

(63) Continuation-in-part of application No. 14/176,032, filed on Feb. 7, 2014, now Pat. No. 9,516,736, which
(Continued)

(51) Int. Cl.
*E21B 21/06*    (2006.01)
*E21B 43/34*    (2006.01)
(Continued)

(52) U.S. Cl.
CPC ............ *E21B 21/063* (2013.01); *B23K 10/00* (2013.01); *B23K 10/006* (2013.01); *B23K 10/02* (2013.01);
(Continued)

(58) Field of Classification Search
None
See application file for complete search history.

(56) References Cited

U.S. PATENT DOCUMENTS

| 481,979 A | 9/1892 | Stanley |
| 501,732 A | 7/1893 | Roeske |
(Continued)

FOREIGN PATENT DOCUMENTS

| CN | 101905196 A | 12/2010 |
| CN | 202224255 U | 5/2012 |
(Continued)

OTHER PUBLICATIONS

International Search Report and Written Opinion for PCT/US2008/011926 dated Apr. 27, 2009.
(Continued)

*Primary Examiner* — Kishor Mayekar
(74) *Attorney, Agent, or Firm* — Daniel J. Chalker; Edwin S. Flores; Chalker Flores, LLP

(57) ABSTRACT

The present invention provides various systems, methods and apparatuses for recovering mining fluids, providing enhanced oil recovery and treating produced water. Plasma arc torches and electrolysis cells are used in various combinations. The plasma arc torch includes a cylindrical vessel, a first tangential inlet/outlet connected to or proximate to a first end, a second tangential inlet/outlet connected to or proximate to a second end, an electrode housing connected to the first end such that a first electrode is (a) aligned with a longitudinal axis of the cylindrical vessel, and (b) extends into the cylindrical vessel, and a hollow electrode nozzle is connected to the second end such that the hollow electrode nozzle is aligned with the longitudinal axis, the hollow electrode nozzle is partially disposed within the cylindrical vessel and outside the cylindrical vessel.

17 Claims, 56 Drawing Sheets

Related U.S. Application Data is a continuation-in-part of application No. 13/633,128, filed on Oct. 1, 2012, now Pat. No. 8,810,122, which is a continuation-in-part of application No. 12/371,575, filed on Feb. 13, 2009, now Pat. No. 8,278,810, which is a continuation-in-part of application No. 12/288,170, filed on Oct. 16, 2008, now Pat. No. 9,051,820, and a continuation-in-part of application No. 12/370,591, filed on Feb. 12, 2009, now Pat. No. 8,074,439.

(60) Provisional application No. 61/787,293, filed on Mar. 15, 2013, provisional application No. 61/762,308, filed on Feb. 8, 2013, provisional application No. 60/980,443, filed on Oct. 16, 2007, provisional application No. 61/027,879, filed on Feb. 12, 2008, provisional application No. 61/028,386, filed on Feb. 13, 2008.

(51) Int. Cl.
*E21B 43/40* (2006.01)
*B23K 10/00* (2006.01)
*B23K 10/02* (2006.01)
*H05H 1/48* (2006.01)
*H05H 1/24* (2006.01)
*H05H 1/34* (2006.01)

(52) U.S. Cl.
CPC .............. *E21B 43/34* (2013.01); *E21B 43/40* (2013.01); *H05H 1/2406* (2013.01); *H05H 1/48* (2013.01); *H05H 2001/2412* (2013.01); *H05H 2001/2431* (2013.01); *H05H 2001/3431* (2013.01)

(56) References Cited

U.S. PATENT DOCUMENTS

| | | |
|---|---|---|
| 2,784,294 A | 3/1957 | Gravert |
| 2,898,441 A | 8/1959 | Reed et al. |
| 2,923,809 A | 2/1960 | Clews et al. |
| 3,004,189 A | 10/1961 | Giannini |
| 3,082,314 A | 3/1963 | Arata et al. |
| 3,131,288 A | 4/1964 | Browning et al. |
| 3,242,305 A | 3/1966 | Kane et al. |
| 3,522,846 A | 8/1970 | New |
| 3,534,388 A | 10/1970 | Ito et al. |
| 3,567,898 A | 3/1971 | Fein |
| 3,619,549 A | 11/1971 | Hogan et al. |
| 3,641,308 A | 2/1972 | Couch, Jr. et al. |
| 3,787,247 A | 1/1974 | Couch, Jr. |
| 3,798,784 A | 3/1974 | Kovats et al. |
| 3,830,428 A | 8/1974 | Dyos |
| 3,833,787 A | 9/1974 | Couch, Jr. |
| 4,067,390 A | 1/1978 | Camacho et al. |
| 4,169,503 A | 10/1979 | Scott |
| 4,203,022 A | 5/1980 | Couch, Jr. et al. |
| 4,265,747 A | 5/1981 | Copa et al. |
| 4,311,897 A | 1/1982 | Yerushalmy |
| 4,344,839 A | 8/1982 | Pachkowski et al. |
| 4,463,245 A | 7/1984 | McNeil |
| 4,531,043 A | 7/1985 | Zverina et al. |
| 4,567,346 A | 1/1986 | Marhic |
| 4,624,765 A | 11/1986 | Cerkanowicz et al. |
| 4,685,963 A | 8/1987 | Saville et al. |
| 4,776,638 A | 10/1988 | Hahn |
| 4,791,268 A | 12/1988 | Sanders et al. |
| 4,886,118 A | 12/1989 | Van Meurs et al. |
| 5,019,268 A | 5/1991 | Rogalla |
| 5,048,404 A | 9/1991 | Bushnell et al. |
| 5,082,054 A | 1/1992 | Kiamanesh |
| 5,132,512 A | 7/1992 | Sanders et al. |
| 5,166,950 A | 11/1992 | Jouvaud et al. |
| 5,326,530 A | 7/1994 | Bridges |
| 5,348,629 A | 9/1994 | Khudenko |
| 5,368,724 A | 11/1994 | Ayres et al. |
| 5,534,232 A | 7/1996 | Denes et al. |
| 5,609,736 A | 3/1997 | Yamamoto |
| 5,609,777 A | 3/1997 | Apunevich et al. |
| 5,628,887 A | 5/1997 | Patterson et al. |
| 5,655,210 A | 8/1997 | Gregoire et al. |
| 5,660,743 A | 8/1997 | Nemchinsky |
| 5,738,170 A | 4/1998 | Laverhne |
| 5,746,984 A | 5/1998 | Hoard |
| 5,760,363 A | 6/1998 | Hackett et al. |
| 5,766,447 A | 6/1998 | Creijghton |
| 5,876,663 A | 3/1999 | Laroussi |
| 5,879,555 A | 3/1999 | Khudenko |
| 5,893,979 A | 4/1999 | Held |
| 5,908,539 A | 6/1999 | Young et al. |
| 5,979,551 A | 11/1999 | Uban et al. |
| 6,007,681 A | 12/1999 | Kawamura et al. |
| 6,117,401 A | 9/2000 | Juvan |
| 6,228,266 B1 | 5/2001 | Shim |
| 6,514,469 B1 | 2/2003 | Kado et al. |
| 6,749,759 B2 | 6/2004 | Denes et al. |
| 6,929,067 B2 | 8/2005 | Vinegar et al. |
| 6,942,786 B1 | 9/2005 | Fosseng |
| 6,987,792 B2 | 1/2006 | Do et al. |
| 7,081,171 B1 | 7/2006 | Sabol et al. |
| 7,086,468 B2 | 8/2006 | De Rouffignac et al. |
| 7,096,953 B2 | 8/2006 | De Rouffignac et al. |
| 7,121,342 B2 | 10/2006 | Vinegar et al. |
| 7,128,816 B2 | 10/2006 | Denes et al. |
| 7,422,695 B2 | 9/2008 | Foret |
| 7,536,975 B2 | 5/2009 | Denes et al. |
| 7,857,972 B2 | 12/2010 | Foret |
| 7,893,408 B2 | 2/2011 | Hieftje et al. |
| 8,074,439 B2 | 12/2011 | Foret |
| 8,278,810 B2 | 10/2012 | Foret |
| 8,324,523 B2 | 12/2012 | Foret |
| 8,568,663 B2 | 10/2013 | Foret |
| 8,810,122 B2 | 8/2014 | Foret |
| 8,833,054 B2 | 9/2014 | Foret |
| 8,904,749 B2 | 12/2014 | Foret |
| 9,051,820 B2 | 6/2015 | Foret |
| 9,105,433 B2 | 8/2015 | Foret |
| 9,111,712 B2 | 8/2015 | Foret |
| 9,163,584 B2 | 10/2015 | Foret |
| 9,185,787 B2 | 11/2015 | Foret |
| 9,230,777 B2 | 1/2016 | Foret |
| 9,241,396 B2 | 1/2016 | Foret |
| 9,445,488 B2 | 9/2016 | Foret |
| 9,499,443 B2 | 11/2016 | Foret |
| 9,516,736 B2 | 12/2016 | Foret |
| 9,560,731 B2 | 1/2017 | Foret |
| 9,644,465 B2 | 5/2017 | Foret |
| 9,699,879 B2 | 7/2017 | Foret |
| 9,761,413 B2 | 9/2017 | Foret |
| 9,781,817 B2 | 10/2017 | Foret |
| 9,790,108 B2 | 10/2017 | Foret |
| 9,801,266 B2 | 10/2017 | Foret |
| 2002/0148562 A1 | 10/2002 | Aoyagi et al. |
| 2003/0024806 A1 | 2/2003 | Foret |
| 2003/0101936 A1 | 6/2003 | Lee |
| 2003/0150325 A1 | 8/2003 | Hyppanen |
| 2003/0179536 A1 | 9/2003 | Stevenson et al. |
| 2003/0213604 A1 | 11/2003 | Stevenson et al. |
| 2004/0020188 A1 | 2/2004 | Kramer et al. |
| 2005/0087435 A1 | 4/2005 | Kong et al. |
| 2005/0151455 A1 | 7/2005 | Sato et al. |
| 2005/0155373 A1 | 7/2005 | Hirooka et al. |
| 2006/0104849 A1 | 5/2006 | Tada et al. |
| 2006/0124445 A1 | 6/2006 | Labrecque |
| 2006/0151445 A1 | 7/2006 | Schneider |
| 2006/0196424 A1 | 9/2006 | Swallow et al. |
| 2007/0253874 A1 | 1/2007 | Foret |
| 2007/0104610 A1 | 5/2007 | Houston et al. |
| 2007/0196249 A1 | 8/2007 | Fridman et al. |
| 2007/0240975 A1 | 10/2007 | Foret |
| 2008/0058228 A1 | 3/2008 | Wilson |
| 2008/0020915 A1 | 8/2008 | Hieftje et al. |

(56) References Cited

U.S. PATENT DOCUMENTS

| | | | |
|---|---|---|---|
| 2008/0202915 | A1 | 8/2008 | Hieftje et al. |
| 2009/0235637 | A1 | 2/2009 | Foret |
| 2009/0118145 | A1 | 5/2009 | Wilson et al. |
| 2009/0200032 | A1 | 8/2009 | Foret |
| 2009/0277774 | A1 | 11/2009 | Foret |
| 2010/0212498 | A1 | 8/2010 | Salazar |
| 2010/0258429 | A1 | 10/2010 | Ugolin |
| 2010/0296977 | A1 | 11/2010 | Hancock |
| 2011/0005999 | A1 | 1/2011 | Randal |
| 2011/0022043 | A1 | 1/2011 | Wandke et al. |
| 2011/0031224 | A1 | 2/2011 | Severance, Jr. et al. |
| 2011/0223091 | A1 | 9/2011 | Miller et al. |
| 2011/0225948 | A1 | 9/2011 | Valeev et al. |
| 2011/0303532 | A1 | 12/2011 | Foret |
| 2012/0097648 | A1 | 4/2012 | Foret |
| 2012/0205293 | A1 | 8/2012 | Thanoo et al. |
| 2012/0227968 | A1 | 11/2012 | Eldred et al. |
| 2013/0020926 | A1 | 1/2013 | Foret |
| 2014/0260179 | A1 | 9/2014 | Foret |
| 2015/0103860 | A1 | 4/2015 | Foret |
| 2015/0323174 | A1 | 5/2015 | Foret |
| 2015/0323175 | A1 | 5/2015 | Foret |
| 2016/0280608 | A1 | 9/2016 | Foret |
| 2016/0307733 | A1 | 10/2016 | Foret |
| 2017/0037307 | A1 | 2/2017 | Foret |
| 2017/0111985 | A1 | 4/2017 | Foret |
| 2017/0211360 | A1 | 7/2017 | Foret |

FOREIGN PATENT DOCUMENTS

| | | | |
|---|---|---|---|
| EP | 1707096 | A2 | 10/2006 |
| EP | 1915940 | A1 | 4/2008 |
| GB | 1224638 | A | 3/1971 |
| JP | 2006-501980 | A | 1/2006 |
| JP | 2008238053 | A | 10/2008 |
| KR | 101999009569 | A | 2/1999 |
| KR | 10-2004-0005107 | A | 1/2004 |
| WO | 9904607 | A1 | 1/1999 |
| WO | 2007117634 | A2 | 10/2007 |

OTHER PUBLICATIONS

International Search Report and Written Opinion for PCT/US2009/000937 dated Sep. 17, 2009.
Extended European Search Report for EP 08840081.7 dated May 28, 2014.
Extended European Search Report for EP 09710927.6 dated Jan. 21, 2014.
Extended European Search Report for EP 14764029.6 dated Dec. 14, 2015.
Extended European Search Report [EP 13862561.1] dated Jul. 7, 2016.
PCT/US2014/2014/024991 [KIPO] International Search Report dated Aug. 6, 2014.
PCT/US2014/030090 [KIPO] International Search Report dated Sep. 25, 2014.
Belani, A., "It's Time for an Industry Initiative on Heavy Oil," JPT Online accessed on Oct. 16, 2007 at http://www.spe.org/spe-app/spe/jpt/2006/06/mangement_heavy_oil.htm.
"Brandt, A. R., ""Converting Green River oil shale to liquid fuels with Alberta Taciuk Processor: energy inputs andgreenhouse gas emissions,"" Jun. 1, 2007".
Brandt, A. R., "Converting Green River oil shale to liquid fuels with the Shell in-situ conversion process: energy inputs and greenhouse gas emissions," Jun. 30, 2007.
Kavan, L., "Electrochemical Carbon," Chem Rev (1997), 97:3061-3082.
Understanding in-situ combustion, www.HeavyOilinfo.com, accessed Oct. 16, 2007.
Unleashing the potential: Heavy Oil, Supplement to E&P Annual Reference Guide, www.eandp.info.com, Jun. 2007.
International Search Report [KIPO] PCT/US201/062941 dated Jan. 27, 2014.
International Search Report and Written Opinion for PCT/US2009/033979 dated Sep. 15, 2009.
Metalliferous Mining—Processing Cyclones Resource Book—Aug. 2010, provided at https://rsteyn.files.wordpress.com/2010/07/cyclones-basics.pdf.

FILTRATE:

TAILINGS POND WATER RESULTS

TO FIG. 10 (CONTINUED)

| | SAMPLE | DATE | pH | SG | Cr | %N | ppm F | %Fe2O3 | %SO4 | ppm NH3 | %P2O5 | %Si | %MgO | %Al2O3 |
|---|---|---|---|---|---|---|---|---|---|---|---|---|---|---|
| A | TAILINGS POND WATER | 30-OCT | 1.4 | 1.0468 | 4.0 | 0.14 | 7,921 | 0.01 | 0.40 | 1,310 | 2.17 | 0.06 | 0.04 | 0.01 |
| 1 | HI TEMPER | 6-NOV | 2.3 | 1.0300 | 0.0 | 0.01 | 103 | 0.00 | 0.01 | 497 | 0.00 | 0.01 | 0.00 | 0.00 |
| 2 | HI TEMPER ARC WHIRL ARC WHIRL, PLASMA ON | 6-NOV | 1.7 | 1.0300 | 18.3 | 0.01 | 3,480 | 0.02 | 0.24 | 708 | 0.69 | 0.03 | 0.02 | 0.01 |
| 3 | HI TEMPER AIR ARC WHIRL | 6-NOV | 1.5 | 1.0400 | 71.4 | 0.18 | 8,570 | 0.06 | 0.52 | 1,630 | 2.30 | 0.04 | 0.05 | 0.01 |
| 4 | BOTTOMS OFF REACTOR | 6-NOV | 1.2 | 1.1600 | 667.3 | 0.15 | 14,400 | 0.76 | 1.39 | 4,340 | 8.72 | 0.03 | 0.16 | 0.02 |
| 5 | BOMB GAS, ARC ON, PLASMA OFF | 6-NOV | | | | | | | | | | | | |

| CYCLES OF CONCENTRATION (COC SET 1) | | | | | 167 | 1 | 2 | 51 | 3 | 3 | 4 | 1 | 4 | 2 |
| | | | | | 55 | 2 | 0 | 19 | 2 | 2 | 1 | 0 | 3 | 0 |

INSUFFICIENT SAMPLE RECOVERED FOR ANALYSIS

SOLIDS (RETAINED ON WHATMANN #40 FILTER PAPER):

| | SAMPLE | DATE | gm, DRY | %P2O5 | %SO4 | %MgO | %Al2O3 | %Fe2O3 | %CaO | %Na | %K |
|---|---|---|---|---|---|---|---|---|---|---|---|
| A | TAILINGS | 30-OCT | | 3.30 | 3.35 | 0.06 | 0.45 | 0.09 | 3.56 | 0.44 | 0.05 |
| 1 | HI TEMPER | 6-NOV | 2.7 | 0.0 | 0.2 | 0.02 | 0.02 | 1.09 | 0.2 | 0.22 | 0.02 |
| 2 | HI TEMPER ARC WHIRL ARC WHIRL, PLASMA ON | 6-NOV | 2.7 | 1.6 | 0.5 | 0.04 | 0.02 | 0.30 | 0.4 | 0.31 | 0.03 |
| 3 | HI TEMPER AIR ARC WHIRL | 6-NOV | 4.0 | 2.5 | 0.7 | 0.04 | 0.10 | 0.83 | 1.0 | 0.22 | 0.04 |
| 4 | BOTTOMS OFF REACTOR | 6-NOV | 29.1 | 1.8 | 13.6 | 0.03 | 0.25 | 0.35 | 5.7 | 13.67 | 2.76 |
| 5 | BOMB GAS, ARC ON, PLASMA OFF | 6-NOV | | | | | | | | | |

INSUFFICIENT SAMPLE RECOVERED FOR ANALYSIS

FIG. 10

TAILINGS POND WATER RESULTS (CONTINUED)

| %CaO | %Na | %K | As | Cd | Co | Cu | Mo | Ni | Pb | Se | Mn | U | V | Zn | Ti | APPEARANCE: |
|---|---|---|---|---|---|---|---|---|---|---|---|---|---|---|---|---|
| 0.25 | 0.25 | 0.03 | 7.0 | 0.7 | 0.0 | 3.5 | 1.0 | 3.0 | 0.0 | 3.0 | 12.0 | 14.0 | 7.4 | 20.2 | 1.7 | COLORLESS, SLIGHTLY CLOUDY SETTLABLE FINES |
| 0.05 | 0.05 | 0.01 | 2.3 | 0.0 | 0.0 | 1.5 | 0.0 | 0.0 | 0.0 | 3.4 | 0.0 | 0.0 | 0.0 | 1.6 | 0.0 | CLEAR; YELLOWISH OR BROWNISH |
| 0.17 | 0.14 | 0.02 | 5.5 | 0.0 | 0.0 | 7.9 | 0.2 | 14.0 | 0.0 | 2.7 | 4.2 | 2.2 | 1.3 | 13.4 | 0.0 | CLEAR; YELLOWISH OR BROWNISH |
| 0.35 | 0.26 | 0.03 | 7.3 | 0.3 | 0.0 | 15.7 | 0.6 | 42.8 | 0.0 | 2.0 | 18.6 | 12.0 | 5.4 | 49.6 | 13.7 | VERY LIGHT GREEN |
| 0.86 | 0.24 | 0.04 | 12.4 | 4.1 | 4.0 | 15.3 | 7.0 | 356.7 | 0.0 | 1.3 | 112.7 | 41.1 | 26.4 | 354.4 | 7.7 | DARK GREEN, WITH SEDIMENT |
| 3 | 1 | 1 | 2 | 6 | 400 | 4 | 7 | 120 | 0 | 0 | 9 | 3 | 4 | 18 | 5 | |
| 2 | 1 | 1 | 1 | 3 | 30 | 2 | 3 | 84 | 0 | 0 | 7 | 1 | 2 | 24 | 0 | |

| %Si | ppmN |
|---|---|
| 0.08 | 14 |
| 0.02 | 0.0 |
| 0.03 | 0.0 |
| 0.04 | 0.0 |
| 0.85 | 0.0 |

FROM FIG. 10

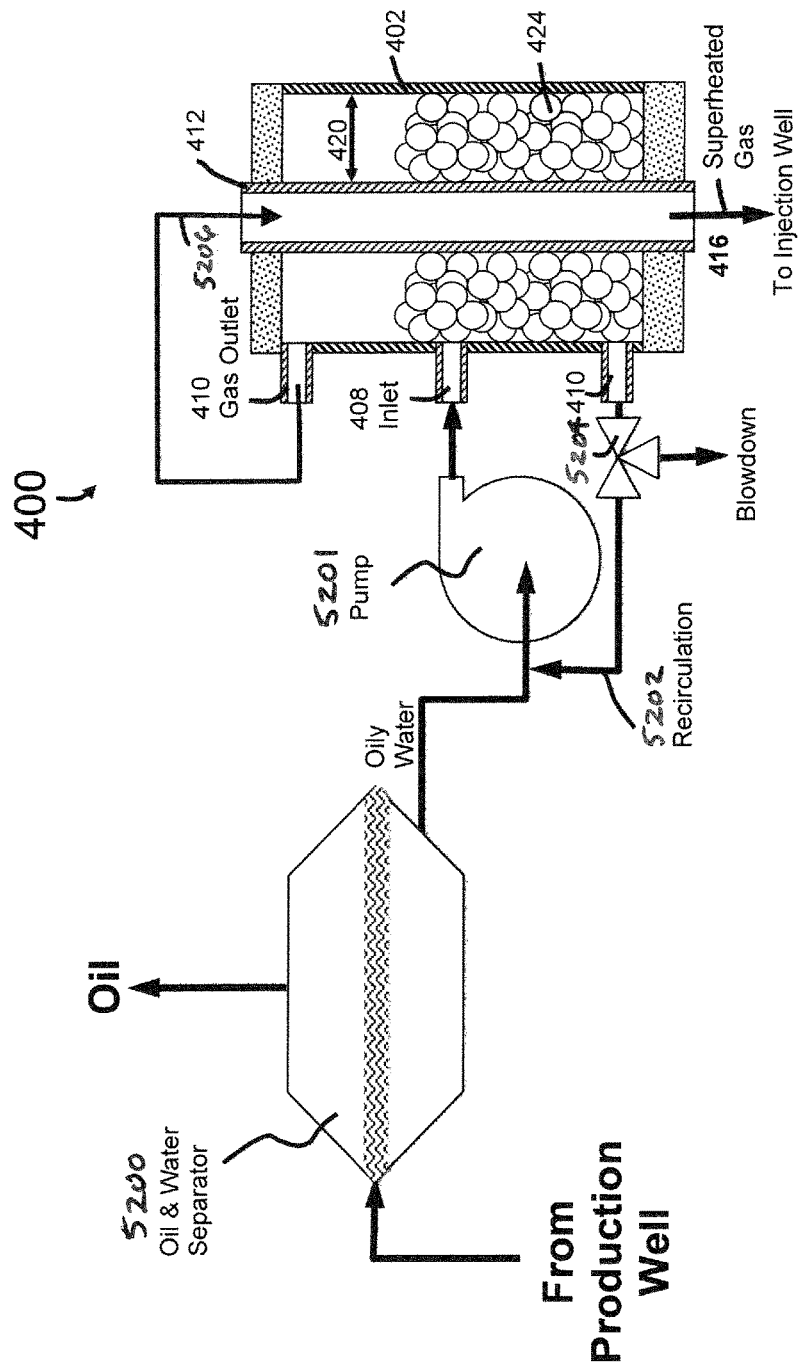
FIGURE 52 - SOGD CELL FOR EOR

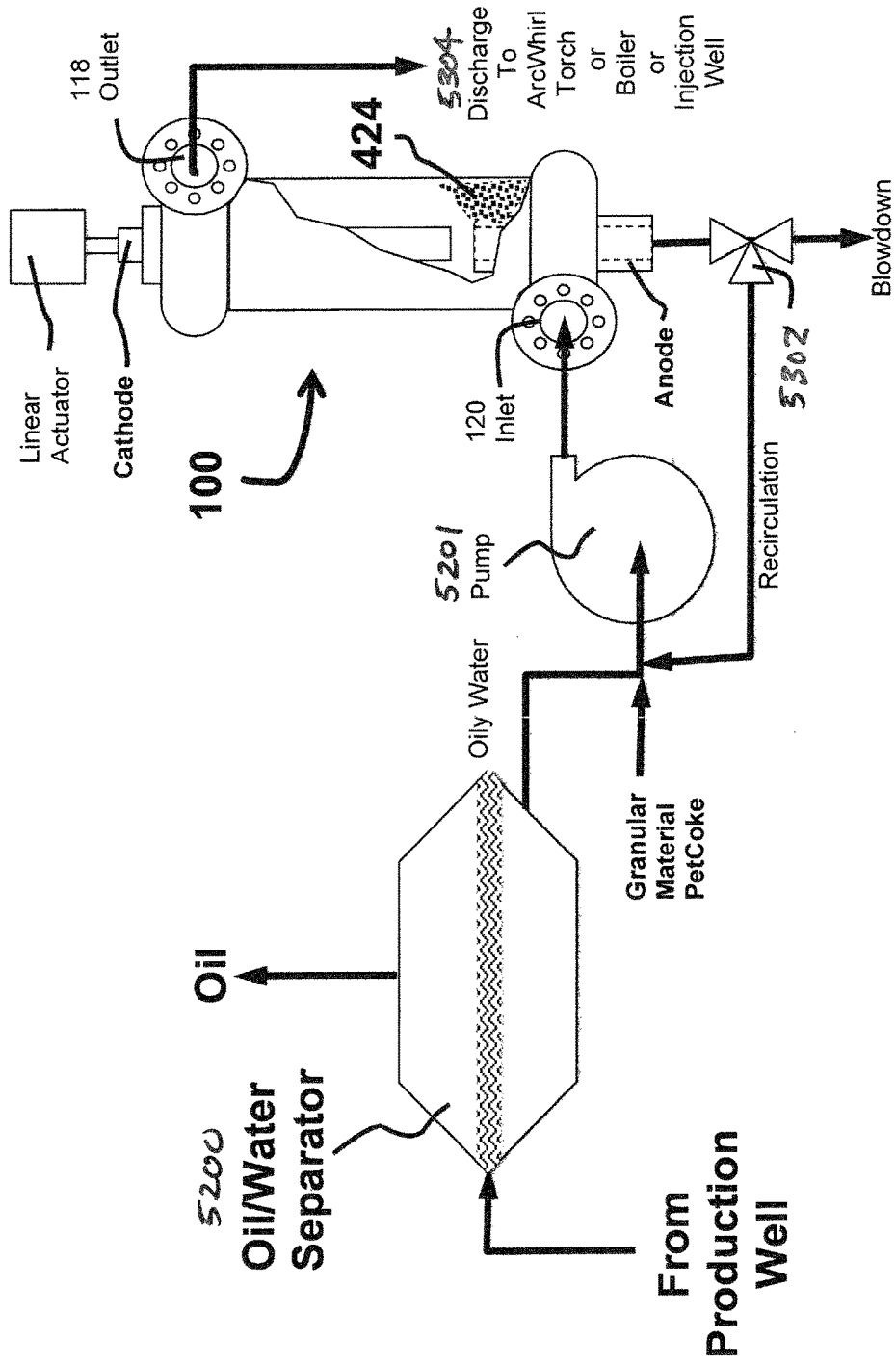
FIGURE 53 – ArcWhirl® GD CELL for EOR

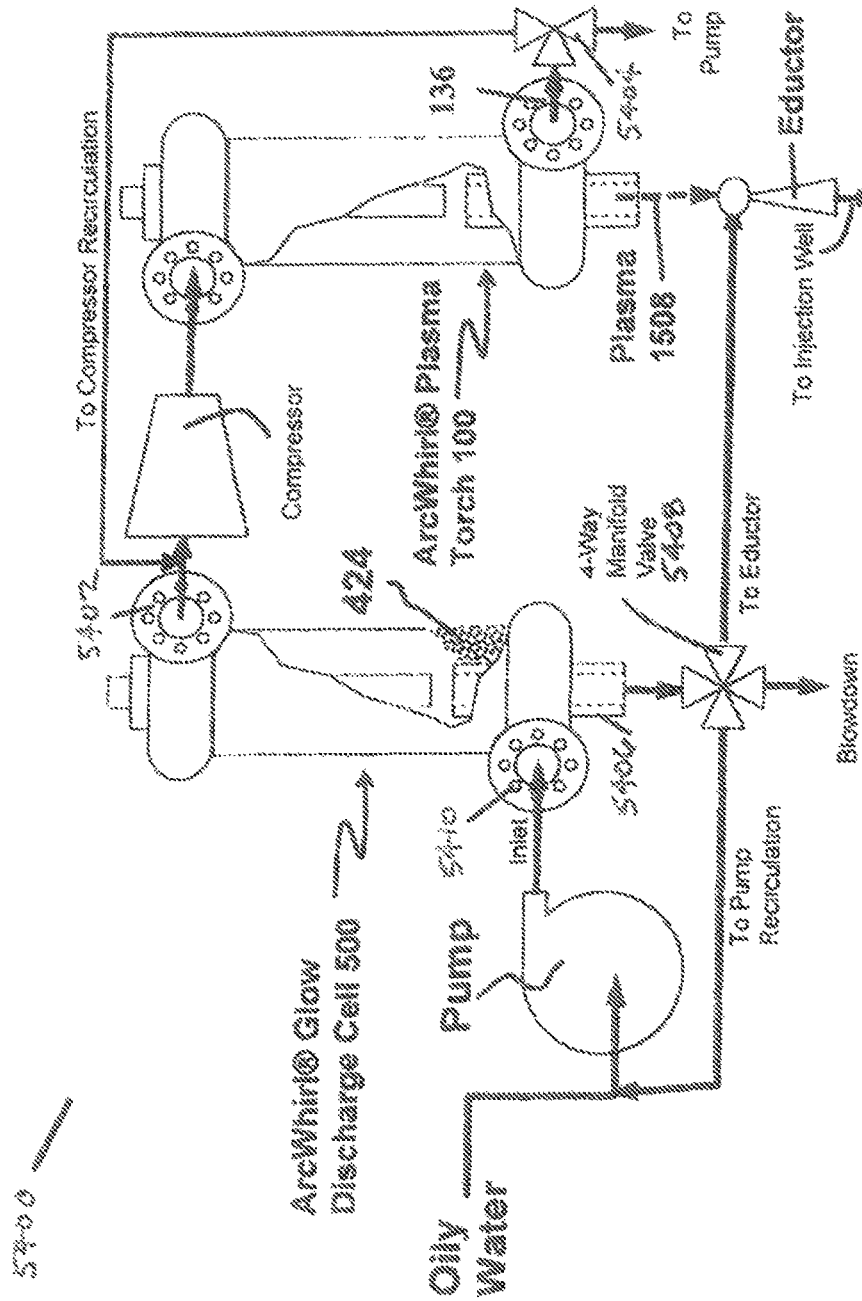
FIGURE 54 – Dual ArcWhirl® for EOR

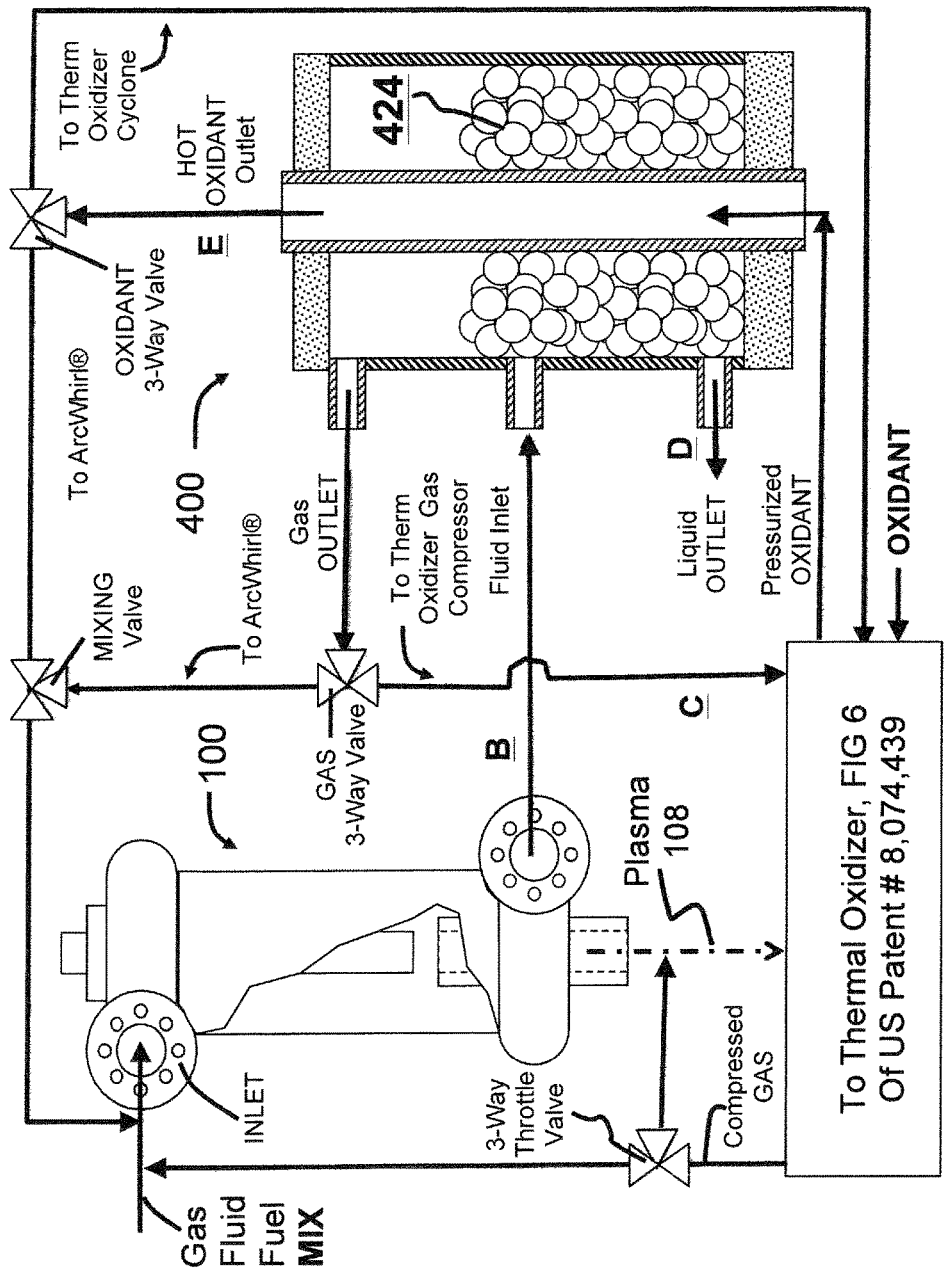
Figure 55 – ArcWhirl® + GDC for O&G Water Treatment

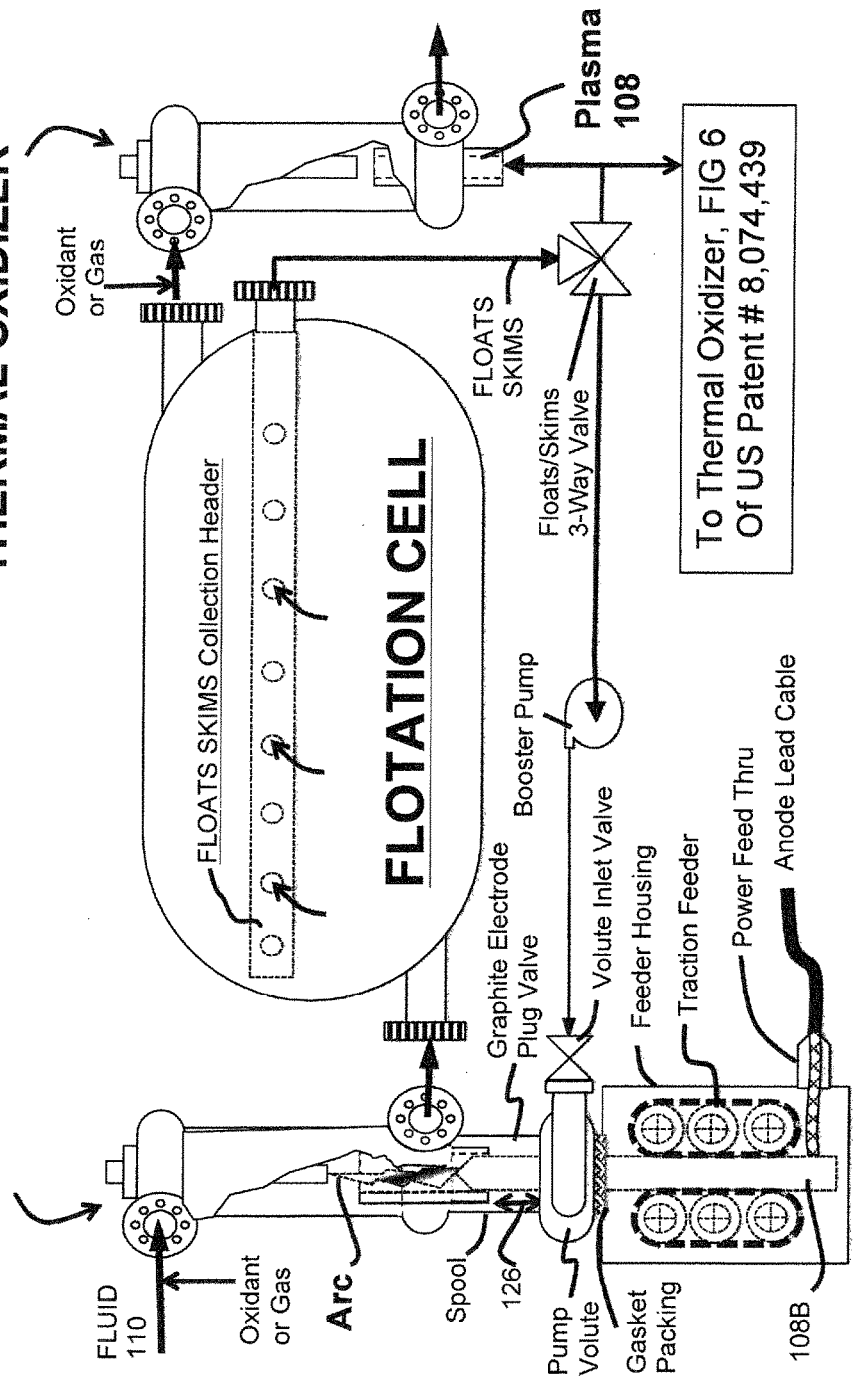
FIGURE 56 – Dual ArcWhirls® Flotation

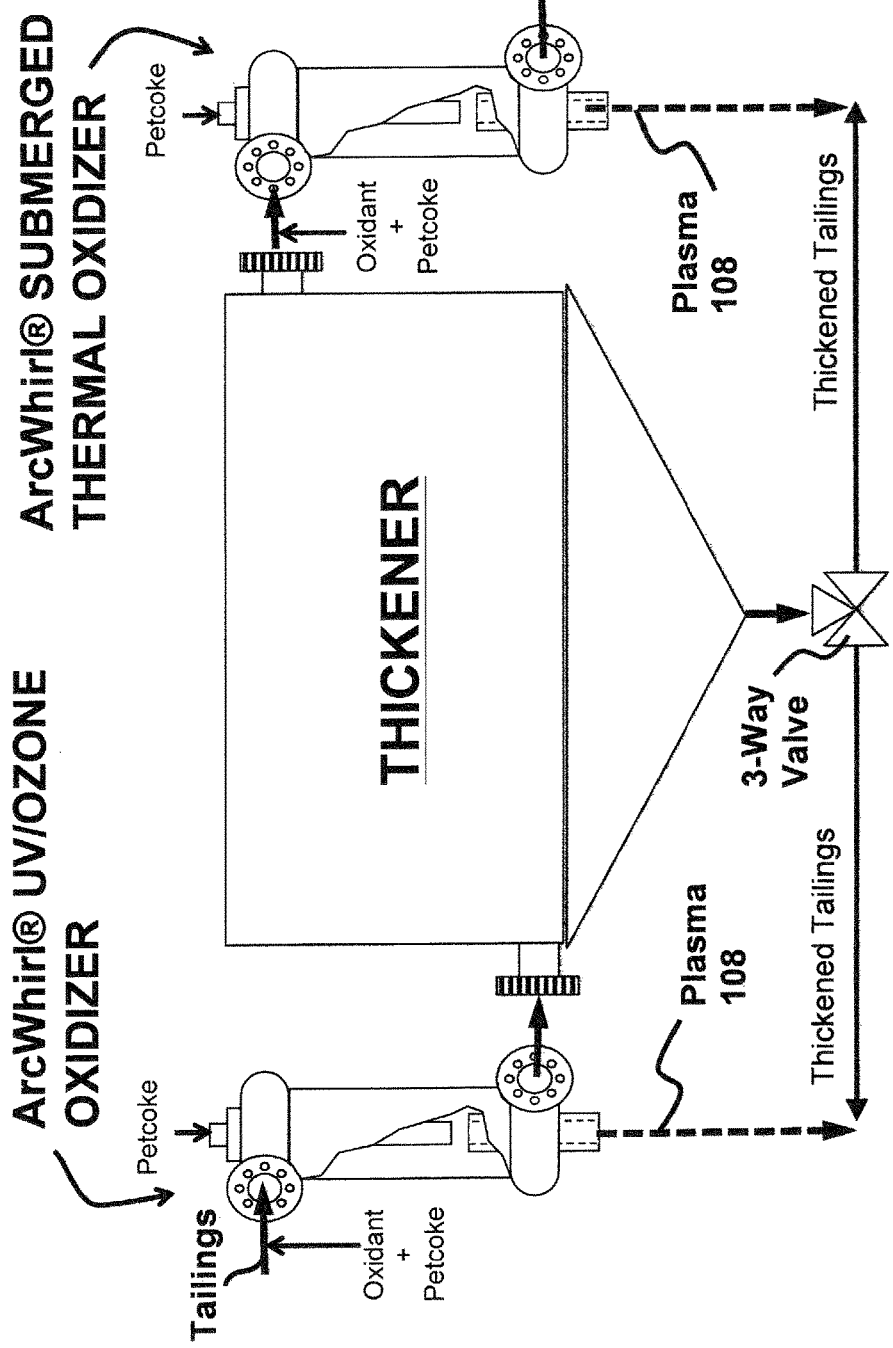
FIGURE 57 – Dual ArcWhirls® Thickener

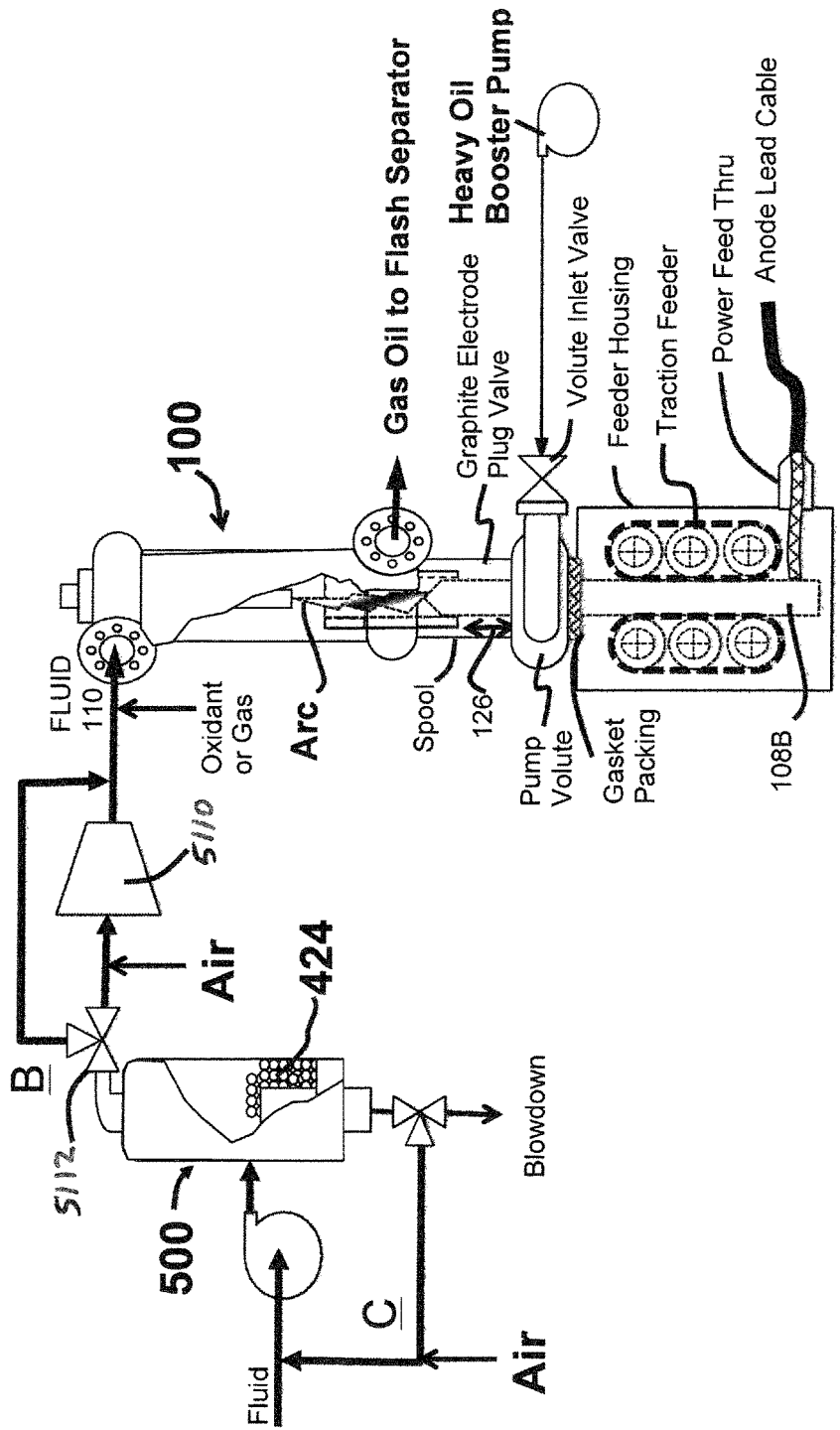
FIGURE 58 – SOGD ArcWhirl® Upgrader

SYSTEM, METHOD AND APPARATUS FOR TREATING MINING BYPRODUCTS

PRIORITY CLAIM AND CROSS-REFERENCE TO RELATED APPLICATIONS

This patent application is (a) a non-provisional application of U.S. patent application 61/787,293 filed on Mar. 15, 2013, and entitled "Solid Oxide High Temperature Electrolysis Glow Discharge Cell and Plasma System for Enhanced Oil Recovery", and (b) a continuation-in-part application of U.S. patent application Ser. No. 14/176,032 filed on Feb. 7, 2014, and entitled "System, Method and Apparatus for Recovering Mining Fluids from Mining Byproducts" (see below). This application also claims priority to PCT patent applications (a) PCT/US2013/062941 filed on Oct. 1, 2013, entitled "Plasma Arc Torch Having Multiple Operating Modes", and (b) PCT/US2014/030090 filed on Mar. 15, 2014, entitled "System, Method and Apparatus for Treating Mining Byproducts."

U.S. patent application Ser. No. 14/176,032 filed on Feb. 7, 2014, and entitled "System, Method and Apparatus for Recovering Mining Fluids from Mining Byproducts" is (a) a non-provisional application of U.S. patent application 61/762,308 filed on Feb. 8, 2013, and entitled "System, Method and Apparatus for Recovering Mining Fluids from Mining Byproducts", and (b) a continuation-in-part application of U.S. patent application Ser. No. 13/633,128 filed on Oct. 1, 2012, entitled "Plasma Arc Torch Having Multiple Operating Modes", which is a continuation-in-part application of U.S. patent application Ser. No. 12/371,575 filed on Feb. 13, 2009, now U.S. Pat. No. 8,278,810 (see below).

U.S. patent application Ser. No. 12/371,575 filed on Feb. 13, 2009, now U.S. Pat. No. 8,278,810, and entitled "Solid Oxide High Temperature Electrolysis Glow Discharge Cell", is (a) a continuation-in-part application of U.S. patent application Ser. No. 12/288,170 filed on Oct. 16, 2008 and entitled "System, Method And Apparatus for Creating an Electrical Glow Discharge", which is a non-provisional application of U.S. provisional patent application 60/980,443 filed on Oct. 16, 2007 and entitled "System, Method and Apparatus for Carbonizing Oil Shale with Electrolysis Plasma Well Screen"; (b) a continuation-in-part application of U.S. patent application Ser. No. 12/370,591 filed on Feb. 12, 2009, now U.S. Pat. No. 8,074,439, and entitled "System, Method and Apparatus for Lean Combustion with Plasma from an Electrical Arc", which is non-provisional patent application of U.S. provisional patent application Ser. No. 61/027,879 filed on Feb. 12, 2008 and entitled, "System, Method and Apparatus for Lean Combustion with Plasma from an Electrical Arc"; and (c) a non-provisional patent application of U.S. provisional patent application 61/028,386 filed on Feb. 13, 2008 and entitled "High Temperature Plasma Electrolysis Reactor Configured as an Evaporator, Filter, Heater or Torch." All of the foregoing applications are hereby incorporated by reference in their entirety.

This application is also related to U.S. Pat. No. 7,422,695 and U.S. Pat. No. 7,857,972 and multiple patents and patent applications that claim priority thereto.

FIELD OF THE INVENTION

The present invention relates generally to field of oil and gas production and, more particularly, to a system, method and apparatus for treating mining byproducts.

BACKGROUND OF THE INVENTION

Hydrocarbon production starts with mining. Either surface mining with large cranes and trucks used for oil sands mining or drilling a well to mine the hydrocarbons in a subsurface formation. In either case, byproducts from mining, drilling, completing and/or producing hydrocarbons range from drill cuttings to frack flowback water to produced water and huge volumes of tailings in the case of oil sands surface mining (collectively referred to as "mining byproducts").

Solvents and/or valuable drilling fluids (collectively referred to as "mining fluids") are used in the mining or drilling process to, among other things, provide hydrostatic pressure, cool and clean the drill bit, carry out drill cuttings (e.g., rock, soil, sand, etc.), and suspend the drill cuttings when the drill is not active. The cost of most drilling fluids is directly proportional to the cost of crude oil. Hence, oil based muds ("OBM") are predominantly diesel, and synthetic based muds ("SBM") are synthetic oils similar to Shell Rotella®. For example, formate drilling fluids manufactured by Cabot Corporation are extremely expensive but are environmentally safe, do not contain solids and can be used within high temperature and high pressure formations. Likewise, synthetic based drilling fluids are commonly employed for offshore drilling because the drill cuttings can be discharged overboard as long as the Fluid Retention On Cuttings ("ROC") is less than what is required by regulations.

The mixture of mining fluids and mining byproducts that exit the mine or well also contain hydrocarbons. This mixture is typically processed by a solids control system (e.g., shale shakers, mud gas separators, desanders, desilters, degassers, cleaners, etc.) to substantially separate the mining fluids and hydrocarbons from the mining byproducts. But these solids control systems do not remove all of the mining fluids and hydrocarbons from the mining byproducts. As a result, these valuable mining fluids and hydrocarbons may end up in a tailings pond, the bottom of the ocean or shipped to a Treatment, Recovery and Disposal ("TRD") facility.

Vertical Centrifuges are commonly employed offshore for reducing the ROC to below discharge limits. However, Loss Circulation Material ("LCM") and cement cannot be effectively treated in a vertical centrifuge. It clogs the centrifuge and it must be shut down and cleaned, thus it is usually bypassed during cementing operations or when a LCM Pill is used to prevent losing circulation and fluids into the formation. Another treatment system uses thermal desorption units, which are bulky and have many moving parts. Likewise, thermal desorption units typically employ indirect heating, which is inefficient when compared to direct heating.

Air dryers and friction dryers, such as Schlumberger's (M-I Swaco) Hammermill are commonly employed, but neither have been successful at recovering base fluids. Why? Both dryer types comminute the cuttings into very fine powders which makes it difficult to separate the base fluid from the fine cuttings. Likewise, air dryers can produce an explosive mixture since drilling fluids contain fuels (diesel, synthetic oil, etc.). Although Schlumberger markets a Zero Discharge thermal desorption TPS system, the system still only achieves a removal of Total Percent Hydrocarbons (TPH) of less than 0.5%. Finally, the U.S. Department Of Energy's Drilling Waste Management Information System discloses many different thermal technologies for treating drilling waste.

When the price of crude oil was low, a ROC near the limits was not perceived as a problem. However, with new regulations pushing lower ROC limits in addition to high crude oil prices, recovering mining fluids from the mining byproducts has become a priority and is now an environmentally sustainable goal for many oil and gas companies. Moreover, the cost of some mining fluids, such as formate drilling fluids containing Cesium, makes recovering these mining fluids from the mining byproducts very desirable both economically and ecologically.

Other problems associated with the production of oil and gas resources include the fact it is very common for oil production wells to reach the end of their life, while there is still a substantial amount of oil in place (OIP) within the formation. Production superintendents, Geologists and Engineers may then to decide whether to shut in the well or stimulate the well using enhanced oil recovery (EOR) methods ranging from water flooding to steam flooding to injection of carbon dioxide and injection of solvents.

Likewise, even during peak production of a well, a well may have to be shut in due to paraffin plugging the production tubing. This can cause several problems ranging from reduced production to parting or breaking of the sucker rod connected to the surface pump jack. Another problem associated with most oil and gas wells is produced water. When the water reaches the surface it is separated from the oil or gas and then must be treated prior to final disposition.

Recently, primarily due to high crude oil prices many exploration companies are turning to unconventional heavy oil resources (API<22) such as oil sand bitumen, oil shale kerogen as well as heavy oil itself. Canada contains the largest known oil sand reserves estimated at over 1 trillion recoverable barrels of bitumen. Likewise, the largest known unconventional petroleum or hydrocarbon resource can be found in the Green River Formation in Colorado, Wyoming and Utah. Worldwide oil shale reserves are estimated around 2.9-3.3 trillion barrels of shale oil while the Green River Formation reserves alone are estimated to contain between 1.5-2.6 trillion barrels.

However, emerging issues with respect to the renewed interest in oil shale development range from water resources, to green house gas emissions to basic infrastructure needs. Likewise, the Canadian oil sands has its own problems ranging from very large tailings ponds to a lack of upgrading capacity for the bitumen recovered from the oil sands. In addition, the steam assisted gravity drainage (SAGD) process utilizes copious amounts of energy to produce steam. Two problems associated with producing steam are first the source of water and removing its contaminants that may be deposited upon boiler tube walls and second recovering the latent heat within the steam when injected downhole.

The problem is indirect heat transfer. Heat is transferred via radiation, convection and conduction. Indeed, SAGD evaporators and boilers transfer heat via radiation, convection and conduction. Although the flame in the boiler transfers heat via radiation and convection to boiler tubes, heat transfer through boiler tubes is solely via thermal conduction. And the impediment to reducing production costs at SAGD facilities is heat transfer via thermal conduction through boiler tubes.

When the heat transfer surface of the boiler tubes becomes coated with contaminants, for example silica, then heat transfer is reduced and the boiler and/or evaporator must be shut down for maintenance. At SAGD facilities this is a common problem, especially with silica, and is now being viewed as non-sustainable. The silica is produced with the oil sand. Hence, sand contamination via volatile silica compound evaporation, as well as volatile organic compounds ("VOCs") is an inherit problem in current EOR operations utilizing traditional water treatment methods with boilers and once through steam generation equipment.

Therefore, a need exists for systems, methods and apparatuses to treat mining byproducts and provide enhanced oil recovery.

SUMMARY OF THE INVENTION

The present invention provides a system, method and apparatus for recycling all of the water used in oil and gas production (e.g., frack flowback water, produced water, wastewater, tailings pond water, etc.) in a very effective manner while reducing or eliminating environmental impacts such as air emissions, for example burning of fossil fuels to recover fossil fuels. The present invention provides a system, method and apparatus for upgrading or partial upgrading heavy oil to lighter oil in situ and/or at the wellhead.

For example, the present invention provides a system for treating a mining byproduct that includes a glow discharge cell having a side inlet to receive the mining byproduct, a top outlet and a bottom outlet, a first valve connected to the bottom outlet of the glow discharge cell and a plasma arc torch. The plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. A second valve is connected between to the top outlet of the glow discharge cell and the first tangential inlet/outlet of the plasma arc torch. A third valve is connected to the second tangential inlet/outlet of the plasma arc torch The present invention provides a system for treating a mining byproduct that includes a pump, a glow discharge cell and a valve. The pump has a pump inlet to receive the mining byproduct and a pump outlet. The glow discharge cell has a hollow electrode, a side inlet connected to the pump outlet, a lower side outlet, and an upper side outlet connected to an inlet of the hollow electrode. The valve is connected to the pump input and the lower side outlet of the glow discharge cell.

The present invention provides a system for treating a mining byproduct that includes a pump, a plasma arc torch and a valve. The pump has a pump inlet to receive the mining byproduct and a pump outlet. The plasma arc torch includes a cylindrical vessel having a first end and a second end, a first tangential inlet/outlet connected to or proximate to the first end, a second tangential inlet/outlet connected to or proximate to the second end and connected to the pump output, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. The valve is connected to the pump input and the hollow electrode nozzle of the plasma arc torch.

The present invention provides a system for treating a mining byproduct that includes a first and second plasma arc torch, a pump, a four-way valve, a compressor, an eductor and a three-way valve. Each plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. The pump has pump inlet to receive the mining byproduct, and a pump outlet connected to the second tangential inlet/outlet of the first plasma arc torch. A four-way valve is connected to the pump inlet and the hollow electrode nozzle of the first plasma arc torch. A compressor is connected between the first tangential inlet/outlet of the first plasma arc torch and the first tangential inlet/outlet of the second plasma arc torch. An eductor is connected to the hollow electrode nozzle of the second plasma arc torch and the four-way valve. A three-way valve is connected to the second tangential inlet/outlet of the second plasma arc torch and an input to the compressor.

The present invention provides a system for treating a mining byproduct that includes a plasma arc torch having a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. A first three-way valve is connected to the hollow electrode nozzle of the plasma arc torch and the first tangential inlet/outlet of the plasma arc torch. A second three-way valve is connected the first tangential inlet/outlet of the plasma arc torch. A third three-way valve is connected to the second three-way valve. A glow discharge cell has an input connected to second tangential inlet/outlet of the plasma arc torch and an output of a hollow electrode connected to the third three-way valve. A fourth three-way valve is connected to a gas outlet of the glow discharge cell and the second three-way valve. A thermal oxidizer is connected to the first three-way valve, the fourth three-way valve, the third three-way valve and an input of the hollow electrode of the glow discharge cell.

The present invention provides a system for treating a mining byproduct that includes a first and second plasma arc torch. Each plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. A floatation cell is connected between the second tangential inlet/outlet of the first plasma arc torch and the first tangential inlet/outlet of the second plasma arc torch. A three-way valve is connected to a floats/skim outlet of the flotation cell and the hollow electrode nozzle of the second plasma arc torch. A booster pump is connected to the three-way valve. A volute inlet valve is connected to the booster pump. A graphite electrode plug valve is connected to the hollow electrode nozzle of the first plasma arc torch. A pump volute is connected to the graphite electrode plug valve and the volute inlet valve. An electrode feeder is connected to the pump volute.

The present invention provides a system for treating a mining byproduct that includes a first and second plasma arc torch. Each plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. A thickener is connected between the second tangential inlet/outlet of the first plasma arc torch and the first tangential inlet/outlet of the second plasma arc torch. A three-way valve is connected to a bottom of the thickener, the hollow electrode nozzle of the first plasma arc torch and the hollow electrode nozzle of the second plasma arc torch.

The present invention provides a system for treating a mining byproduct that includes a pump, a first three-way valve connected to the input of the pump, a glow discharge cell having a input connected to an output of the pump and a bottom inlet/outlet connected to the first three-way valve and a plasma arc torch. The plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. A second three-way valve is connected to a top outlet of the glow discharge cell the first tangential inlet/outlet of the plasma arc torch. A compressor is connected between the second three-way valve and the first tangential inlet/outlet of the plasma arc torch. A booster pump is connected to a volute inlet valve. A graphite electrode plug valve is connected to the hollow electrode nozzle of the plasma arc torch. A pump volute is connected to the graphite electrode plug valve and the volute inlet valve. An electrode feeder is connected to the pump volute.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 52 is a cross-sectional view of a Solid Oxide Glow Discharge Cell Enhanced Oil Recovery System in accordance with another embodiment of the present invention;

FIG. 53 is a cross-sectional view of an ArcWhirl® Glow Discharge Cell Enhanced Oil Recovery System in accordance with another embodiment of the present invention;

FIG. 54 is a cross-sectional view of an ArcWhirl® Glow Discharge Cell and ArcWhirl® Plasma Torch Enhanced Oil Recovery System in accordance with another embodiment of the present invention;

FIG. 55 is a cross-sectional view of an ArcWhirl® Plasma Torch and Solid Oxide Glow Discharge Cell Enhanced Oil Recovery System in accordance with another embodiment of the present invention;

FIG. 56 is a cross-sectional view of Dual ArcWhirl® Plasma Torches and a Flotation Cell System in accordance with another embodiment of the present invention;

FIG. 57 is a cross-sectional view of Dual ArcWhirl® Plasma Torches and a Thickener System in accordance with another embodiment of the present invention; and FIG. 58 is a cross-sectional view of a SOGD ArcWhirl® Upgrader in accordance with another embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
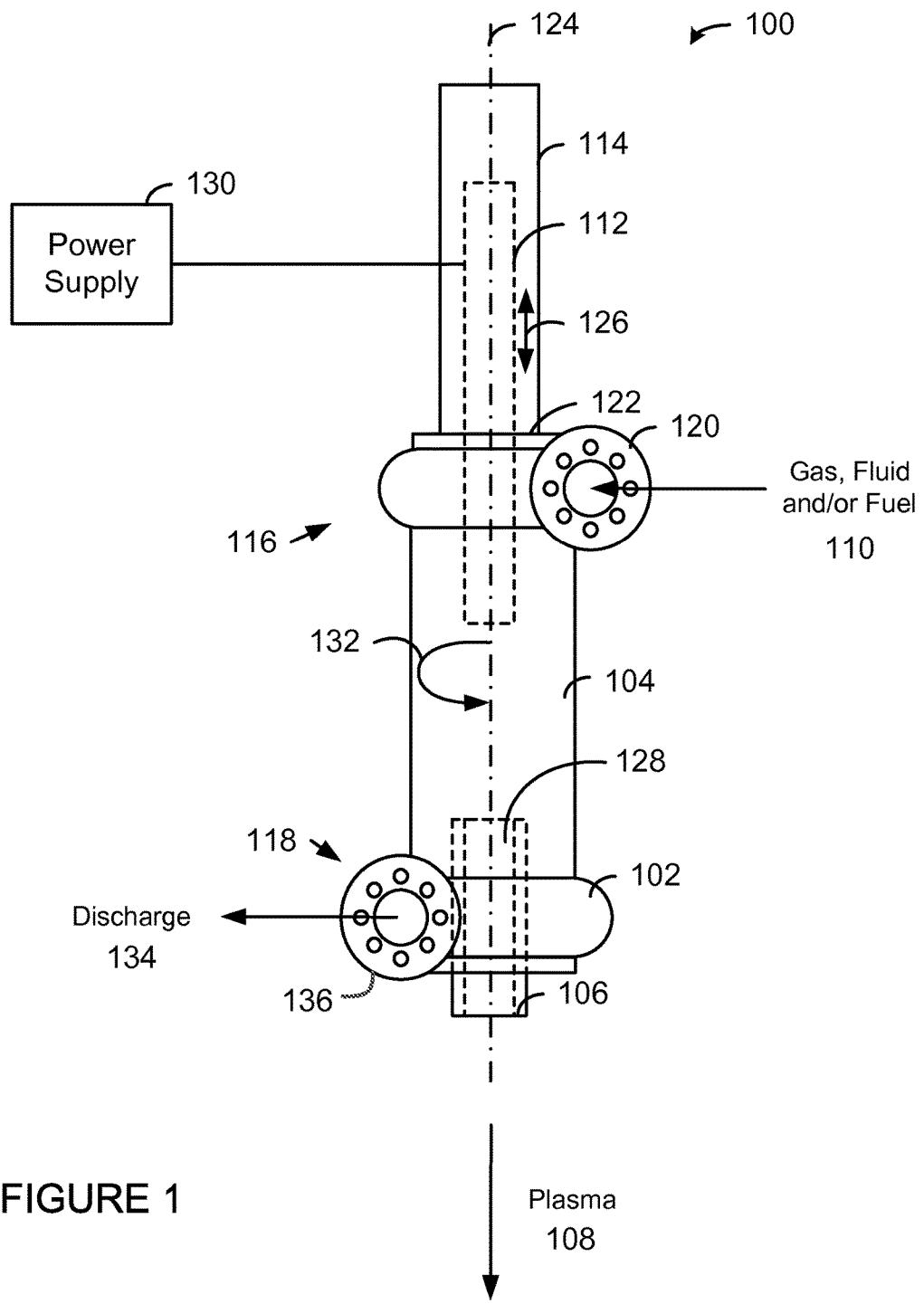
FIG. 1 is a diagram of a plasma arc torch in accordance with one embodiment of the present invention.

Now referring to FIG. 1, a plasma arc torch 100 in accordance with one embodiment of the present invention is shown. The plasma arc torch 100 is a modified version of the ARCWHIRL® device disclosed in U.S. Pat. No. 7,422,695 (which is hereby incorporated by reference in its entirety) that produces unexpected results. More specifically, by attaching a discharge volute 102 to the bottom of the vessel 104, closing off the vortex finder, replacing the bottom electrode with a hollow electrode nozzle 106, an electrical arc can be maintained while discharging plasma 108 through the hollow electrode nozzle 106 regardless of how much gas (e.g., air), fluid (e.g., water) or steam 110 is injected into plasma arc torch 100. In addition, when a valve (not shown) is connected to the discharge volute 102, the mass flow of plasma 108 discharged from the hollow electrode nozzle 106 can be controlled by throttling the valve (not shown) while adjusting the position of the first electrode 112 using the linear actuator 114.

As a result, plasma arc torch 100 includes a cylindrical vessel 104 having a first end 116 and a second end 118. A tangential inlet 120 is connected to or proximate to the first end 116 and a tangential outlet 136 (discharge volute) is connected to or proximate to the second end 118. An electrode housing 122 is connected to the first end 116 of the cylindrical vessel 104 such that a first electrode 112 is aligned with the longitudinal axis 124 of the cylindrical vessel 104, extends into the cylindrical vessel 104, and can be moved along the longitudinal axis 124. Moreover, a linear actuator 114 is connected to the first electrode 112 to adjust the position of the first electrode 112 within the cylindrical vessel 104 along the longitudinal axis of the cylindrical vessel 124 as indicated by arrows 126. The hollow electrode nozzle 106 is connected to the second end 118 of the cylindrical vessel 104 such that the centerline of the hollow electrode nozzle 106 is aligned with the longitudinal axis 124 of the cylindrical vessel 104. The shape of the hollow portion 128 of the hollow electrode nozzle 106 can be cylindrical or conical. Moreover, the hollow electrode nozzle 106 can extend to the second end 118 of the cylindrical vessel 104 or extend into the cylindrical vessel 104 as shown. As shown in FIG. 1, the tangential inlet 120 is volute attached to the first end 116 of the cylindrical vessel 104, the tangential outlet 136 is a volute attached to the second end 118 of the cylindrical vessel 104, the electrode housing 122 is connected to the inlet volute 120, and the hollow electrode nozzle 106 (cylindrical configuration) is connected to the discharge volute 102. Note that the plasma arc torch 100 is not shown to scale.

A power supply 130 is electrically connected to the plasma arc torch 100 such that the first electrode 112 serves as the cathode and the hollow electrode nozzle 106 serves as the anode. The voltage, power and type of the power supply 130 is dependant upon the size, configuration and function of the plasma arc torch 100. A gas (e.g., air), fluid (e.g., water) or steam 110 is introduced into the tangential inlet 120 to form a vortex 132 within the cylindrical vessel 104 and exit through the tangential outlet 136 as discharge 134. The vortex 132 confines the plasma 108 within in the vessel 104 by the inertia (inertial confinement as opposed to magnetic confinement) caused by the angular momentum of the vortex, whirling, cyclonic or swirling flow of the gas (e.g., air), fluid (e.g., water) or steam 110 around the interior of the cylindrical vessel 104. During startup, the linear actuator 114 moves the first electrode 112 into contact with the hollow electrode nozzle 106 and then draws the first electrode 112 back to create an electrical arc which forms the plasma 108 that is discharged through the hollow electrode nozzle 106. During operation, the linear actuator 114 can adjust the position of the first electrode 112 to change the plasma 108 discharge or account for extended use of the first electrode 112. Note an inductively coupled induction coil can be added to the various components of the Steam Plasma Unit as described herein.

Figure 2:
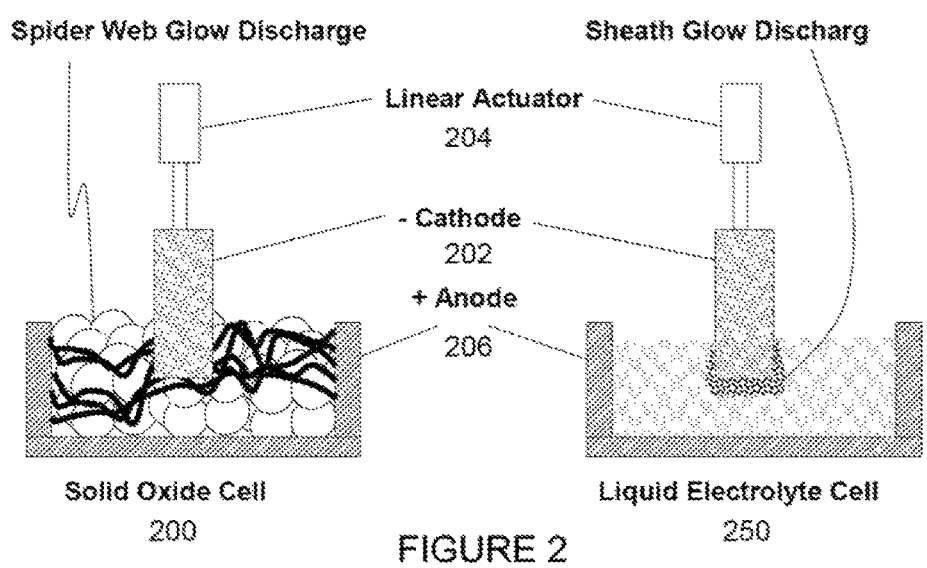
FIG. 2 is a cross-sectional view comparing and contrasting a solid oxide cell to a liquid electrolyte cell in accordance with one embodiment of the present invention.

Referring now to FIG. 2, a cross-sectional view comparing and contrasting a solid oxide cell 200 to a liquid electrolyte cell 250 in accordance with one embodiment of the present invention is shown. An experiment was conducted using the Liquid Electrolyte Cell 250. A carbon cathode 202 was connected a linear actuator 204 in order to raise and lower the cathode 202 into a carbon anode crucible 206. An ESAB ESP 150 DC power supply rated at 150 amps and an open circuit voltage ("OCV") of 370 VDC was used for the test. The power supply was "tricked out" in order to operate at OCV.

In order to determine the sheath glow discharge length on the cathode 202 as well as measure amps and volts the power supply was turned on and then the linear actuator 204 was used to lower the cathode 202 into an electrolyte solution of water and baking soda. Although a steady glow discharge could be obtained the voltage and amps were too erratic to record. Likewise, the power supply constantly surged and pulsed due to erratic current flow. As soon as the cathode 202 was lowered too deep, the glow discharge ceased and the cell went into an electrolysis mode. In addition, since boiling would occur quite rapidly and the electrolyte would foam up and go over the sides of the carbon crucible 206, foundry sand was added reduce the foam in the crucible 206.

The 8" diameter anode crucible 206 was filled with sand and the electrolyte was added to the crucible. Power was turned on and the cathode 202 was lowered into the sand and electrolyte. Unexpectedly, a glow discharge was formed immediately, but this time it appeared to spread out laterally from the cathode 202. A large amount of steam was produced such that it could not be seen how far the glow discharge had extended through the sand.

Figure 3:
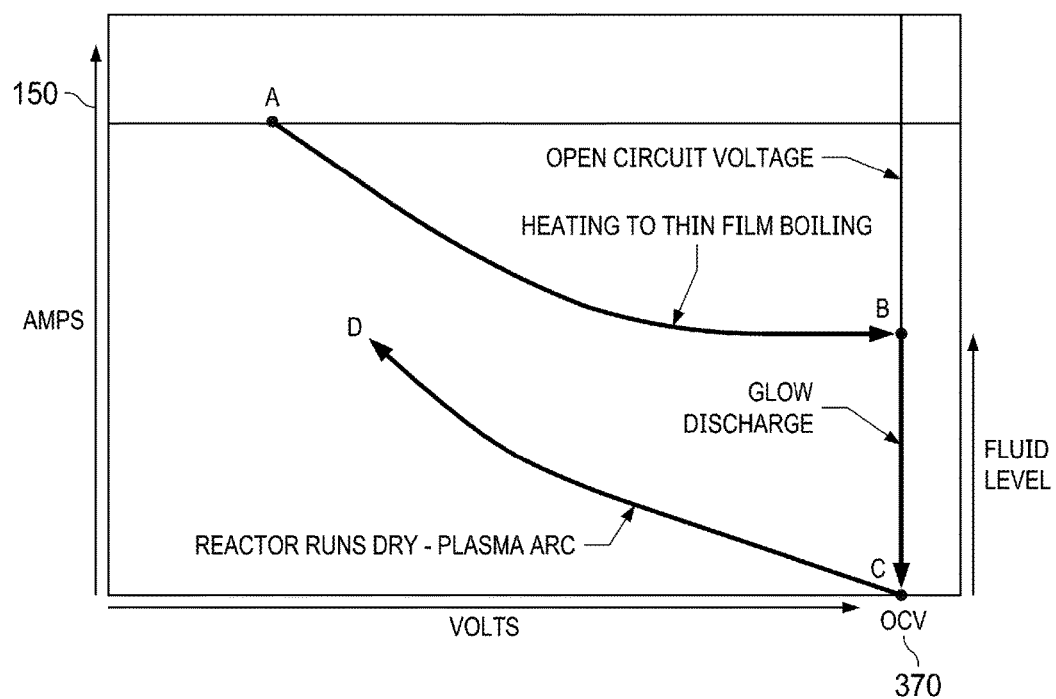
FIG. 3 is a graph showing an operating curve a glow discharge cell in accordance with one embodiment of the present invention.

Next, the sand was replaced with commonly available clear floral marbles. When the cathode 202 was lowered into the marbles and baking soda/water solution, the electrolyte began to slowly boil. As soon as the electrolyte began to boil a glow discharge spider web could be seen throughout the marbles as shown the Solid Oxide Cell 200. Although this was completely unexpected at a much lower voltage than what has been disclosed and published, what was completely unexpected is that the DC power supply did not surge, pulse or operate erratically in any way. A graph showing an operating curve for a glow discharge cell in accordance with the present invention is shown in FIG. 3 based on various tests. The data is completely different from what is currently published with respect to glow discharge graphs and curves developed from currently known electroplasma, plasma electrolysis or glow discharge reactors. Glow discharge cells can evaporate or concentrate liquids while generating steam.

Figure 4:
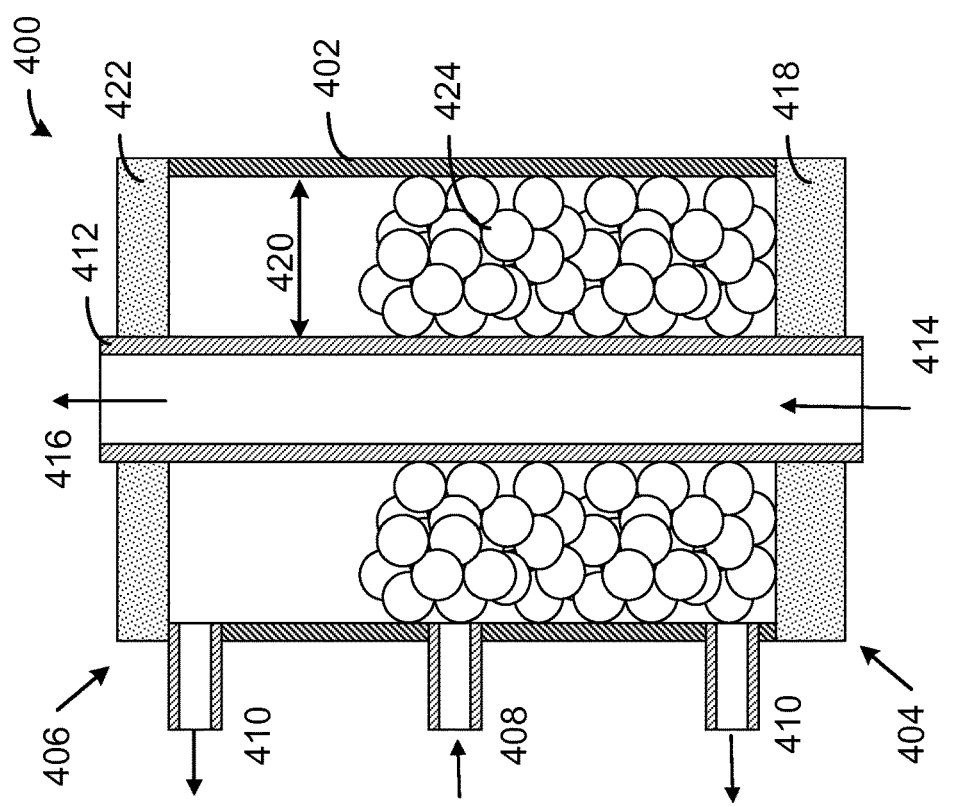
FIG. 4 is a cross-sectional view of a glow discharge cell in accordance with one embodiment of the present invention.

Now referring to FIG. 4, a cross-sectional view of a glow discharge cell 400 in accordance with one embodiment of the present invention is shown. The glow discharge cell 400 includes an electrically conductive cylindrical vessel 402 having a first end 404 and a second end 406, and at least one inlet 408 and one outlet 410. A hollow electrode 412 is aligned with a longitudinal axis of the cylindrical vessel 402 and extends at least from the first end 404 to the second end 406 of the cylindrical vessel 402. The hollow electrode 412 also has an inlet 414 and an outlet 416. A first insulator 418 seals the first end 404 of the cylindrical vessel 402 around the hollow electrode 412 and maintains a substantially equidistant gap 420 between the cylindrical vessel 402 and the hollow electrode 412. A second insulator 422 seals the second end 406 of the cylindrical vessel 402 around the hollow electrode 412 and maintains the substantially equidistant gap 420 between the cylindrical vessel 402 and the hollow electrode 412. A non-conductive granular material 424 is disposed within the gap 420, wherein the non-conductive granular material 424 (a) allows an electrically conductive fluid to flow between the cylindrical vessel 402 and the hollow electrode 412, and (b) prevents electrical arcing between the cylindrical vessel 402 and the hollow electrode 412 during a electric glow discharge. The electric glow discharge is created whenever: (a) the glow discharge cell 400 is connected to an electrical power source such that the cylindrical vessel 402 is an anode and the hollow electrode 412 is a cathode, and (b) the electrically conductive fluid is introduced into the gap 420.

The vessel 402 can be made of stainless steel and the hollow electrode can be made of carbon. The non-conductive granular material 424 can be marbles, ceramic beads, molecular sieve media, sand, limestone, activated carbon, zeolite, zirconium, alumina, rock salt, nut shell or wood chips. The electrical power supply can operate in a range from 50 to 500 volts DC, or a range of 200 to 400 volts DC. The cathode 412 can reach a temperature of at least 500° C., at least 1000° C., or at least 2000° C. during the electric glow discharge. The electrically conductive fluid comprises water, produced water, wastewater, tailings pond water, or other suitable fluid. The electrically conductive fluid can be created by adding an electrolyte, such as baking soda, Nahcolite, lime, sodium chloride, ammonium sulfate, sodium sulfate or carbonic acid, to a fluid.

Figure 5:
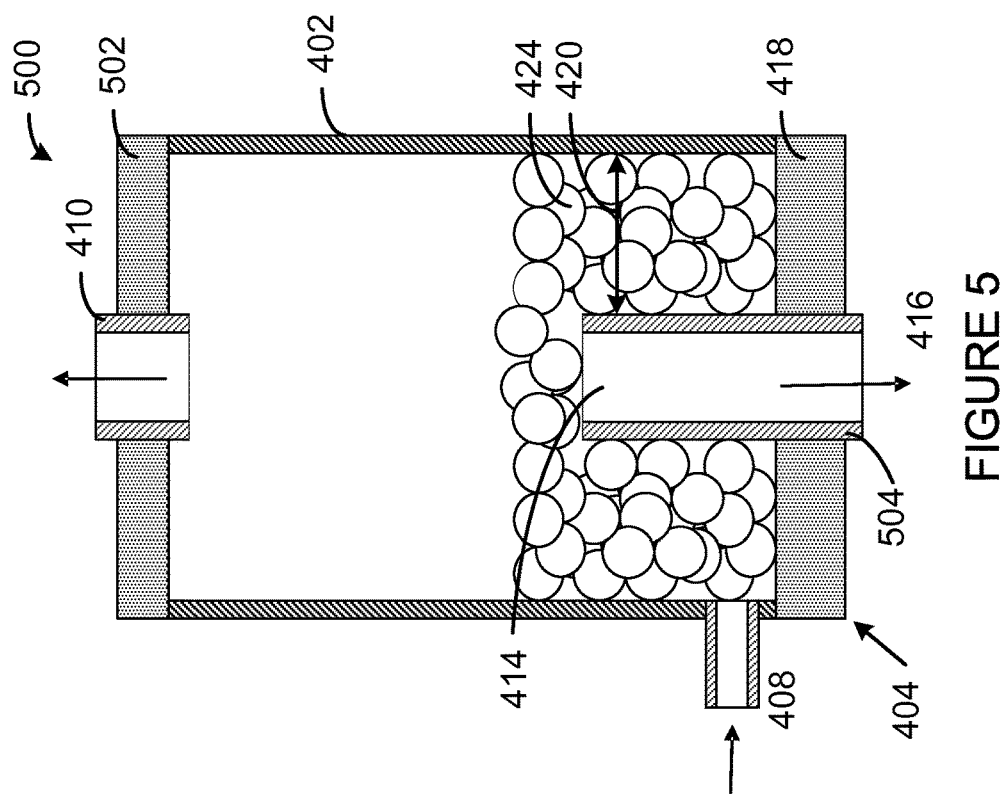
FIG. 5 is a cross-sectional view of a glow discharge cell in accordance with another embodiment of the present invention.

Referring now to FIG. 5, a cross-sectional view of a glow discharge cell 500 in accordance with another embodiment of the present invention is shown. The glow discharge cell 500 includes an electrically conductive cylindrical vessel 402 having a first end 404 and a closed second end 502, an inlet proximate 408 to the first end 404, and an outlet 410 centered in the closed second end 502. A hollow electrode 504 is aligned with a longitudinal axis of the cylindrical vessel and extends at least from the first end 404 into the cylindrical vessel 402. The hollow electrode 504 has an inlet 414 and an outlet 416. A first insulator 418 seals the first end 404 of the cylindrical vessel 402 around the hollow electrode 504 and maintains a substantially equidistant gap 420 between the cylindrical vessel 402 and the hollow electrode 504. A non-conductive granular material 424 is disposed within the gap 420, wherein the non-conductive granular material 424 (*a*) allows an electrically conductive fluid to flow between the cylindrical vessel 402 and the hollow electrode 504, and (b) prevents electrical arcing between the cylindrical vessel 402 and the hollow electrode 504 during a electric glow discharge. The electric glow discharge is created whenever: (a) the glow discharge cell 500 is connected to an electrical power source such that the cylindrical vessel 402 is an anode and the hollow electrode 504 is a cathode, and (b) the electrically conductive fluid is introduced into the gap 420.

Note that the configuration of the glow discharge cell 500 shown in FIGS. 4 and 5 can be varied as illustrated in U.S. patent application Ser. No. 18/486,626 filed on Mar. 14, 2014 and entitled "High Temperature Electrolysis Glow Discharge Device." Such variations can be used as any of the glow discharges cells 500 referenced throughout this specification and figures.

The following examples will demonstrate the capabilities, usefulness and completely unobvious and unexpected results.

Example 1—Black Liquor

Figure 6:
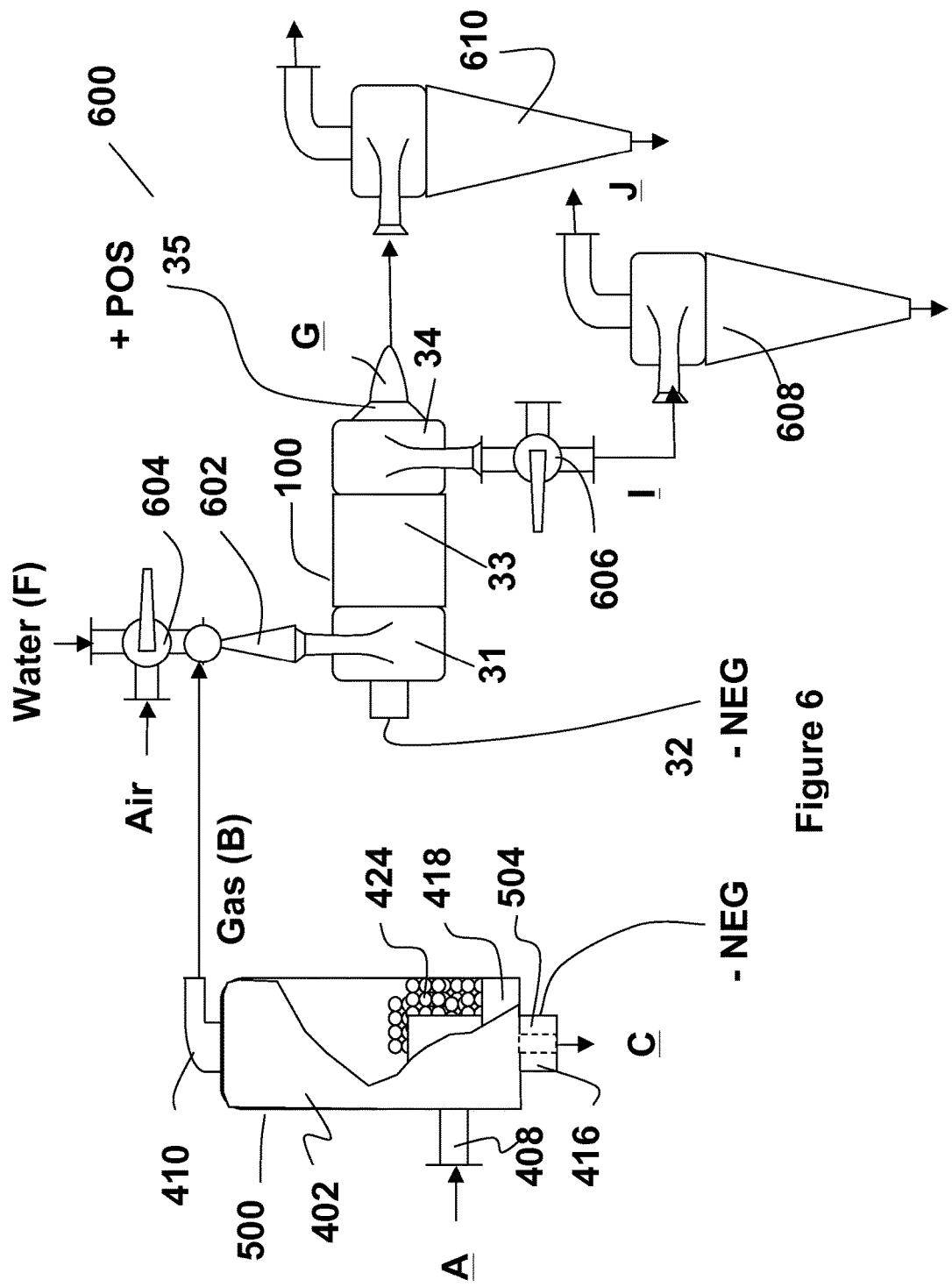
FIG. 6 is a cross-sectional view of a Solid Oxide Plasma Arc Torch System in accordance with another embodiment of the present invention.

Now referring to FIG. 6, a cross-sectional view of a Solid Oxide Plasma Arc Torch System 600 in accordance with another embodiment of the present invention is shown. A plasma arc torch 100 is connected to the cell 500 via an eductor 602. Once again the cell 500 was filled with a baking soda and water solution. A pump was connected to the first volute 31 of the plasma arc torch 100 via a 3-way valve 604 and the eductor 602. The eductor 602 pulled a vacuum on the cell 500. The plasma exiting from the plasma arc torch 100 dramatically increased in size. Hence, a non-condensable gas B was produced within the cell 500. The color of the arc within the plasma arc torch 100 when viewed through the sightglass 33 changed colors due to the gases produced from the HiTemper™ cell 500. Next, the 3-way valve 604 was adjusted to allow air and water F to flow into the first volute 31 of plasma arc torch 100. The additional mass flow increased the plasma G exiting from the plasma arc torch 100. Several pieces of stainless steel round bar were placed at the tip of the plasma G and melted to demonstrate the systems capabilities. Likewise, wood was carbonized by placing it within the plasma stream G. Thereafter the plasma G exiting from the plasma torch 100 was directed into cyclone separator 610. The water and gases I exiting from the plasma arc torch 100 via second volute 34 flowed into a hydrocyclone 608 via a valve 606. This allowed for rapid mixing and scrubbing of gases with the water in order to reduce the discharge of any hazardous contaminants.

A sample of black liquor with 16% solids obtained from a pulp and paper mill was charged to the glow discharge cell 500 in a sufficient volume to cover the floral marbles 424. In contrast to other glow discharge or electro plasma systems the solid oxide glow discharge cell does not require preheating of the electrolyte. The ESAB ESP 150 power supply was turned on and the volts and amps were recorded by hand. Referring briefly to FIG. 3, as soon as the power was turned on to the cell 500, the amp meter pegged out at 150. Hence, the name of the ESAB power supply—ESP 150. It is rated at 150 amps. The voltage was steady between 90 and 100 VDC. As soon as boiling occurred the voltage steadily climbed to OCV (370 VDC) while the amps dropped to 75.

The glow discharge cell 500 was operated until the amps fell almost to zero. Even at very low amps of less than 10 the voltage appeared to be locked on at 370 VDC. The cell 500 was allowed to cool and then opened to examine the marbles 424. It was surprising that there was no visible liquid left in the cell 500 but all of the marbles 424 were coated or coked with a black residue. The marbles 424 with the black residue were shipped off for analysis. The residue was in the bottom of the container and had come off of the marbles 424 during shipping. The analysis is listed in the table below, which demonstrates a novel method for concentrating black liquor and coking organics. With a starting solids concentration of 16%, the solids were concentrated to 94.26% with only one evaporation step. Note that the sulfur ("S") stayed in the residue and did not exit the cell 500.

TABLE

Black Liquor Results
Total Solids % 94.26
Ash %/ODS 83.64
ICP metal scan: results are reported on ODS basis

| Metal Scan | Unit | F80015 |
|---|---|---|
| Aluminum, Al | mg/kg | 3590* |
| Arsenic, As | mg/kg | <50 |
| Barium, Ba | mg/kg | 2240* |
| Boron, B | mg/kg | 60 |
| Cadmium, Cd | mg/kg | 2 |
| Calcium, Ca | mg/kg | 29100* |
| Chromium, Cr | mg/kg | 31 |
| Cobalt, Co | mg/kg | <5 |
| Copper, Cu | mg/kg | 19 |
| Iron, Fe | mg/kg | 686* |
| Lead, Pb | mg/kg | <20 |
| Lithium, Li | mg/kg | 10 |
| Magnesium, Mg | mg/kg | 1710* |
| Manganese, Mn | mg/kg | 46.2 |
| Molybdenum, Mo | mg/kg | 40 |
| Nickel, Ni | mg/kg | <100 |
| Phosphorus, P | mg/kg | 35 |
| Potassium, K | mg/kg | 7890 |
| Silicon, Si | mg/kg | 157000* |
| Sodium, Na | mg/kg | 102000 |
| Strontium, Sr | mg/kg | <20 |
| Sulfur, S | mg/kg | 27200* |
| Titanium, Ti | mg/kg | 4 |
| Vanadium, V | mg/kg | 1.7 |
| Zinc, Zn | mg/kg | 20 |

This method can be used for concentrating black liquor from pulp, paper and fiber mills for subsequent recausitizing.

As can be seen in FIG. 3, if all of the liquid evaporates from the cell 500 and it is operated only with a solid electrolyte, electrical arc over from the cathode to anode may occur. This has been tested in which case a hole was blown through the stainless steel vessel 402. Electrical arc over can easily be prevented by (1) monitoring the liquid level in the cell and do not allow it to run dry, and (2) monitoring the amps (Low amps=Low liquid level). If electrical arc over is desirable or the cell must be designed to take an arc over, then the vessel 402 should be constructed of carbon.

Example 2—Arcwhirl® Plasma Torch Attached to Solid Oxide Cell

Figure 7:
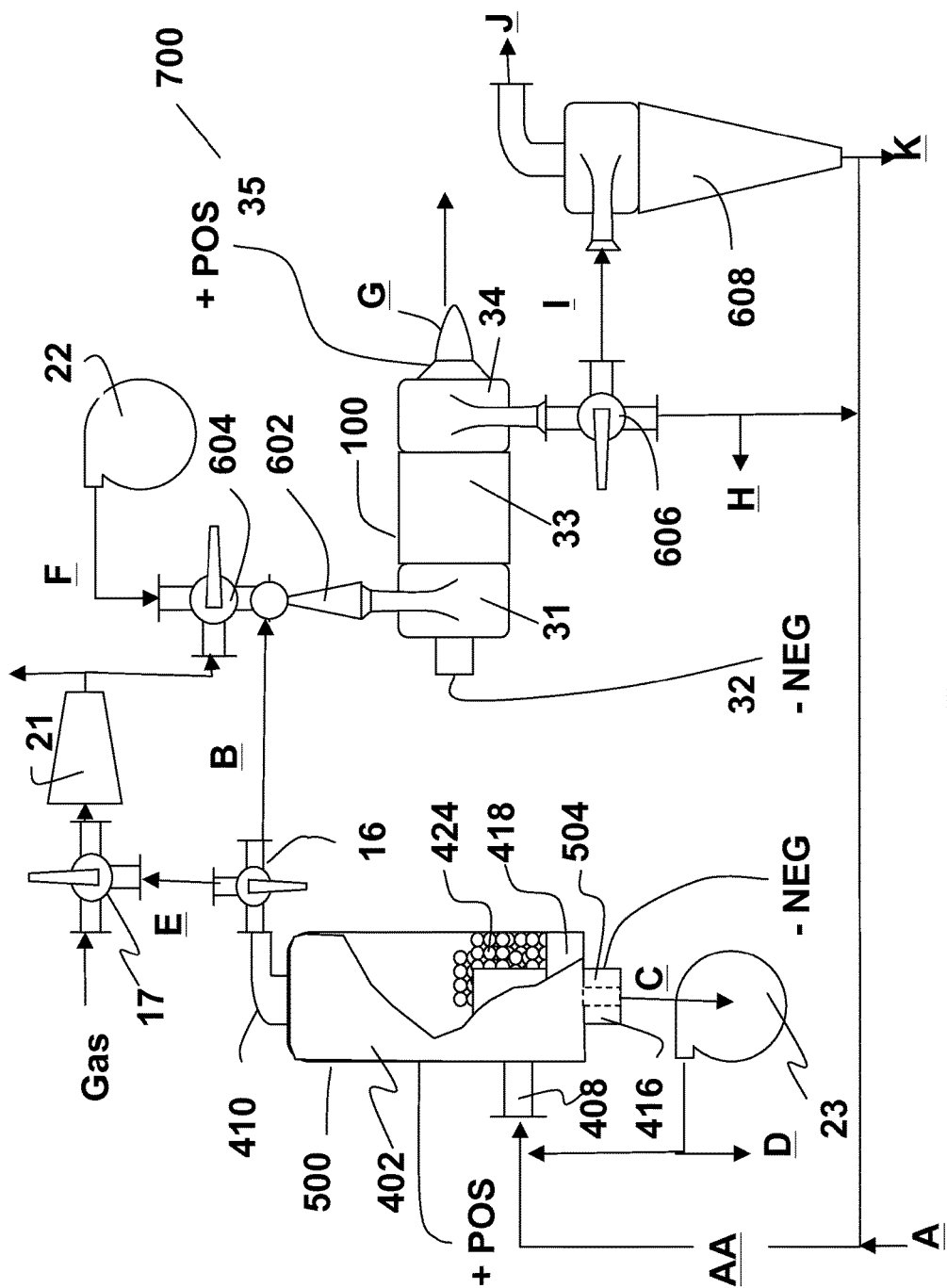
FIG. 7 is a cross-sectional view of a Solid Oxide Plasma Arc Torch System in accordance with another embodiment of the present invention.

Referring now to FIG. 7, a cross-sectional view of a Solid Oxide Plasma Arc Torch System 700 in accordance with another embodiment of the present invention is shown. A plasma arc torch 100 is connected to the cell 500 via an eductor 602. Once again the cell 500 was filled with a baking soda and water solution. Pump 23 recirculates the baking soda and water solution from the outlet 416 of the hollow electrode 504 to the inlet 408 of the cell 500. A pump 22 was connected to the first volute 31 of the plasma arc torch 100 via a 3-way valve 604 and the eductor 602. An air compressor 21 was used to introduce air into the 3-way valve 604 along with water F from the pump 22. The pump 22 was turned on and water F flowed into the first volute 31 of the plasma arc torch 100 and through a full view site glass 33 and exited the torch 30 via a second volute 34. The plasma arc torch 100 was started by pushing a carbon cathode rod (−NEG) 32 to touch and dead short to a positive carbon anode (+POS) 35. A very small plasma G exited out of the anode 35. Next, the High Temperature Plasma Electrolysis Reactor (Cell) 500 was started in order to produce a plasma gas B. Once again at the onset of boiling voltage climbed to OCV (370 VDC) and a gas began flowing to the plasma arc torch 100. The eductor 602 pulled a vacuum on the cell 500. The plasma G exiting from the plasma arc torch 100 dramatically increased in size. Hence, a non-condensable gas B was produced within the cell 500. The color of the arc within the plasma arc torch 100 when viewed through the sightglass 33 changed colors due to the gases produced from the HiTemper™ cell 500. Next, the 3-way valve 604 was adjusted to allow air from compressor 21 and water from pump 22 to flow into the plasma arc torch 100. The additional mass flow increased the plasma G exiting from the plasma arc torch 100. Several pieces of stainless steel round bar were placed at the tip of the plasma G and melted to demonstrate the systems capabilities. Likewise, wood was carbonized by placing it within the plasma stream G. The water and gases exiting from the plasma arc torch 100 via volute 34 flowed into a hydrocyclone 608. This allowed for rapid mixing and scrubbing of gases with the water in order to reduce the discharge of any hazardous contaminants.

Next, the system was shut down and a second cyclone separator 610 was attached to the plasma arc torch 100 as shown in FIG. 1. Once again the Solid Oxide Plasma Arc Torch System was turned on and a plasma G could be seen circulating within the cyclone separator 610. Within the eye or vortex of the whirling plasma G was a central core devoid of any visible plasma.

The cyclone separator 610 was removed to conduct another test. To determine the capabilities of the Solid Oxide Plasma Arc Torch System as shown in FIG. 6, the pump 22 was turned off and the system was operated only on air provided by compressor 21 and gases B produced from the solid oxide cell 500. Next, 3-way valve 606 was slowly closed in order to force all of the gases through the arc to form a large plasma G exiting from the hollow carbon anode 35.

Next, the 3-way valve 604 was slowly closed to shut the flow of air to the plasma arc torch 100. What happened was completely unexpected. The intensity of the light from the sightglass 33 increased dramatically and brilliant plasma was discharged from the plasma arc torch 100. When viewed with a welding shield the arc was blown out of the plasma arc torch 100 and wrapped back around to the anode 35. Thus, the Solid Oxide Plasma Arc Torch System will produce a gas and plasma suitable for welding, melting, cutting, spraying and chemical reactions such as pyrolysis, gasification and water gas shift reaction.

Example 3—Phosphogypsum Pond Water

The phosphate industry has truly left a legacy in Florida, Louisiana and Texas that will take years to cleanup— gypsum stacks and pond water. On top of every stack is a pond. Pond water is recirculated from the pond back down to the plant and slurried with gypsum to go up the stack and allow the gypsum to settle out in the pond. This cycle continues and the gypsum stack increases in height. The gypsum is produced as a byproduct from the ore extraction process.

There are two major environmental issues with every gyp stack. First, the pond water has a very low pH. It cannot be discharged without neutralization. Second, the phosphogypsum contains a slight amount of radon. Thus, it cannot be used or recycled to other industries. The excess water in combination with ammonia contamination produced during the production of $P_2O_5$ fertilizers such as diammonium phosphate ("DAP") and monammonium phosphate ("MAP") must be treated prior to discharge. The excess pond water contains about 2% phosphate a valuable commodity.

A sample of pond water was obtained from a Houston phosphate fertilizer company. The pond water was charged to the solid oxide cell 500. The Solid Oxide Plasma Arc Torch System was configured as shown in FIG. 6. The 3-way valve 606 was adjusted to flow only air into the plasma arc torch 100 while pulling a vacuum on cell 500 via eductor 602. The hollow anode 35 was blocked in order to maximize the flow of gases I to hydrocyclone 608 that had a closed bottom with a small collection vessel. The hydrocyclone 608 was immersed in a tank in order to cool and recover condensable gases.

Figure 10:
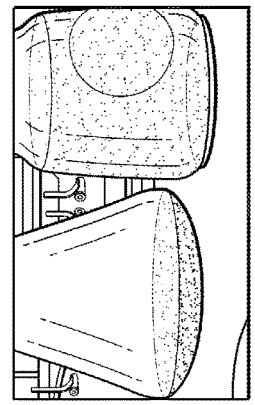
FIG. 10 is a table showing the results of the tailings pond water and solids analysis treated with one embodiment of the present invention.

The results are disclosed in FIG. 10—Tailings Pond Water Results. The goal of the test was to demonstrate that the Solid Oxide Glow Discharge Cell could concentrate up the tailings pond water. Turning now to cycles of concentration, the percent $P_2O_5$ was concentrated up by a factor of 4 for a final concentration of 8.72% in the bottom of the HiTemper™ cell 500. The beginning sample as shown in the picture is a colorless, slightly cloudy liquid. The bottoms or concentrate recovered from the HiTemper cell 500 was a dark green liquid with sediment. The sediment was filtered and are reported as SOLIDS (Retained on Whatmann #40 filter paper). The percent $SO_4$ recovered as a solid increased from 3.35% to 13.6% for cycles of concentration of 4. However, the percent Na recovered as a solid increased from 0.44% to 13.67% for cycles of concentration of 31.

The solid oxide or solid electrolyte 424 used in the cell 500 were floral marbles (Sodium Oxide). Floral marbles are made of sodium glass. Not being bound by theory it is believed that the marbles were partially dissolved by the phosphoric acid in combination with the high temperature glow discharge. Chromate and Molybdenum cycled up and remained in solution due to forming a sacrificial anode from the stainless steel vessel 402. Note: Due to the short height of the cell carryover occurred due to pulling a vacuum on the cell 500 with eductor 602. In the first run (row 1 HiTemper) of FIG. 10 very little fluorine went overhead. That had been a concern from the beginning that fluorine would go over head. Likewise about 38% of the ammonia went overhead. It was believed that all of the ammonia would flash and go overhead.

A method has been disclosed for concentrating $P_2O_5$ from tailings pond for subsequent recovery as a valuable commodity acid and fertilizer.

Now, returning back to the black liquor sample, not being bound by theory it is believed that the black liquor can be recaustisized by simply using CaO or limestone as the solid oxide electrolyte 424 within the cell 500. Those who are skilled in the art of producing pulp and paper will truly understand the benefits and cost savings of not having to run a lime kiln. However, if the concentrated black liquor must be gasified or thermally oxidized to remove all carbon species, the marbles 424 can be treated with the plasma arc torch 100. Referring back to FIG. 6, the marbles 424 coated with the concentrated black liquor or the concentrated black liquor only is injected between the plasma arc torch 100 and the cyclone separator 610. This will convert the black liquor into a green liquor or maybe a white liquor. The marbles 424 may be flowed into the plasma arc torch nozzle 31 and quenched in the whirling lime water and discharged via volute 34 into hydrocyclone 608 for separation and recovery of both white liquor and the marbles 424. The lime will react with the NaO to form caustic and an insoluble calcium carbonate precipitate.

Example 4—Evaporation, Vapor Compression and Steam Generation for EOR and Industrial Steam Users Turning to FIG. 4, several oilfield wastewaters were evaporated in the cell 400. In order to enhance evaporation the suction side of a vapor compressor (not shown) can be connected to upper outlet 410. The discharge of the vapor compressor would be connected to 416. Not being bound by theory, it is believed that alloys such as Kanthal® manufactured by the Kanthal® corporation may survive the intense effects of the cell as a tubular cathode 412, thus allowing for a novel steam generator with a superheater by flowing the discharge of the vapor compressor through the tubular cathode 412. Such an apparatus, method and process would be widely used throughout the upstream oil and gas industry in order to treat oilfield produced water and frac flowback.

Several different stainless steel tubulars were tested within the cell 500 as the cathode 12. In comparison to the sheath glow discharge the tubulars did not melt. In fact, when the tubulars were pulled out, a marking was noticed at every point a marble was in contact with the tube.

This gives rise to a completely new method for using glow discharge to treat metals.

Example 5—Treating Tubes, Bars, Rods, Pipe or Wire

There are many different companies applying glow discharge to treat metal. However, many have companies have failed miserably due to arcing over and melting the material to be coated, treated or descaled. The problem with not being able to control voltage leads to spikes. By simply adding sand or any solid oxide to the cell and feeding the tube cathode 12 through the cell 500 as configured in FIG. 2, the tube, rod, pipe, bars or wire can be treated at a very high feed rate.

Example 6—Solid Oxide Plasma Arc Torch

There truly exists a need for a very simple plasma torch that can be operated with dirty or highly polluted water such as sewage flushed directly from a toilet which may contain toilet paper, feminine napkins, fecal matter, pathogens, urine and pharmaceuticals. A plasma torch system that could operate on the aforementioned waters could potentially dramatically affect the wastewater infrastructure and future costs of maintaining collection systems, lift stations and wastewater treatment facilities.

By converting the contaminated wastewater to a gas and using the gas as a plasma gas could also alleviate several other growing concerns—municipal solid waste going to landfills, grass clippings and tree trimmings, medical waste, chemical waste, refinery tank bottoms, oilfield wastes such as drill cuttings and typical everyday household garbage. A simple torch system which could handle both solid waste and liquids or that could heat a process fluid while gasifying biomass or coal or that could use a wastewater to produce a plasma cutting gas would change many industries overnight.

One industry in particular is the metals industry. The metals industry requires a tremendous amount of energy and exotic gases for heating, melting, welding, cutting and machining.

Figure 8:
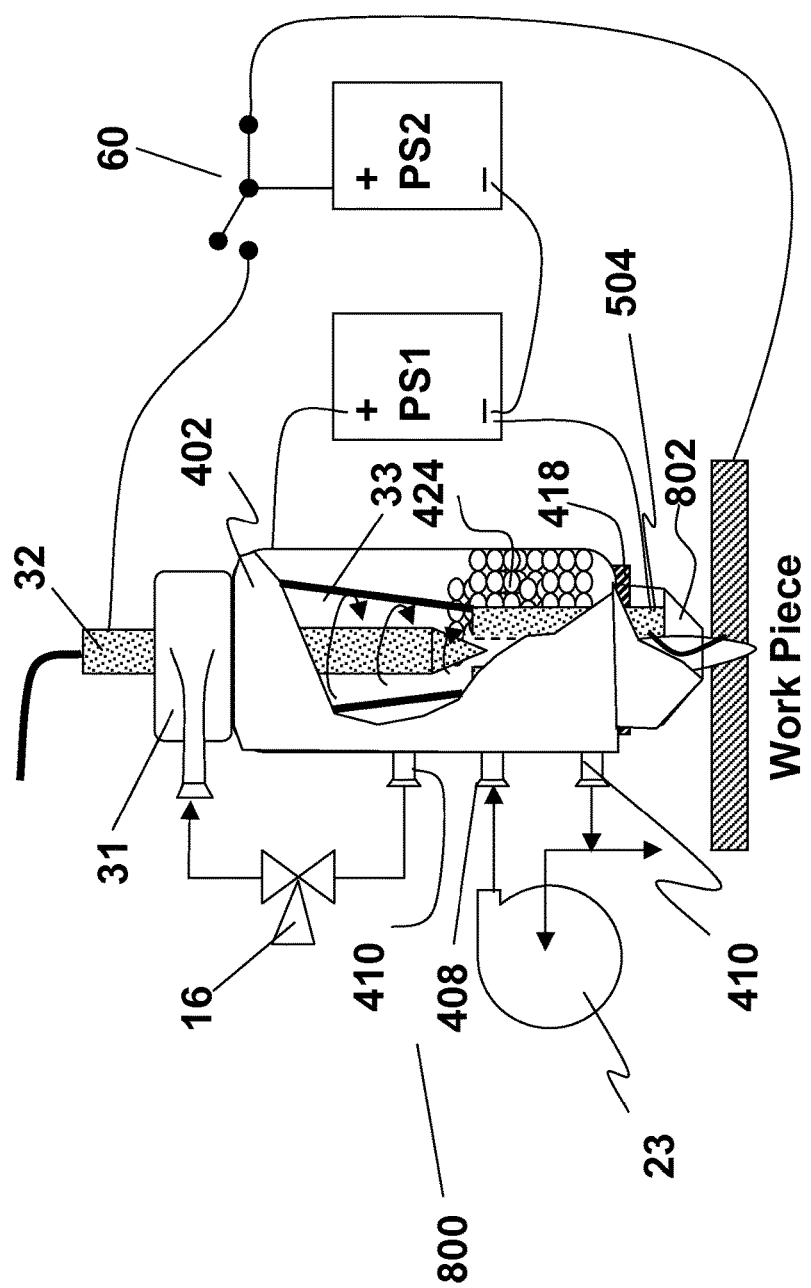
FIG. 8 is a cross-sectional view of a Solid Oxide Transferred Arc Plasma Torch in accordance with another embodiment of the present invention.
Figure 9:
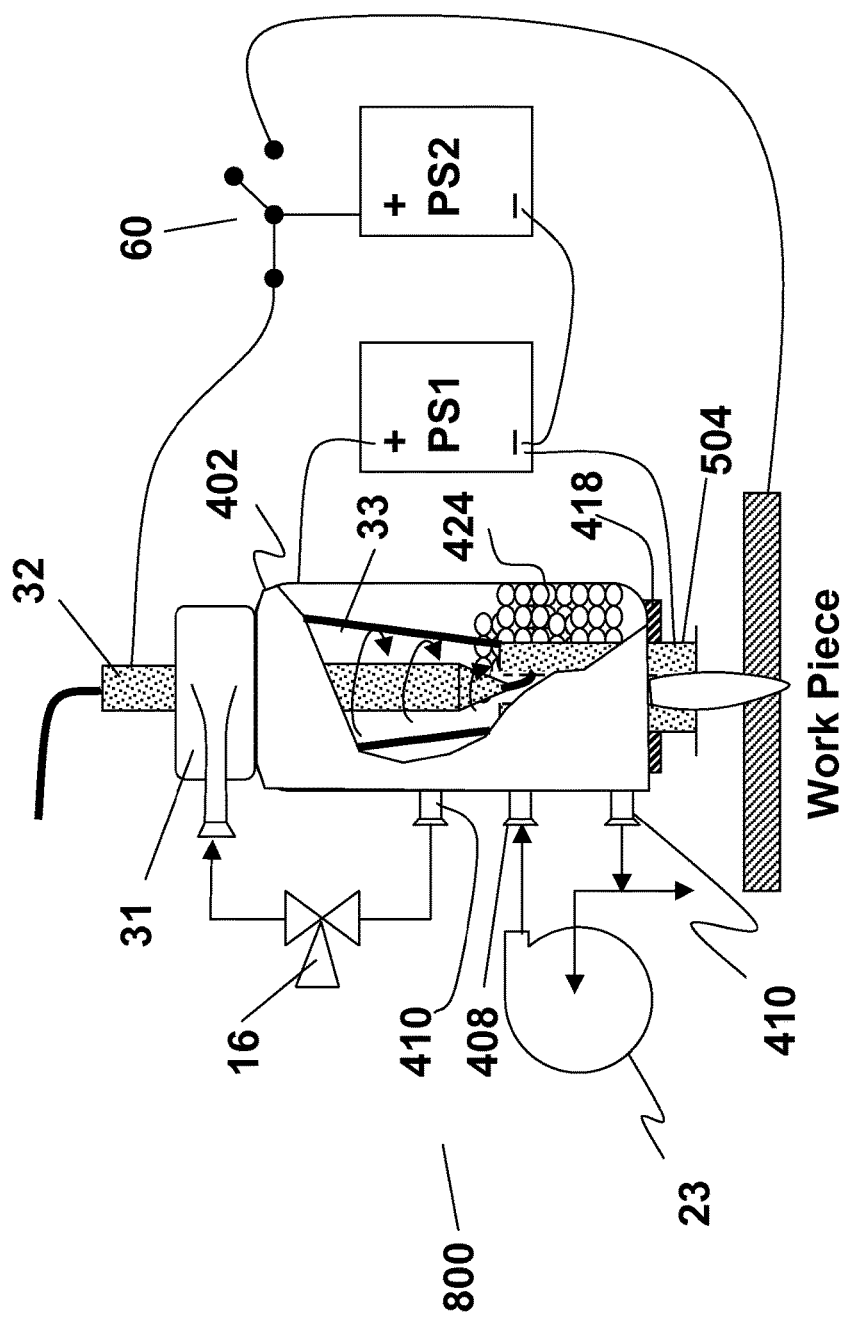
FIG. 9 is a cross-sectional view of a Solid Oxide Non-Transferred Arc Plasma Torch in accordance with another embodiment of the present invention.

Turning now to FIGS. 8 and 9, a truly novel plasma torch 800 will be disclosed in accordance with the preferred embodiments of the present invention. First, the Solid Oxide Plasma Torch is constructed by coupling the plasma arc torch 100 to the cell 500. The plasma arc torch volute 31 and electrode 32 are detached from the eductor 602 and sightglass 33. The plasma arc torch volute 31 and electrode assembly 32 are attached to the cell 500 vessel 402. The sightglass 33 is replaced with a concentric type reducer 33. It is understood that the electrode 32 is electrically isolated from the volute 31 and vessel 402. The electrode 32 is connected to a linear actuator (not shown) in order to strike the arc.

Continuous Operation of the Solid Oxide Transferred Arc Plasma Torch 800 as shown in FIG. 8 will now be disclosed for cutting or melting an electrically conductive workpiece. A fluid is flowed into the suction side of the pump and into the cell 500. The pump is stopped. A first power supply PS1 is turned on thus energizing the cell 500. As soon as the cell 500 goes into glow discharge and a gas is produced valve 16 opens allowing the gas to enter into the volute 31. The volute 31 imparts a whirl flow to the gas. A switch 60 is positioned such that a second power supply PS2 is connected to the workpiece and the −negative side of PS2 is connected to the −negative of PS1 which is connected to the centered cathode 504 of the cell 500. The entire torch is lowered so that an electrically conductive nozzle 13-C touches and is grounded to the workpiece. PS2 is now energized and the torch is raised from the workpiece. An arc is formed between cathode 504 and the workpiece.

Centering the Arc—If the arc must be centered for cutting purposes, then PS2's—negative lead would be attached to the lead of switch 60 that goes to the electrode 32. Although a series of switches are not shown for this operation, it will be understood that in lieu of manually switching the negative lead from PS2 an electrical switch similar to 60 could be used for automation purposes. The +positive lead would simply go to the workpiece as shown. A smaller electrode 32 would be used such that it could slide into and through the hollow cathode 504 in order to touch the workpiece and strike an arc. The electrically conductive nozzle 802 would be replaced with a non-conducting shield nozzle. This setup allows for precision cutting using just wastewater and no other gases.

Turning to FIG. 9, the Solid Oxide Non-Transferred Arc Plasma Torch 800 is used primarily for melting, gasifying and heating materials while using a contaminated fluid as the plasma gas. Switch 60 is adjusted such that PS2+lead feeds electrode 32. Once again electrode 32 is now operated as the anode. It must be electrically isolated from vessel 402. When gas begins to flow by opening valve 16 the volute 31 imparts a spin or whirl flow to the gas. The anode 32 is lowered to touch the centered cathode 504. An arc is formed between the cathode 32 and anode 504. The anode may be hollow and a wire may be fed through the anode 504 for plasma spraying, welding or initiating the arc.

The entire torch is regeneratively cooled with its own gases thus enhancing efficiency. Likewise, a waste fluid is used as the plasma gas which reduces disposal and treatment costs. Finally, the plasma may be used for gasifying coal, biomass or producing copious amounts of syngas by steam reforming natural gas with the hydrogen and steam plasma.

Both FIGS. 8 and 9 have clearly demonstrated a novel Solid Oxide Plasma Arc Torch that couples the efficiencies of high temperature electrolysis with the capabilities of both transferred and non-transferred arc plasma torches.

Example 7—Multi-Mode Plasma Arc Torch

Figure 11:
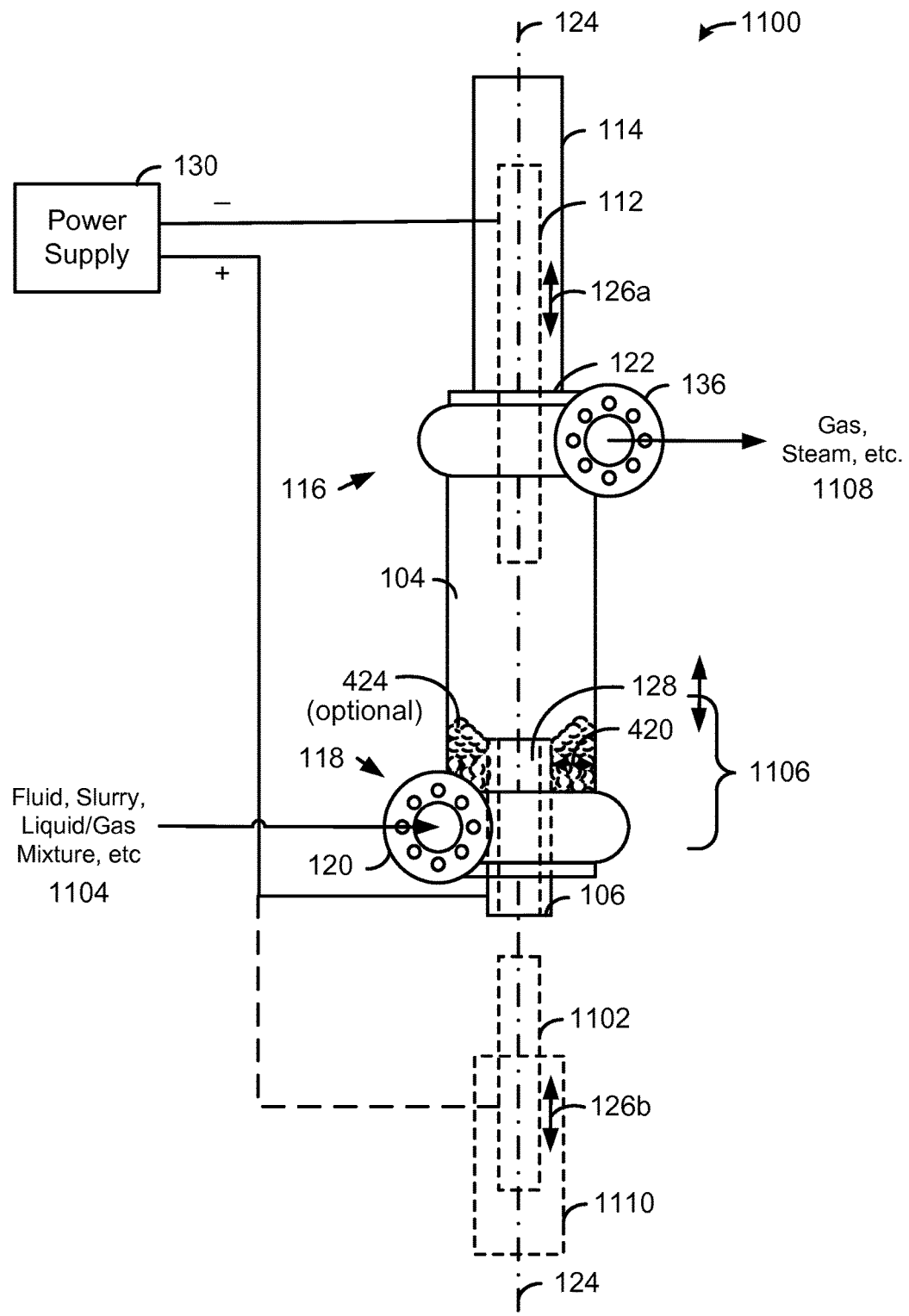
FIG. 11 is a cross-sectional view of a Multi-Mode Plasma Arc Torch in accordance with another embodiment of the present invention.

Now referring to FIG. 11, a multi-mode plasma arc torch 1100 in accordance with one embodiment of the present invention is shown. The multi-mode plasma arc torch 1100 is a plasma arc torch 100 of FIG. 1 that is modified to include some of the attributes of the glow discharge cell 500 of FIG. 5. The multi-mode plasma arc torch 1100 includes a cylindrical vessel 104 having a first end 116 and a second end 118. A tangential inlet 120 is connected to or proximate to the second end 118 and a tangential outlet 136 is connected to or proximate to the first end 116. An electrode housing 122 is connected to the first end 116 of the cylindrical vessel 104 such that a first electrode 112 is aligned with the longitudinal axis 124 of the cylindrical vessel 104, extends into the cylindrical vessel 104, and can be moved along the longitudinal axis 124. Moreover, a linear actuator 114 is connected to the first electrode 112 to adjust the position of the first electrode 112 within the cylindrical vessel 104 along the longitudinal axis of the cylindrical vessel 124 as indicated by arrows 126a. The hollow electrode nozzle 106 is connected to the second end 118 of the cylindrical vessel 104 such that the centerline of the hollow electrode nozzle 106 is aligned with the longitudinal axis 124 of the cylindrical vessel 104. In the embodiment shown, the tangential inlet 120 is volute attached to the second end 118 of the cylindrical vessel 104, the tangential outlet 136 is a volute attached to the first end 116 of the cylindrical vessel 104, the electrode housing 122 is connected to the outlet volute 102, and the hollow electrode nozzle 106 (cylindrical configuration) is connected to the inlet volute 120. Note that the multi-mode plasma arc torch 1100 is not shown to scale.

A substantially equidistant gap 420 is maintained between the cylindrical vessel 402 and the hollow electrode nozzle 106. In some embodiments, a non-conductive granular material 424 is disposed within the gap 420, wherein an optional non-conductive granular material 424 allows an electrically conductive fluid to flow between the cylindrical vessel 402 and the hollow electrode nozzle 106. In other embodiments, the non-conductive granular material 424 is not used. Note that using the non-conductive granular material 424 improves the efficiency of the device by increasing the contact surface area for the fluid, but is not required. If the cylindrical vessel 402 is metallic, the non-conductive granular material 424 can prevent electrical arcing between the cylindrical vessel 402 and the hollow electrode nozzle 106 during a electric glow discharge. The shape of the hollow portion 128 of the hollow electrode nozzle 106 can be varied as needed to provide the desired operational results as shown in FIGS. 13A-F and 16. Other shapes can be used.

A power supply 130 is electrically connected to the multi-mode plasma arc torch 1100 such that the first electrode 112 serves as the cathode and the hollow electrode nozzle 106 serves as the anode. The voltage, power and type of the power supply 130 are dependent upon the size, configuration and function of the multi-mode plasma arc torch 1100.

Figure 12:
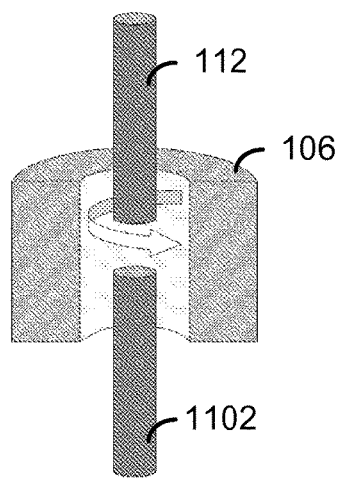
FIG. 12 is illustrates a second electrode for use with the Multi-Mode Plasma Arc Torch in accordance with another embodiment of the present invention.

In some embodiments, a second electrode 1102 and second linear actuator 1110 can be added as an (+) anode, such as a graphite electrode, along the longitudinal axis 124 to dead short to the first electrode 112 (−) cathode. This configuration allows for continuous feed of electrodes 112 and 1102 for continuous duty operation and/or to increase the life of the anode nozzle 106. Like the first electrode 112, the second electrode 1102 can be moved in either direction along the longitudinal axis 124 using the second linear actuator 1110 as shown by arrow 126b. Furthermore, as shown in FIG. 12, the second electrode 1102 allows for operating in a plasma arc mode by dead shorting the first electrode 112 and the second electrode 1102 together and then separating them to draw the arc.

Figure 13A:
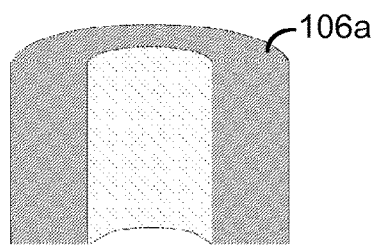
FIGS. 13A-13F are cross-sectional views of various shapes for the hollow electrode nozzle in accordance with another embodiment of the present invention.
Figure 13B:
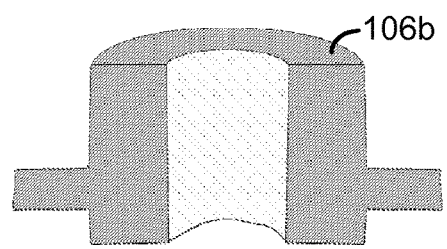
Figure 13C:
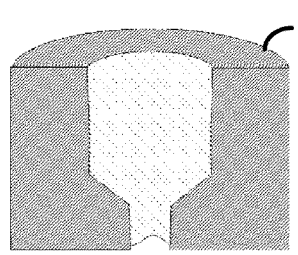
Figure 13D:
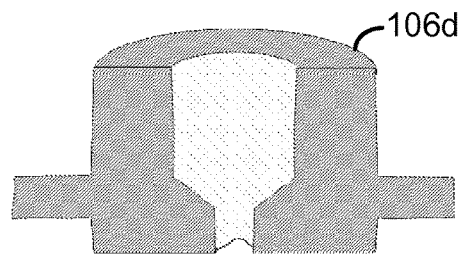
Figure 13E:
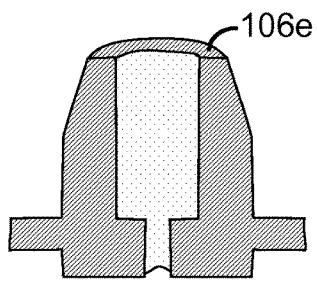
Figure 13F:
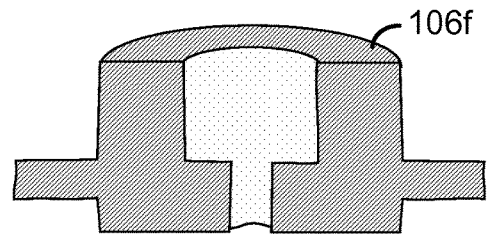
Figure 14:
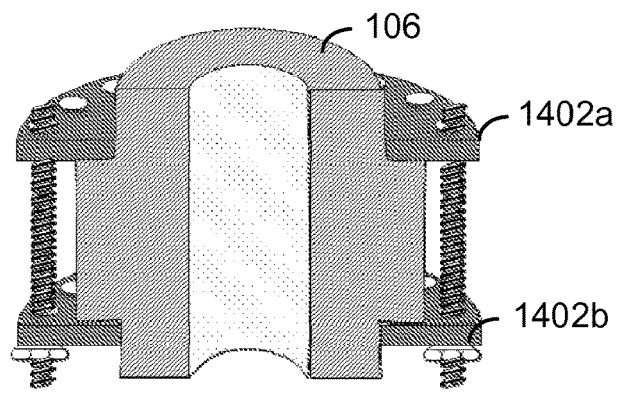
FIG. 14 is a cross-sectional view of an anode nozzle flange mounted assembly for the Multi-Mode Plasma Arc Torch in accordance with another embodiment of the present invention.

Referring now to FIGS. 13A-13F, various examples of shapes for the hollow electrode nozzle 106 are shown. FIG. 13A shows a straight hollow electrode nozzle 106a. FIG. 13B shows a straight hollow electrode nozzle flange 106b. FIG. 13C shows a tapered hollow electrode nozzle 106c. FIG. 13D shows a tapered hollow electrode nozzle flange 106d. FIG. 13E shows a hollow electrode nozzle counterbore flange 106e. FIG. 13F shows a hollow electrode nozzle counterbore exterior tapered flange 106f. Note that FIG. 12 shows a hollow electrode nozzle counterbore 106. Other shapes can be used as will be appreciated by those skilled in the art. FIG. 14 shows a method for securing the (+) hollow electrode nozzle 106 to the volute of plasma arc torch 100 or 1100 using flanges 1402a, 1402b as a coupling means. It will be understood that any type of coupler that will hold and secure the (+) hollow electrode nozzle 106 will suffice for use in the present invention. Likewise, using couplers or flanges on both sides of the (+) hollow electrode nozzle 106 allows for it to be flipped and used as a protruding or reducer type coupling nozzle.

Figure 15:
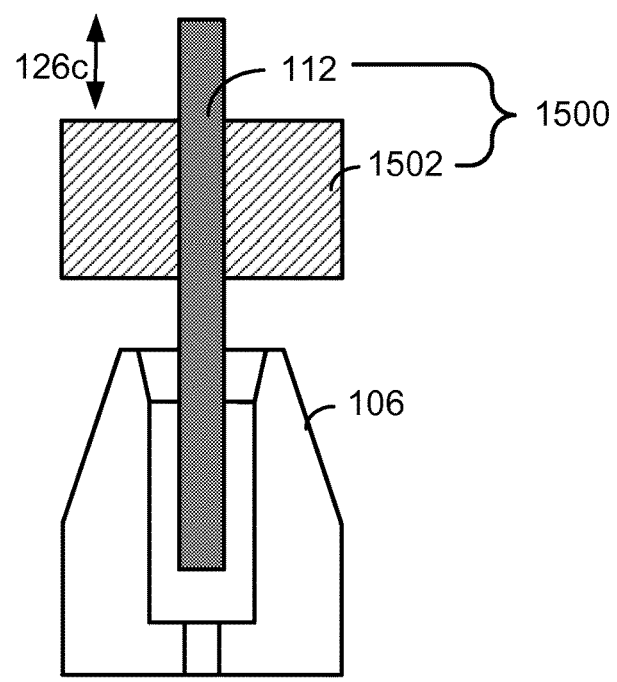
FIG. 15 is a cross-sectional view of dual first electrode configuration in accordance with another embodiment of the present invention.

Now referring to FIG. 15, a diagram of a dual first electrode 1500 in accordance with another embodiment of the present invention is shown. The dual first electrode 1500 is a combination of the first electrode 112 and a larger diameter, but shorter, third electrode 1502 that is either electrically connected to the first electrode 112 or the power supply 130 (same polarity as the first electrode 112). The third electrode 1502 can be moved up and down independently from the first electrode 112 as indicated by arrows 126c. Moreover, the third electrode 1502 can be physically connected to the first electrode 112. The third electrode 1502 provides additional electrode surface area to enhance the process.

Figure 16:
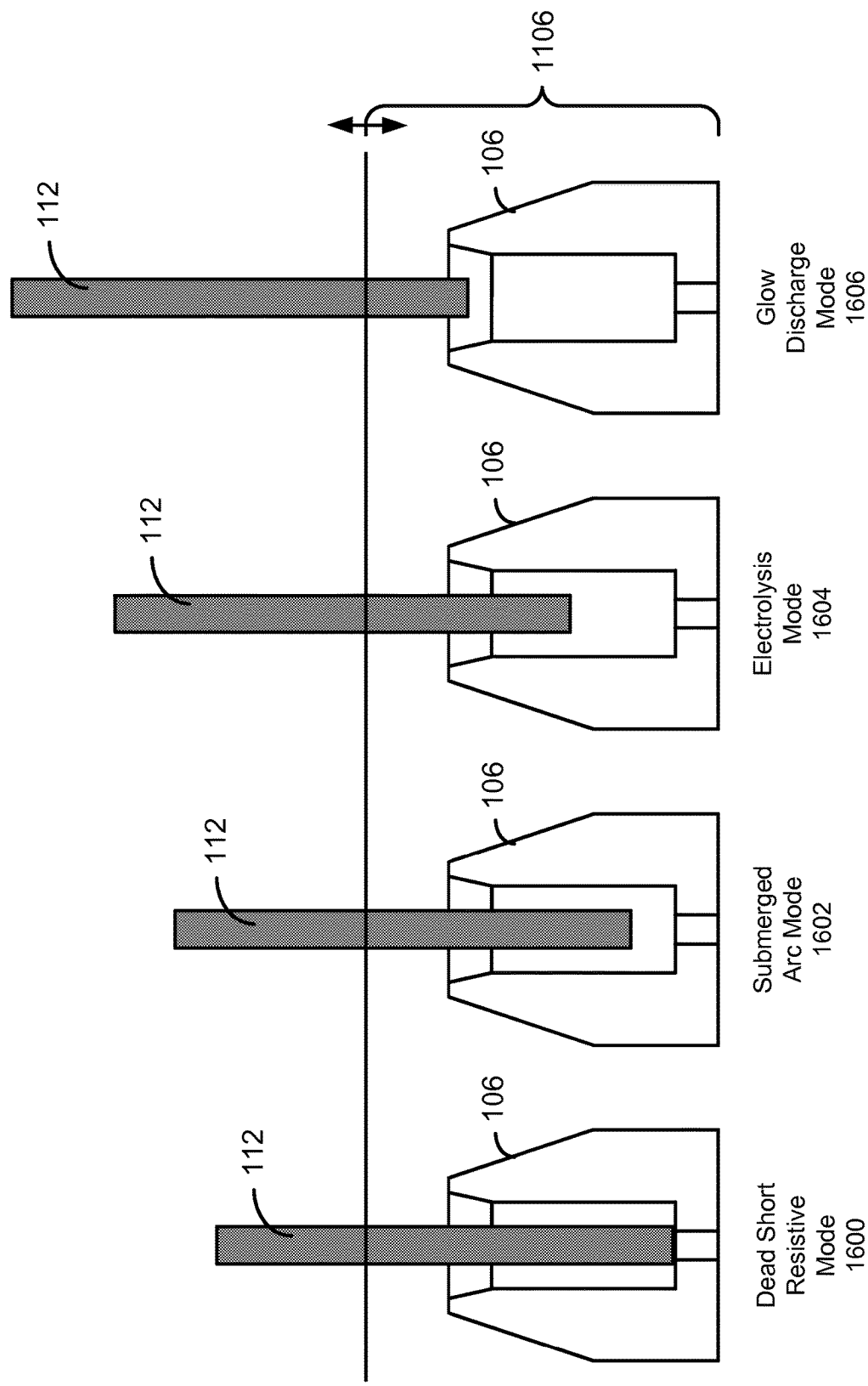
FIG. 16 illustrates a first electrode positions to operate a Multi-Mode Plasma Arc Torch in accordance with another embodiment of the present invention.

Referring now to FIGS. 11 and 16, a fluid, slurry, liquid/gas mixture or other pumpable material 1104 is introduced into the tangential inlet 120 to a desired fluid level 1106, which can vary based on the desired operational results, within the cylindrical vessel 104. Note that the actual level will typically fluctuate during operation. During startup, the linear actuator 114 moves the first electrode 112 into contact with the hollow electrode nozzle 106 or the second electrode 1102 and then either leaves the first electrode 112 there (dead short resistive heating mode 1600) or draws the first electrode 112 back a specified distance yet remains below the desired fluid level 1106. The linear actuator 114 can adjust the position of the first electrode 112 to operate the multi-mode plasma arc torch 1100 in a dead short resistive mode 1600, a submerged arc mode 1602, an electrolysis mode 1604 or a glow discharge mode 1606. As the fluid 1104 is heated in accordance with one of these four operating modes, gases or steam 1108 will rise and exit through tangential outlet 136. The fluid 1104 can be recirculated by allowing the fluid 1104 to flow through the hollow electrode nozzle 106 and reenter the cylindrical vessel 104 via tangential inlet 120. Note that the fifth operating mode is the plasma arc mode as described and shown in FIG. 1.

Figure 17:
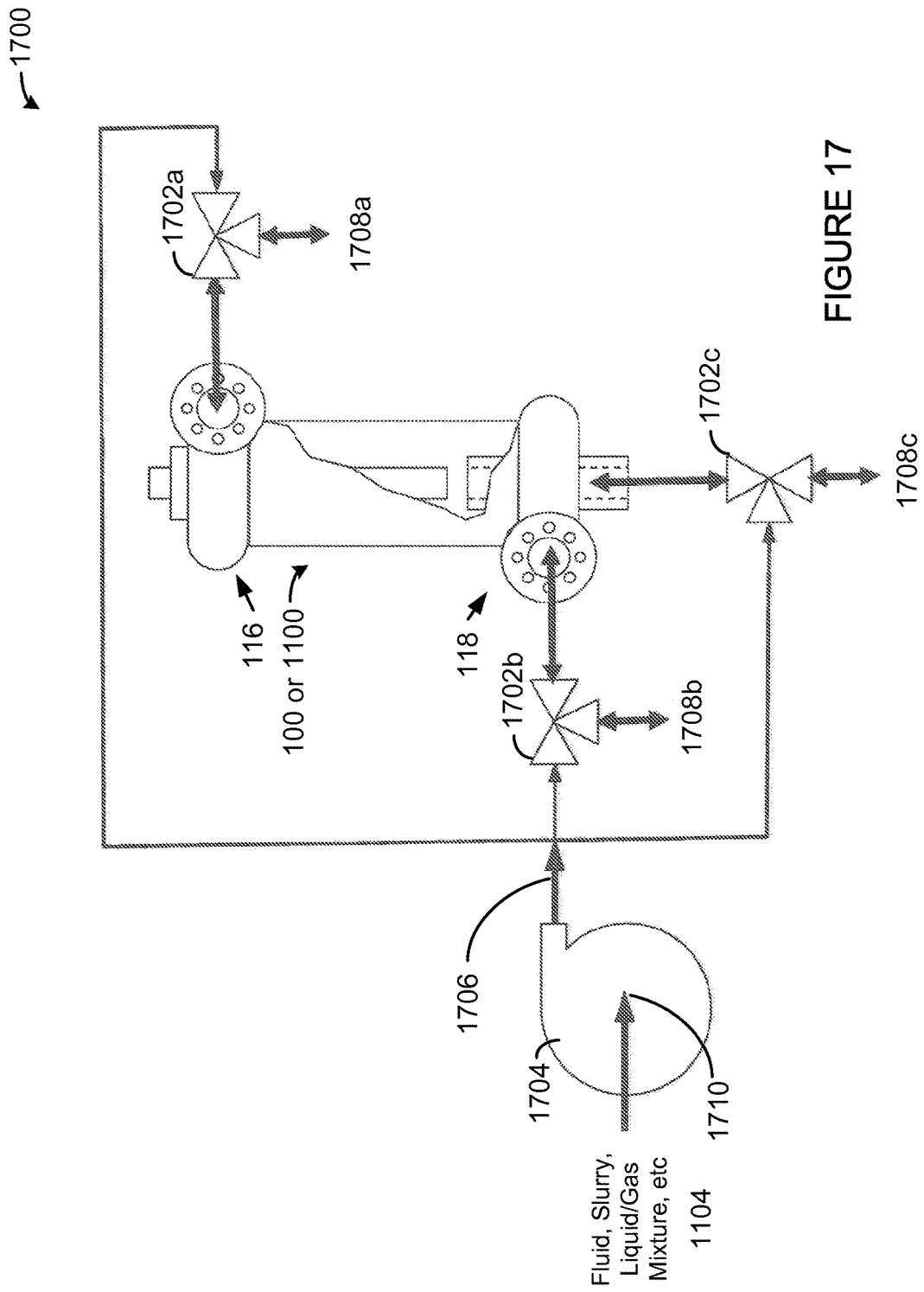
FIG. 17 is a block diagram of a system for operating the Multi-Mode Plasma Arc Torch in five different modes in accordance with another embodiment of the present invention.

Referring now to FIG. 17, a diagram of a system 1700 to operate the plasma arc torch 100 or 1100 in five operating modes in accordance with the present invention is show. The system 1700 includes a plasma arc torch 100 or 1100, 3 three-way valves 1702a, 1702b, 1702c and a pump and/or compressor 1704. The first three-way valve 1702a is connected to the inlet/outlet (depends on the operating mode) located at the first end 116 of the plasma arc torch 100 or 1100, and has a first valve inlet/outlet (depends on the operating mode) 1708a. The second three-way valve 1702b is connected to the inlet/outlet (depends on the operating mode) located at the second end 118 of the plasma arc torch 100 or 1100, and has a second valve inlet/outlet (depends on the operating mode) 1708b. The third three-way valve 1702c is connected to the exterior end of the hollow electrode nozzle 106, and has a third valve inlet/outlet (depends on the operating mode) 1708c. Each of the three-way valves 1702a, 1702b, 1702c are connected to the discharge 1706 of the pump and/or compressor 1704. The fluid, slurry, liquid/gas mixture or other pumpable/compressible material 1104 enters the suction 1710 of the pump and/or compressor 1704. The three-way valves 1702 are adjusted to operate the plasma arc torch 100 or 1100 in the five modes, while adjusting the first electrode 112 with the linear actuator 114.

Operating Mode 1: Plasma Arc
 a. Compressed and/or pressurized fluid 1104 from a pump/compressor 1704 is flowed into three-way valve 1702a and then into plasma arc torch 100 or 1100.
 b. Three-way valve 1702b is fully open to allow fluid to flow out of plasma arc torch 100 or 1100 and to outlet 1708b.
 c. Three-way valve 1702c is fully open to flow to outlet 1708c.
 d. Ensure (−) first electrode 112 is dead shorted to (+) hollow electrode nozzle 106.
 e. Ensure whirl glow is established.
 f. Turn power supply 1300N.
 g. Using linear Actuator 114 pull back the (−) first electrode 112 to establish and arc.
 h. Arc is transferred from (−) to (+).
 i. Whirling gas flowing through (+) hollow electrode nozzle 106 forms a plasma.
 j. Very small plasma may be discharged through outlet 1708c.
 k. Three-way valve 1702b may be throttled to increase/decrease plasma flow through (+) hollow electrode nozzle 106 and outlet 1708c.
 l. Three-way valve 1702b may be shut to flow all fluid into (+) hollow electrode nozzle 106 and outlet 1708c.

Operating Mode 2: Resistive Heating
 a. Compressed and/or pressurized fluid 1104 from a pump/compressor 1704 is flowed into three-way valve 1702b and then into plasma arc torch 100 or 1100
 b. Three-way valve 1702a is fully open to flow out of plasma arc torch 100 or 1100 and to outlet 1708a.
 c. Three-way valve 1702b is throttled to allow fluid to flow into plasma arc torch 100 or 1100 very slowly.
 d. Three-way valve 1702c is shut.
 e. The (−) first electrode 112 is dead shorted to (+) hollow electrode Nozzle 106.
 f. Power supply 130 is turned ON.
 g. Resistive mode begins.
 h. Vapors exit through three-way valve 1702a and outlet 1708a Operating Mode 3: Submerged Arc
 a. Valves remain aligned as in Operating Mode 2 above.
 b. Power supply 130 is still ON.
 c. The (−) first electrode 112 is slowly within drawn from (+) hollow electrode nozzle 106.
 d. The system shifts from resistive heating to submerged arc mode.
 e. Three-way valve 1702c may be opened to allow pressurized fluid from pump/compressor 1704 to flow through (+) hollow electrode nozzle 106 and into plasma arc torch 100 or 1100.
 f. Vapors exit the plasma arc torch 100 or 1100 through outlet 1708a.

Operating Mode 4: Electrolysis
 a. Valves remain aligned as in Operating Mode 2 above.
 b. Power supply 130 is still ON.
 c. The (−) first electrode 112 is slowly within drawn further from (+) hollow electrode nozzle 106 using linear actuator 114.
 d. The system shifts from submerged arc to electrolysis mode.

Operating Mode 5: Glow Discharge
 a. Valves remain aligned as in Operating Mode 2 above.
 b. Power supply 130 is still ON.
 c. The (−) first electrode 112 is slowly within drawn further from (+) hollow electrode nozzle 106 using linear actuator 114.
 d. Monitor the power supply 130 voltage.
 e. When the voltage increases to open circuit voltage ("OCV"), the system is operating in glow discharge mode.
 f. The amps will decrease.
 g. Three-way valve 1702b and three-way valve 1702c may be adjusted to allow pressurized flow to enter plasma arc torch 100 or 1100 either through three-way valve 1702b or three-way valve 1702c, and/or three-way valve 1702b and three-way valve 1702c aligned for fluid flow recirculation using pump/compressor 1704.
 h. Vapors exit from plasma arc torch 100 or 1100 and out of outlet 1708a.

Figure 18:
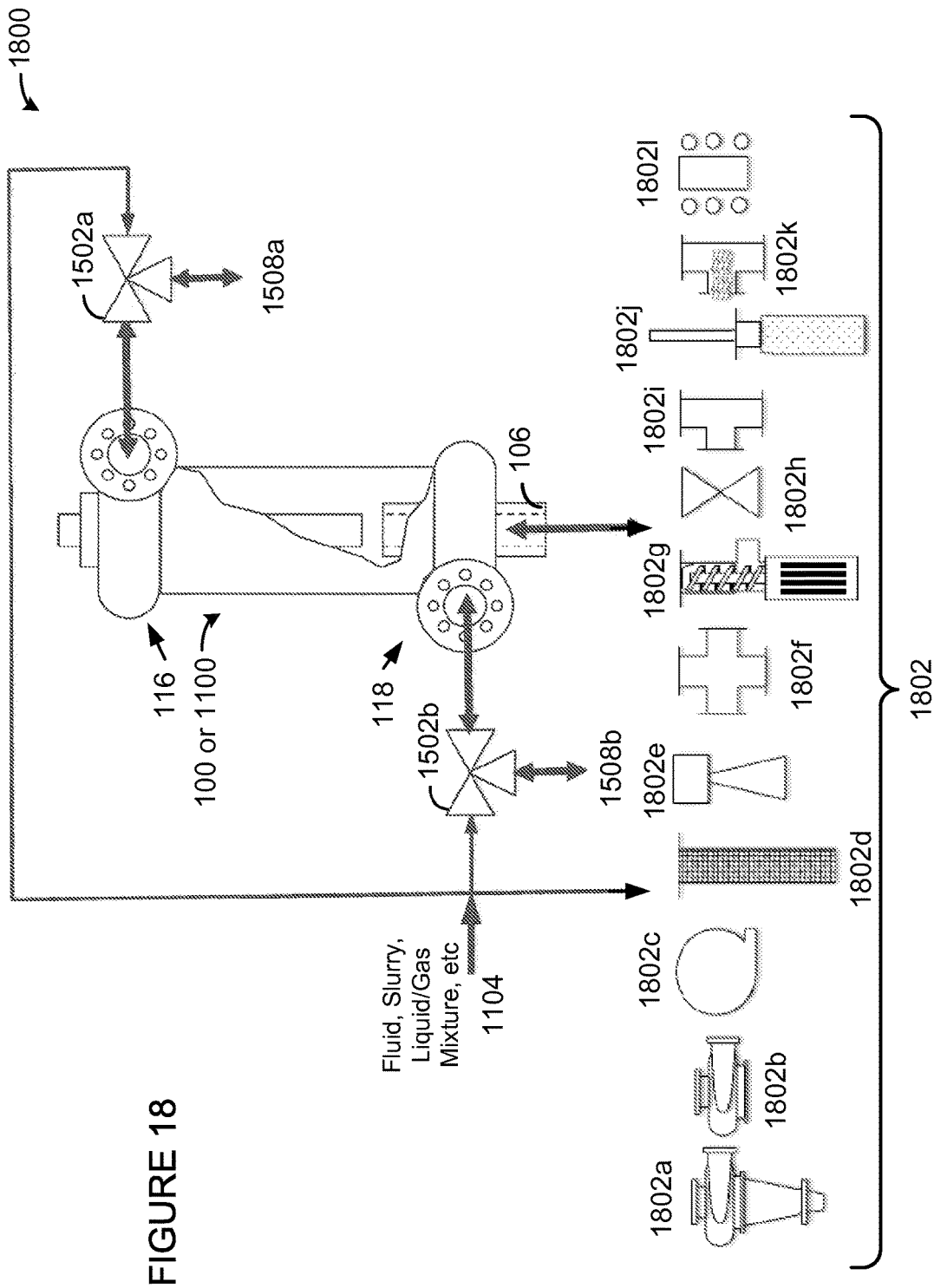
FIG. 18 is a diagram of a Multi-Mode Plasma Arc Torch with various attachment devices in accordance with another embodiment of the present invention.
Figure 19:
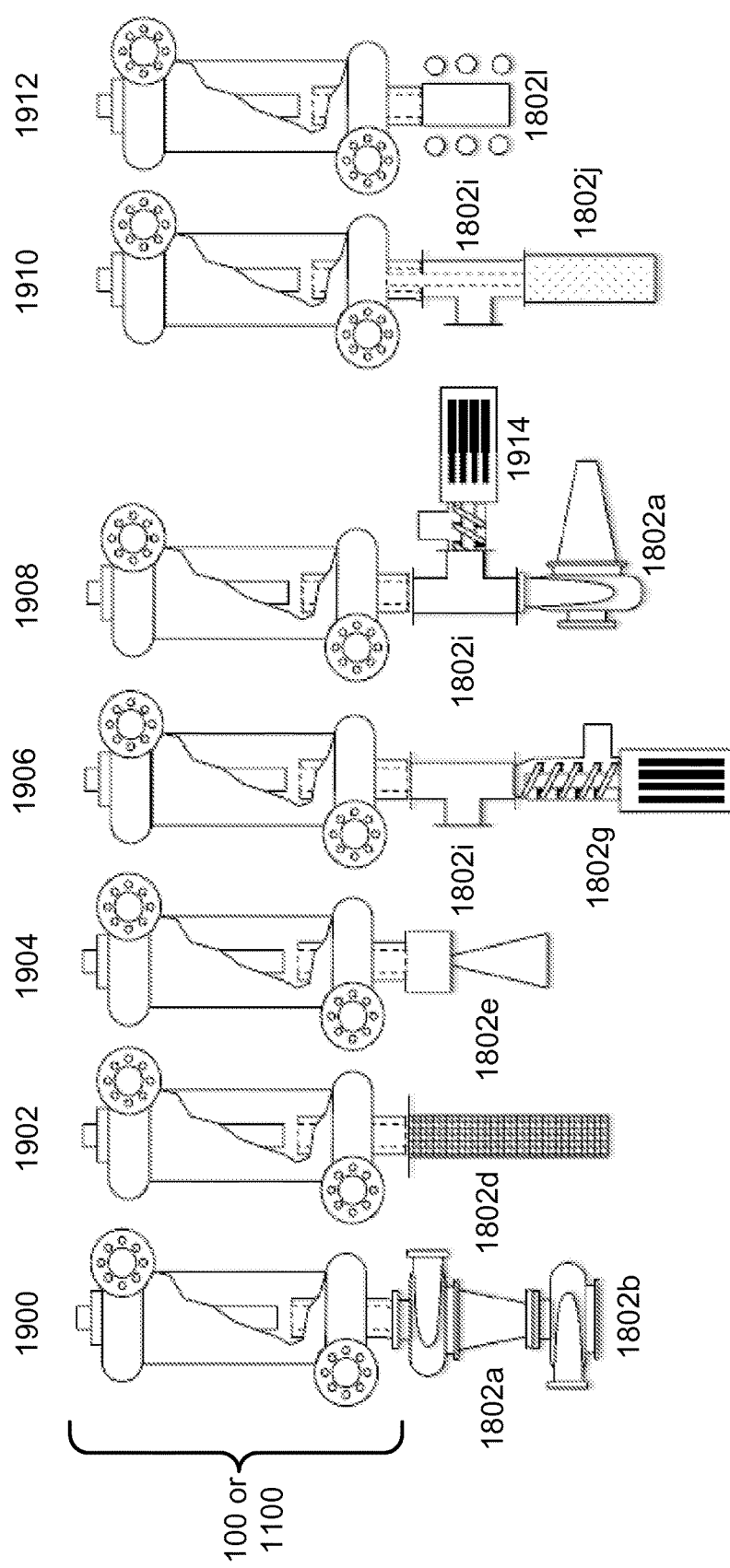
FIG. 19 is a diagram of a Multi-Mode Plasma Arc Torch with various attachment devices in accordance with another embodiment of the present invention.

As shown in FIGS. 18 and 19, the plasma arc torch 100 or 1100 can be adapted for use in many applications by attaching various devices 1802 to the exterior of the hollow electrode nozzle 106 or the three-way valve 1702c. For example, a partial list of attachments 1802 include a cyclone separator 1802a (inlet, vortex collector, overflow or underflow), volute 1802b, pump/compressor 1802c, filter screen 1802d, ejector/eductor 1802e, cross 1802f, screw feeder 1802g, valve 1802h, tee 1802i, electrode & linear actuator 1802j, wave guide 1802k or RF coil 18021 that may be attached alone or in any combination thereof to the (+) anode nozzle 106. Other devices 1802 may include, but is not limited to a vessel, flange, cover, hatch, electrode stinger, injector, screw press, auger, ram feeder, mixer, extruder, T-fired boiler, coker drum, gasifier, pipe, conduit, tubing, submerged melting furnace, rotary kiln, rocket nozzle, thermal oxidizer, cyclone combustor, precombustion chamber, ice screw-in cylinder, turbine combustor, pulse detonation engine, combustion exhaust pipe/stack, thermal oxidizer, flare, water tank, raw sewage pipe, wastewater influent/effluent piping/conduit, anaerobic digester influent/effluent piping, sludge press/centrifuge inlet/outlet piping, potable water piping point of use or point of entry, water storage tank, CNC cutting/welding table, direct contact water heater, wet gas chlorine line/pipe, O&G wellhead, O&G produced water piping, ship ballast water line, engine fuel line, froth flotation inlet/outlet, conduit extending inside tank/vessel, submerged inside tank/vessel, porous tube, wedge wire screen, well screen, filter, activated carbon filter, ceramic filter, cat cracker catalyst recycle line, hospital vacuum suction pump, cooling tower piping, steam separator, superheater, boiler water feedwater piping, RO reject piping, vacuum chamber inlet/outlet, graywater discharge piping, ship ballast water inlet/outlet piping, bilge water inlet/outlet piping, toilet discharge piping, grinder/shredder/macerator discharge piping, and/or kitchen sink garbage disposer outlet piping, nuclear reactor containment building for hydrogen mitigation (hydrogen igniter), infrared heating element/piping, charge heater, furnace and/or coke calciner. It will be understood that the coupling means to attach the device 1802 to the hollow anode nozzle 106 may be selected from any type of coupling device know in the art, ranging from flanges, quick connectors, welding in addition to using the cyclone separator with quick connectors such as sanitary type clamps.

FIG. 19 demonstrates how some of the devices 1802 may be connected to the plasma arc torch 100. System 1900 is a plasma arc torch 100 or 1100 having a cyclone separator 1802a attached to the exterior of the hollow anode nozzle 106 and a volute 1802b attached to the cyclone separator 1802a. System 1902 is a plasma arc torch 100 or 1100 having a filter screen 1802d attached to the exterior of the hollow anode nozzle 106. System 1904 is a plasma arc torch 100 or 1100 having an ejector/eductor 1802e attached to the exterior of the hollow anode nozzle 106. System 1906 is a plasma arc torch 100 or 1100 having a tee 1802i attached to the exterior of the hollow anode nozzle 106 and a screw feeder 1802g attached to the tee 1802i. System 1908 is a plasma arc torch 100 or 1100 having a tee 1802i attached to the exterior of the hollow anode nozzle 106, and an auger 1914 and a cyclone separator 1802a attached to the tee 1802i. System 1910 is a plasma arc torch 100 or 1100 having a tee 1802i attached to the exterior of the hollow anode nozzle 106 and an anode electrode with linear actuator 1802j attached to the tee 1802i. As also referred to in FIG. 12, the anode electrode 1102 with linear actuator 1802j in combination with the anode nozzle 106 form a stopper valve that allows the flow in/out of the (+) anode nozzle to be controlled.

The present invention's plasma arc torch 100 has been tested in the five modes and operated with various attachments coupled to the (+) anode nozzle. The results of these tests will now be described.

Steam Plasma Arc Mode

Referring to FIG. 17, three-way valves 1702a and 11702b were connected to the tangential inlet 118 and tangential outlet 136 of the plasma arc torch 100 disclosed in FIG. 1. During testing with the three-way valve 1702b attached as shown, when the valve 1702b is fully closed, the plasma 108 of FIG. 1 was discharged from the plasma arc torch 100 and was measured with an optical pyrometer. With the gases produced from the cell 500 as shown in FIGS. 6 and 7, the plasma 108 temperature was measured at +3,000° C. (+5,400° F.). With only air, the plasma 108 was measured at +2,100° C. (+3,800° F.). The system was operated with a ceramic tee 1802i attached to the plasma arc torch 100. Likewise, a filter screen 1802d was attached to the plasma arc torch 100. Wood pellets produced with a pelletizer were placed in the filter screen 1802d prior to attaching to the plasma arc torch 100. The steam plasma fully carbonized the wood pellets. The plasma arc torch 100 with an attached filter screen 1802d is particularly useful for remote and/or stand alone water treatment and black water (raw sewage) applications.

Resistive Heating/Dead Short Mode

The plasma arc torch 100 or 1100 is started by dead-shorting the cathode 112 to the anode nozzle 106 with power supply 130 in the off position. Next, the vessel 104 is partially filled by jogging the pump 1704. Next the power supply 130 is turned on allowing the system to operate in a resistive heating mode. The benefit to this system is preventing the formation of gases such as chlorine if sodium chloride is present within the water and/or wastewater. The fluid, water and/or wastewater is heat treated which is commonly referred to as pasteurization.

Submerged Arc Oxidation and Combustion Mode

If the system is to be operated in a submerged arc mode, the cathode 112 is simply withdrawn from the anode nozzle 106. A submerged arc will be formed instantly. This will produce non-condensible gases such as hydrogen and oxygen by splitting water. In order to aid in forming a gas vortex around the arc gases such as but not limited to methane, butane, propane, air, oxygen, nitrogen, argon, hydrogen, carbon dioxide, argon, biogas and/or ozone or any combination thereof can be added between the pump and inlet 1702a or 1702b with an injector (not shown). However, it is well known that hydrogen peroxide will convert to oxygen and water when irradiated with UV light. Thus, the plasma arc torch 100 or 1100 will convert hydrogen peroxide to free radicals and oxygen for operation as an advanced oxidation system.

On the other hand, the present invention's submerged arc mode is ideally suited for submerged combustion. It is well known that submerged combustion is very efficient for heating fluids. Likewise, it is well known and understood that gases and condensates are produced along with heavy oil from oil and gas wells. In addition, the oil sands froth flotation process produces tailings and wastewater with residual solvent and bitumen. The remaining fossil fuels left in produced water and/or froth flotation processes can be advantageously used in the present invention. Since the plasma arc torch 100 or 1100 is a cyclone separator then the lighter hydrocarbons will report to the plasma center. Consequently by sparging air into the plasma arc torch 100 or 1100 it can be operated as a submerged arc combustor.

For example, to ensure that the arc is not extinguished a second electrode 1102 can be added to the plasma arc torch 100 or 1100 as shown in system 1910 (FIG. 19). Air and/or an air/fuel mixture can be flowed into the tee 1802i and converted into a rotating plasma arc flame. The fluid to be heated will enter into one volute while exiting the other volute in combination with hot combusted gases. On the other hand, the air/fuel may be added to the fluid entering into the plasma arc torch 100 or 1100. Three-way valve 1702b would be shut. Thus, the mixture of combusted gases and water would flow through the anode nozzle and exit out of the tee 1802i. A volute 1802b or cyclone separator 1802a may be used in lieu of the tee 1802i. If a cyclone separator 1802a is used, then the plasma arc torch 100 or 1100 can be operated as a torch while shooting a plasma into the vortex of the whirlpool of water within the cyclone separator 1802a. The benefit of the second (+) electrode 1102 is to ensure that the arc remains centered and is not blown out. The discharge from the tee 1802i, volute 1802b or cyclone separator 1802a would be flowed into a tank (not shown) or stand pipe thus allowing complete mixture and transfer of heat from the non-condensible gas bubbles to the water/fluid.

Electrolysis Mode

In order to transition to an electrolysis mode the electrode 112 is withdrawn a predetermined distance from the anode nozzle 106 or anode electrode 1102. This distance is easily determined by recording the amps and volts of the power supply as shown by the GRAPH in FIG. 3. The liquid level 1106 is held constant by flowing liquid into the plasma arc torch 100 or 1100 by jogging the pump 1704 or using a variable speed drive pump to maintain a constant liquid level.

Although not shown, a grounding clamp can be secured to the vessel 104 in order to maintain an equidistant gap 420 between the vessel 104 and cathode 112, provided the vessel is constructed of an electrically conducted material. However, the equidistant gap 420 can be maintained between the anode nozzle 106 and cathode 112 and electrically isolating the vessel 104 for safety purposes. Glass and/or ceramic lined vessels and piping are common throughout many industries.

By operating in an electrolysis mode this allows for the production of oxidants in particularly sodium hypochlorite (bleach), if sodium chloride is present or added to the water. Bleach is commonly used on offshore production platforms for disinfecting sponsoon water, potable water and raw sewage. Since electrolysis is occurring between and within the equidistance gap 420 between the (+) anode nozzle 106 and (−) cathode electrode 112 the present invention overcomes the problems associated with electrolyzers used on production platforms as well as ships for ballast water disinfection.

By installing two or more plasma arc torches 100 or 1100, one can be operated in a submerged arc combustion mode, while the other is operated in an electrolysis mode. The submerged plasma arc combustor 1910 would be configured as shown in FIG. 19 with a tee 1802*i* and electrode 1802*j* and an air ejector would siphon the hydrogen generated from the plasma arc torch 100 or 1100. Another benefit for using the plasma arc torch 100 or 1100 in a combustion mode is that the Ultraviolet ("UV") Light produced from the plasma arc and the electrodes will dechlorinate the water thus eliminating adding a reducing agent to the water.

A simple but effective raw sewage system can be constructed by attaching the plasma arc torch 100 or 1100 to a common filter vessel in which the filter screen would be coupled directly to the plasma arc torch 100 or 1100. Referring to FIG. 19 the plasma arc torch 100 or 1100 is coupled to the filter screen 1802*d* in system 1902. The filter screen 1802*d* is then inserted into a common filter vessel up to the filter screen 1802*d* flange. The plasma arc torch 100 or 1100 is operated in an electrolysis mode allowing the raw sewage to flow through the anode nozzle and into the filter screen. Solids would be trapped in the filter screen.

The filter screen can be cleaned by several methods. First the screen can simply be backwashed. Second the screen can be cleaned by simply placing the plasma arc torch 100 or 1100 in a plasma arc mode and either steam reforming the solids or incinerating the solids using an air plasma. However, a third mode can be used which allows for a combination of back washing and glow discharge.

Glow Discharge Mode

To transition to glow discharge mode, the liquid level 1106 is decreased by throttling three-way valve 1702*b* until the plasma arc torch 100 or 1100 goes into glow discharge. This is easily determined by watching volts and amps. When in glow discharge the power supply voltage will be at or near open circuit voltage. However, to rapidly transition from electrolysis to glow discharge the cathode electrode is extracted until the power supply is at OCV. This can be determined by viewing the glow discharge thru a sight glass or watching the voltage meter.

This novel feature also allows for fail safe operation. If the pump 1704 is turned off or fluid flow is stopped then all of the water will be blown down through the anode nozzle 106 of the plasma arc torch 100 or 1100. Electrical flow will stop and thus the system will not produce any gases such as hydrogen.

To control the liquid level a variable speed drive pump in combination with three-way valve 1702*c* may be used to control the liquid level to maintain and operate in a glow discharge mode. Another fail safe feature, such as a spring, can be added to the linear actuator such that the system fails with the cathode fully withdrawn.

The mode of operation can be reversed from glow discharge to electrolysis to arc and then to resistive heating. By simply starting with the cathode 112 above the water level 1106 within the vessel 104, then slowly lowering the cathode 112 to touch the surface of the liquid, the plasma arc torch 100 or 1100 will immediately go into glow discharge mode. Continually lowering the cathode 112 will shift the system to electrolysis then to arc then to resistive heating.

Now to operate the plasma arc torch 100 or 1100 as a plasma torch, water/liquid flow may be reversed and blowdown three-way valve 1702*c* is fully opened to allow the plasma to discharge from the plasma arc torch 100 or 1100. Adding an anode electrode 1102 will aid in maintaining an arc. However, if a sufficient amount of gas in entrained in the water and a gas vortex is formed, the water/liquid can be flowed through the plasma arc torch 100 or 1100 in a plasma arc mode.

Although no granular media is needed for this configuration it will be understood that granular media may be added to enhance performance. Likewise, what has not been previously disclosed is that this configuration always for purging the vessel and removing the granular media by reversing the flow through the system. Referring to FIG. 1 outlet 136 is used as the inlet and inlet 120 is used as the outlet. This configuration will work for any fluid whether it is more dense or less dense than water and/or the liquid flowing through the system. If the material density is greater than the liquid the granular material will flow through 120. If the material is less dense then the liquid then it will flow through the nozzle.

In particularly, remote applications that are in dire need of a solution are potable water treatment and black water (raw sewage) treatment. For example, remote water and wastewater applications can be found on offshore drilling rigs, offshore production platforms, ships, cabins, base camps, military posts/camps, small villages in desert and/or arid environments and many developing countries that do not have centralized water and wastewater treatment facilities. Another remote application is electricity produced from wind and solar farms. Likewise, oil and gas wells that are not placed in production such as stranded gas can be considered a remote application. Also, after a natural disaster, such as a hurricane or tsunami basic services such as garbage/trash collection, water treatment and wastewater treatment facilities may be destroyed, thus there is a dire need for water disinfection as well as raw sewage treatment in addition to handling the buildup of trash.

The inventor of the present invention has tested this configuration with an ESAB EPW 360 power supply. The EPW 360 is a "Chopper" type DC power supply operating at a frequency of 18,000 Hertz. The above described configuration held voltage at an extremely steady state. The discharge 134 was throttled with a valve. Whether the valve was open, shut or throttled the voltage remained rock steady. Likewise, the EPW 360 current control potentiometer was turned down to less than 30 amps and the electrodes were positioned to hold 80 volts. This equates to a power rating of about 2,400 watts. The EPW 360 is rated at 360 amps with an open circuit voltage of 360 VDC. At a maximum power rating of 129,600 watts DC, then: 129,600±2,400=54.

Consequently, the plasma arc torch 100 of the present invention clearly demonstrated a turn down rate of 54 without any additional electronic controls, such as a secondary high frequency power supply. That is virtually unheard of within the plasma torch world. For example, Pyrogensis markets a 25 kw torch operated in the range of 8-25 kW (A 3:1 turn down ratio). Furthermore the present invention's plasma arc torch 100 does not require any cooling water. The Pyrogensis torch requires cooling with deionized water. Deionized ("DI") water is used because the DI water is flowed first into one electrode then into the shield or another part of the torch. Consequently, DI water is used to avoid conducting electricity from the cathode to the anode via the cooling media. In addition, heat rejection is another impediment for using an indirectly cooled plasma torch. An indirectly cooled plasma torch may reject upwards of 30% of the total input power into the cooling fluid.

The plasma arc torch 100 as disclosed in FIGS. 1, 6, 7 is a liquid/gas separator and extreme steam superheater forming an ionized steam/hydrogen plasma when coupled to the glow discharge cell 500 and/or any steam source. As disclosed in FIGS. 6 and 7, the plasma arc torch 100 can easily be controlled by manipulating valves 604 and 606. Moreover, the plasma arc torch 100 as shown in FIG. 1 is similar to a blow-back torch. For example the (−) negative electrode 112 will dead short and shut flow through the (+) anode nozzle 106 by adjusting the linear actuator 114. However, by adding control valve 604 to the discharge 134, this allows for the plasma arc torch 100 to be operated in a resistive heating mode.

Figure 20:
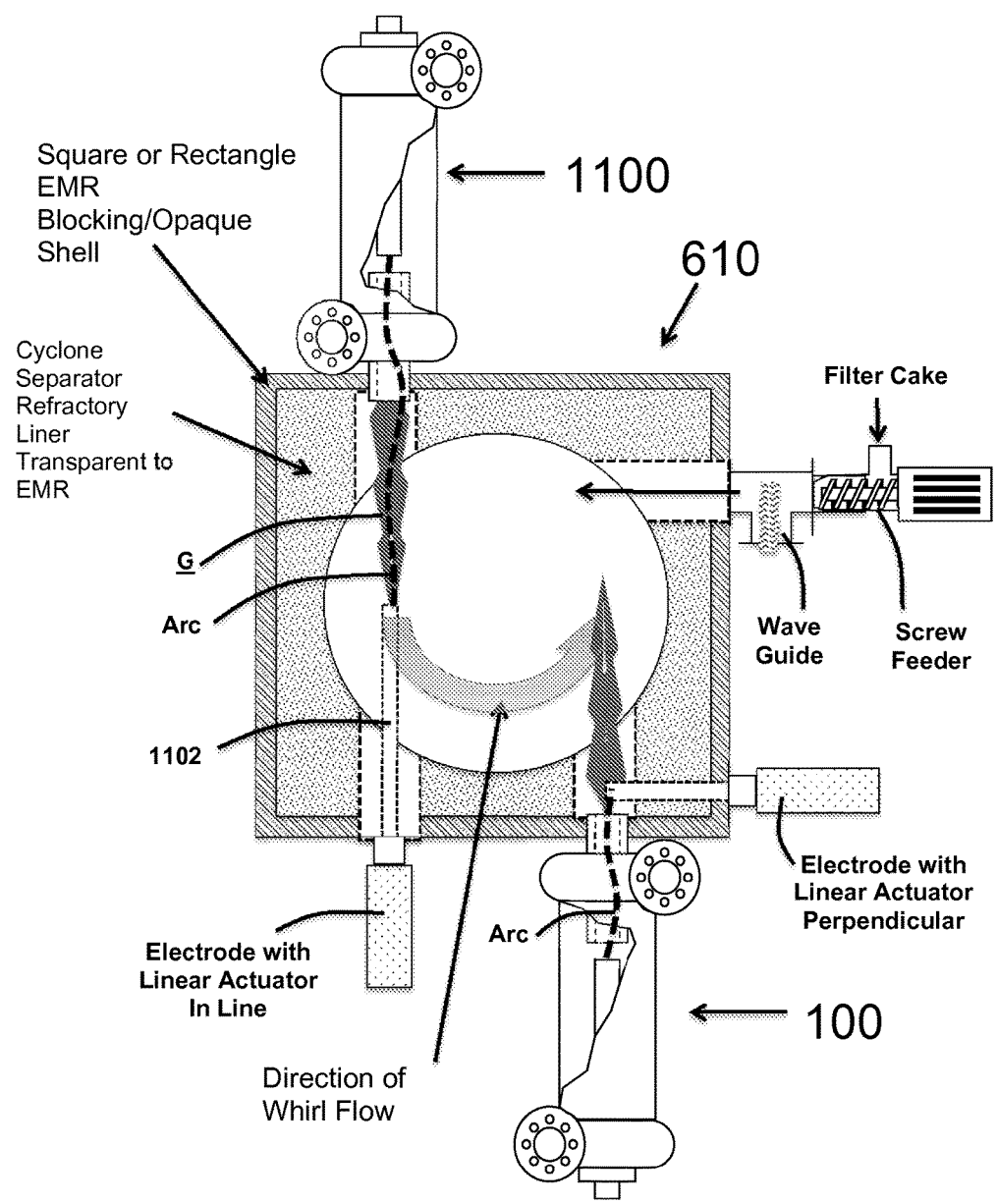
FIG. 20 is a system, method and apparatus for continuously feeding electrodes within a cyclone reactor in accordance with another embodiment of the present invention.

Now referring to FIG. 20, a system, method and apparatus for continuously feeding electrodes within a cyclone reactor is shown. For example, electrode feeder A feeds in-line and countercurrent to the first electrode along the longitudinal axis of ArcWhirl® 100. On the other hand, electrodes may be fed perpendicular to one another as shown by Electrode Feeder B. It will be understood that only one multi-mode torch 100 may be necessary for processing feed material which has been pretreated such as quenched filter cake from a heavy oil, bitumen or petroleum coke gasifier. Likewise, petroleum coke from a delayed coker can easily be plasma steam reformed with the system, method and apparatus of the present invention.

A preferred method for pretreating high moisture filter cake from an oil sands gasifier is with Electromagnetic Radiation (EMR). Specifically, the preferred EMR is within the Radio Frequency spectrum and more specifically within the microwave range. In particular, the ideal frequencies range from 915 MHz to 2.45 GHz.

It is well known and well understood that polar material will absorb microwaves as well as ionized gases, for example plasma. An ideal reactor for enhancing plasma and/or coupling to plasma and material to be treated is disclosed in FIG. 22. FIG. 21A discloses top injection of microwaves into a cyclone reactor while FIG. 21B discloses side injection of microwaves into the cyclone.

Figure 21:
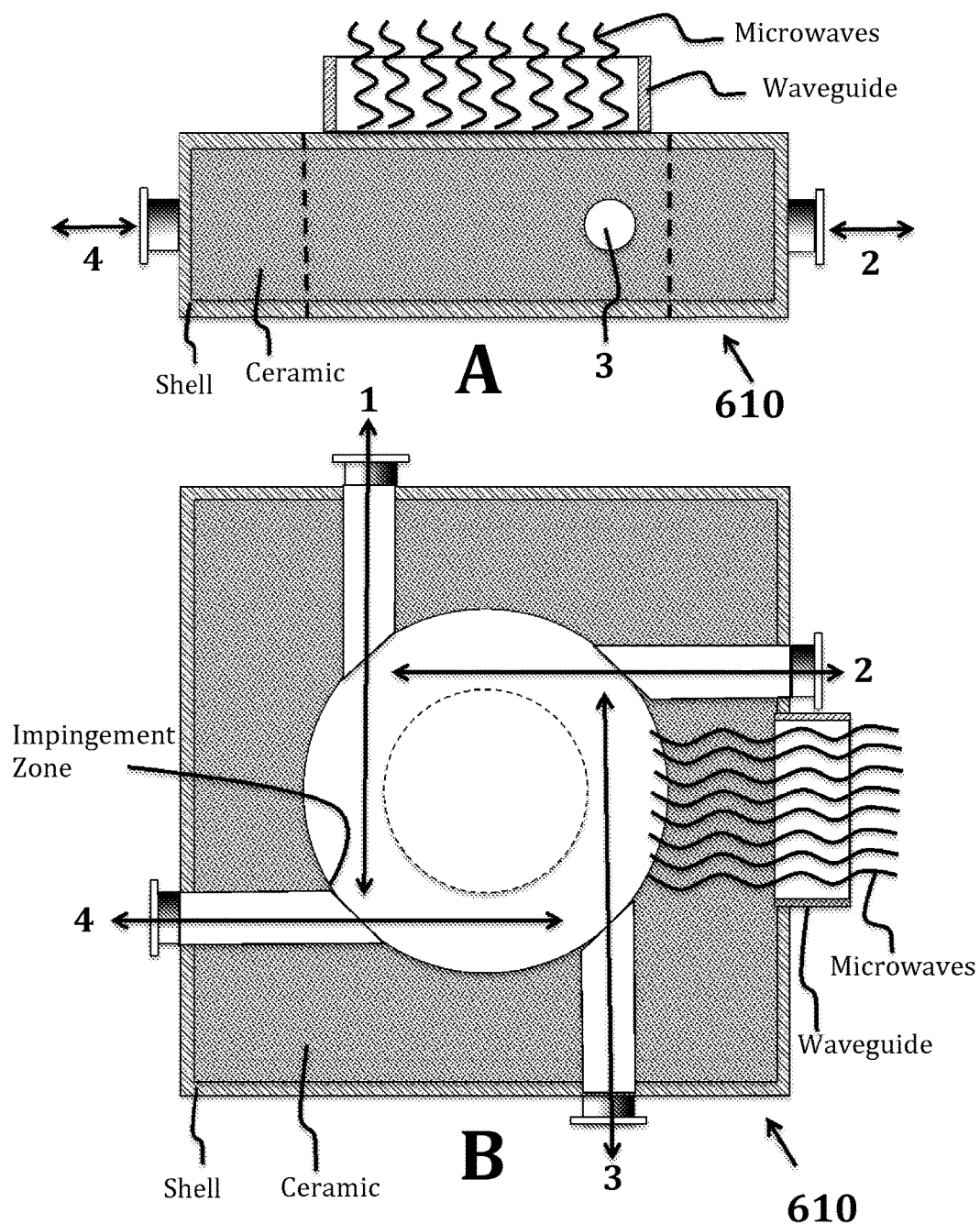
FIG. 21A discloses top injection of microwaves into a cyclone reactor while FIG. 21B discloses side injection of microwaves into the cyclone in accordance with another embodiment of the present invention.

Returning to FIG. 6, the ideal cyclone separator 606 for the present invention is disclosed in FIG. 20 and FIG. 21. In particular FIG. 21 discloses a multi-entry or multi-exit cyclone that incorporates 4 inlets/outlets to stabilize the rotating WHIRL of fluid.

In addition, referring to the tangential entry volutes disclosed as the first end 116 and second end 118 of FIG. 1, an ideal whirl generator, commonly referred to as a vortex generator or cyclone separator, is disclosed in FIGS. 21A and 21B. The multiple inlets/outlets allow for stabilizing the whirl without forming a pressure gradient typical on single entry cyclones. In addition, many cyclones utilize an involute for enhancing separation of matter. However, the involute feed housing is prone to erosion at the wall fluid curve interface. On the other hand, the present invention uses the velocity of fluid jets impinging on one another to prevent wall erosion while also eliminating a pressure gradient. A single entry cyclone separator produces a pressure gradient with a whipping tail of less dense fluid exiting and whipping 180 out from the inlet of the cyclone separator. In many applications the pressure gradient may not affect the operation of the cyclone.

However, when stabilizing and centering an arc is critical then producing a pressure gradient can lead to destabilizing the whirling center of plasma. Consequently, the arc may be extinguished or in a worse case scenario the arc may be pushed away from the anode nozzle and transferred to the wall or vessel. This could result in melting the reactor vessel. Hence, a ceramic electrical insulator is used as shown in FIGS. 20 and 21.

When the multiple inlet/outlet ceramic cyclone shown in FIG. 21 is used as the cyclone 601 as shown in the FIG. 6, the plasma injected into the cyclone can be enhanced and coupled to with RF energy. However, it is critical that the ceramic be permeable or transparent to EMR within microwave frequency range from 915 Mhz to 2450 Mhz (2.45 GHz). It will be understood that the microwaves may be injected directly into the eye of the whirling fluid or through the side of the ceramic that is transparent to microwaves. The shell of the vessel should be made of microwave blocking or opaque material.

Figure 22:
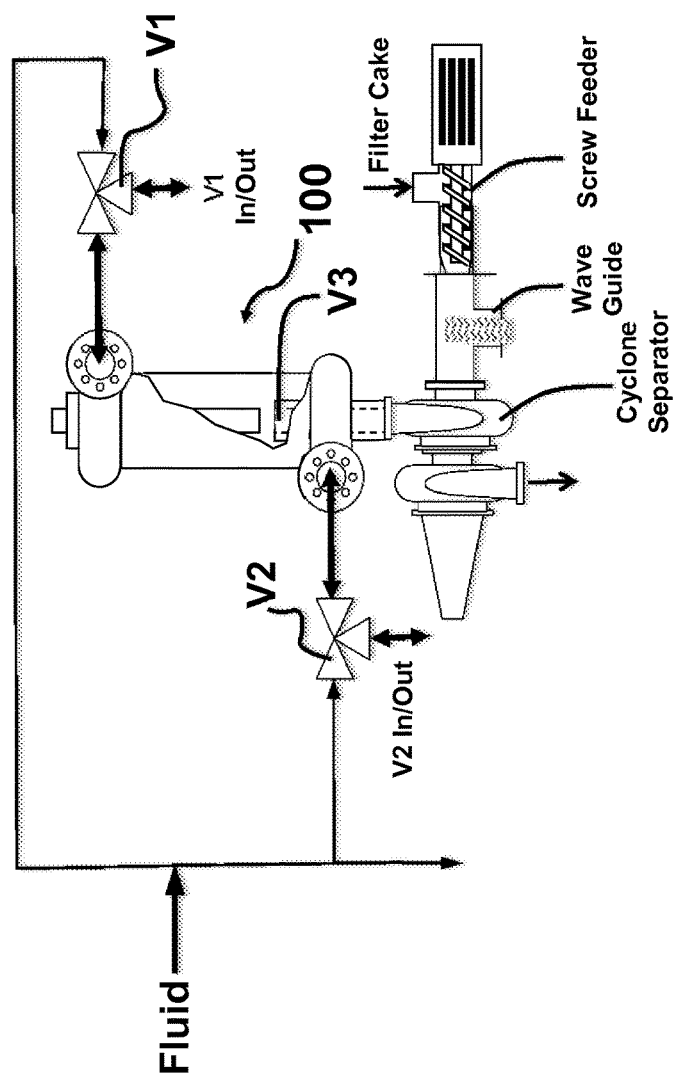
FIG. 22 discloses a system, method and apparatus for co-injecting microwaves and filter cake directly into the whirling plasma in accordance with another embodiment of the present invention.

FIG. 22 discloses a system, method and apparatus for co-injecting microwaves and filter cake directly into the whirling plasma. The microwaves will pretreat the material prior to entering into the eye of the whirling fluid. A waveguide directs the microwaves perpendicular to the travel of the filter cake. A screw feeder pushes the material directly into the eye of the plasma.

Figure 23:
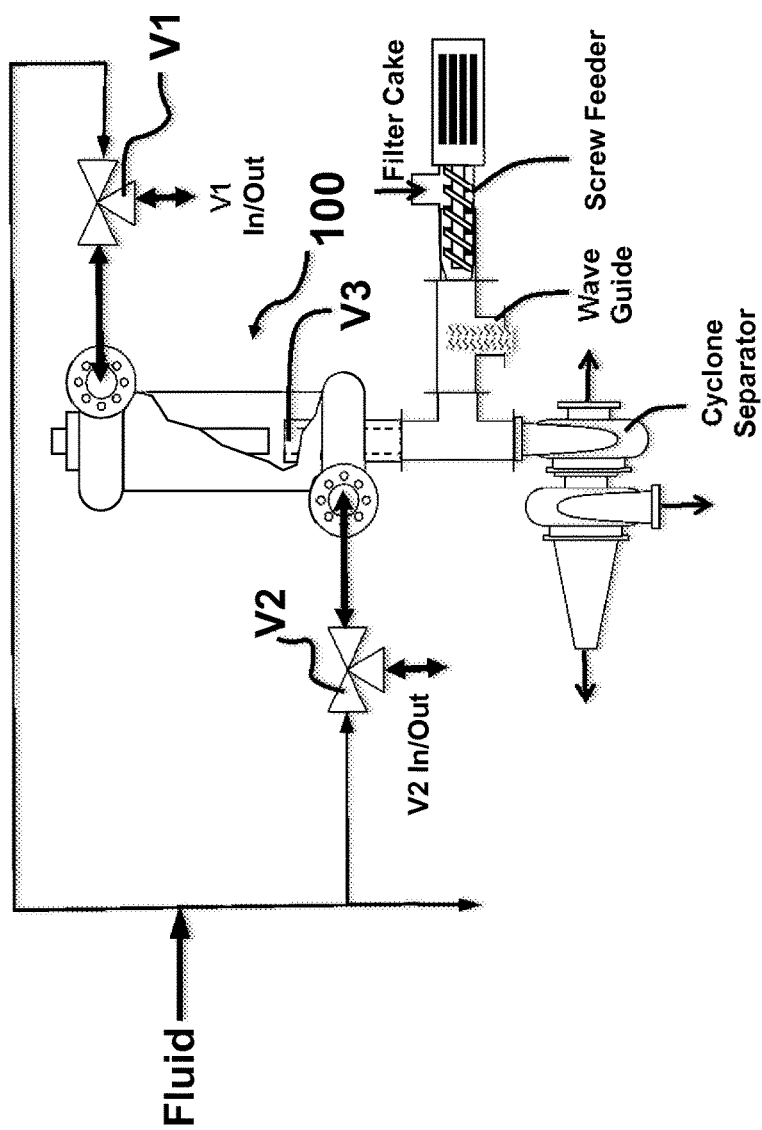
FIG. 23 discloses the co-injected microwaves and filter cake may be fed directly in the plasma which then flows into the cyclone separator and allows for pretreating the filter coke prior to injection into cyclone separator in accordance with another embodiment of the present invention.

Turning now to FIG. 23, the co-injected microwaves and filter cake may be fed directly in the plasma which then flows into the cyclone separator and allows for pretreating the filter coke prior to injection into cyclone separator 100.

Figure 24:
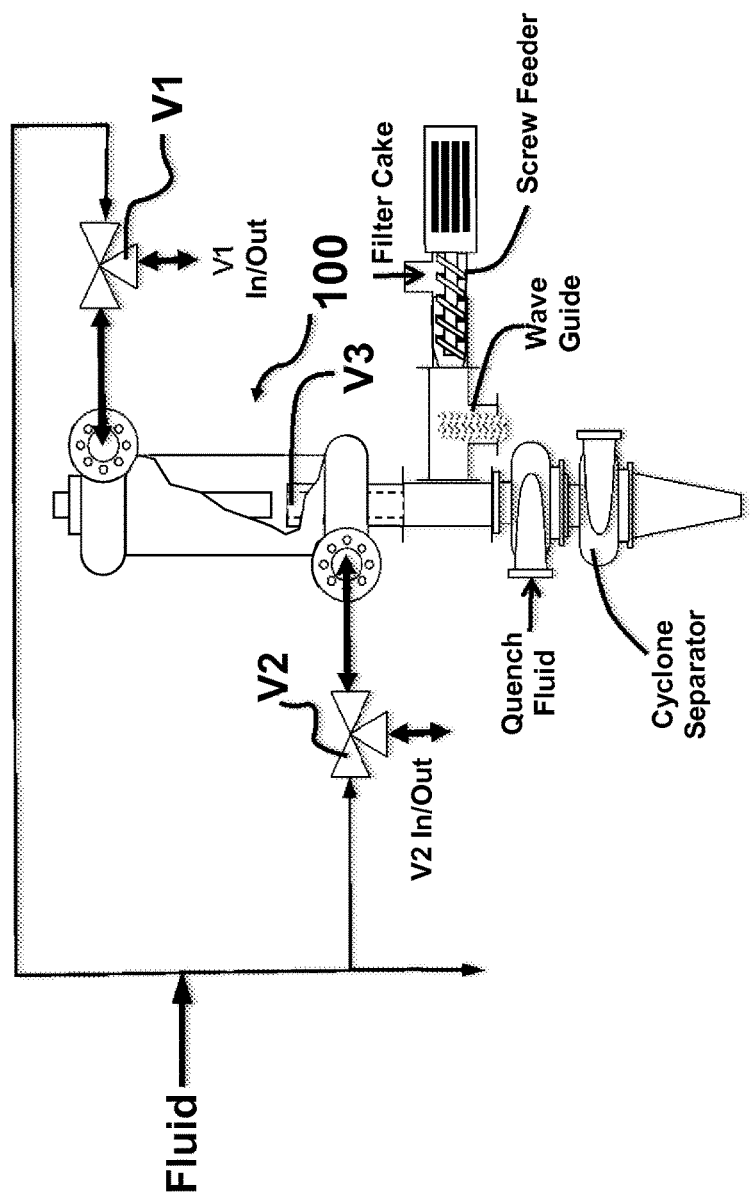
FIG. 24 discloses a system, method and apparatus for injecting the plasma from the ArcWhirl® Torch 100 directly into the eye of a cyclone separator in accordance with another embodiment of the present invention.

FIG. 24 discloses a system, method and apparatus for injecting the plasma from the ArcWhirl® Torch 100 directly into the eye of a cyclone separator. Feed material, such as filter cake, is pretreated first with EMR within the radio frequency range specifically within the microwave frequency range, then injected directly into the hot ionized plasma gas stream using a conveyance means such as a screw feeder. A quench fluid may be used for quenching the reaction between plasma and the feed material.

Figure 25:
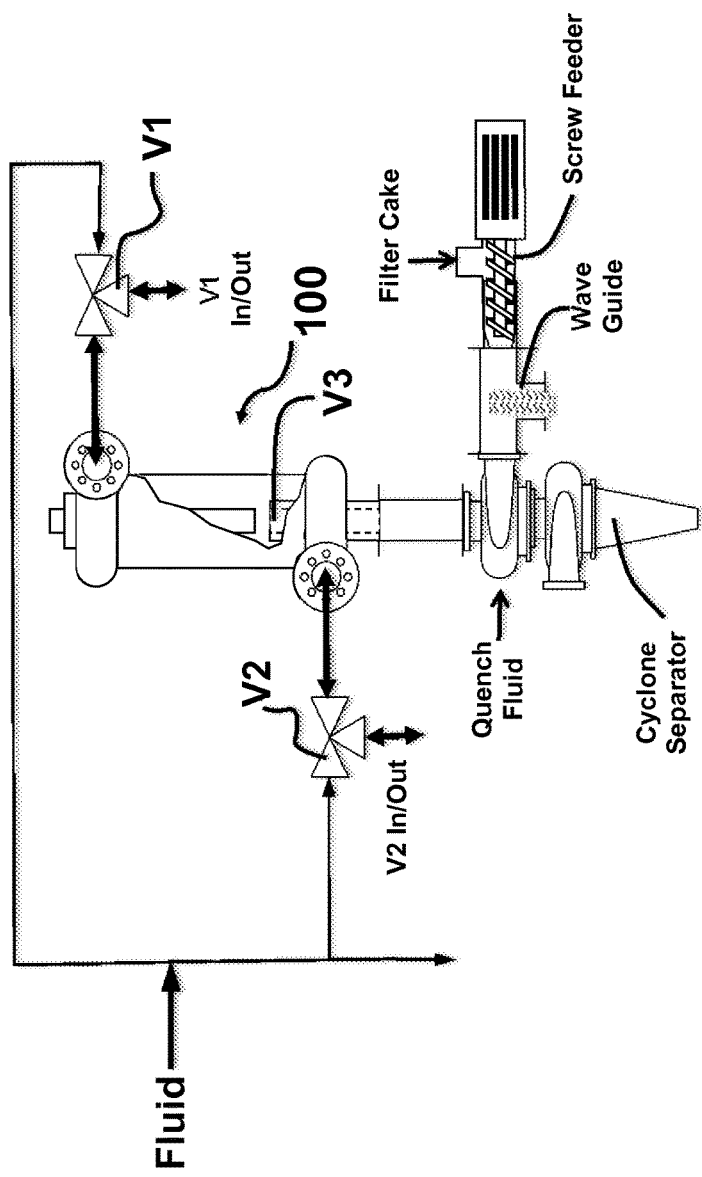
FIG. 25 discloses feed material such as filter cake or petroleum cake may be injected into the cyclone separator via a tangential entry in accordance with another embodiment of the present invention.

Turning now to FIG. 25 while referring to FIG. 21, feed material such as filter cake or petroleum cake may be injected into the cyclone separator via a tangential entry. Likewise, feed material may be pretreated with microwaves prior to injection into the plasma.

Figure 26:
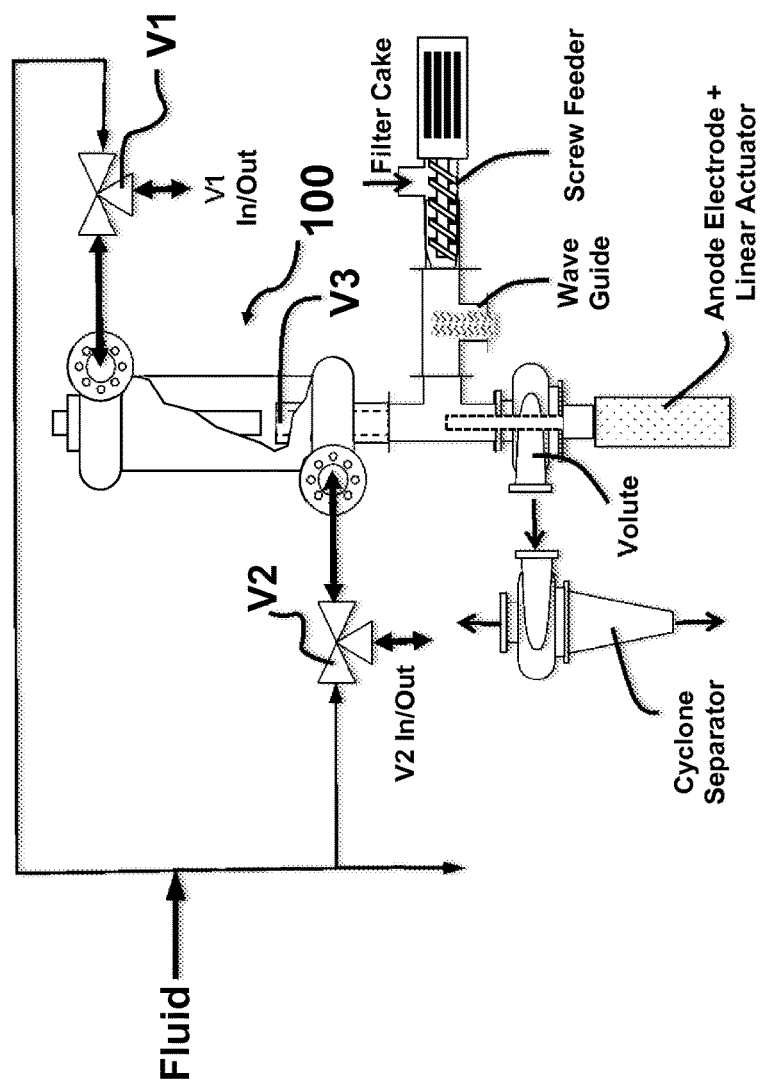
FIG. 26 discloses a system, method and apparatus for continuous operation of the Plasma ArcWhirl® torch in accordance with another embodiment of the present invention.

FIG. 26 discloses a system, method and apparatus for continuous operation of the Plasma ArcWhirl® torch. By installing a second anode electrode and linear actuator the arc can be transferred from the first electrode of 100 to anode nozzle and then to the anode electrode. This allows for an extremely high turn down rate.

Example 8—Arcwhirl® Torch with Anode Electrode, Linear Actuator

The following example with unexpected results will clearly demonstrate a novel and unobvious multi-mode plasma torch. The ArcWhirl® Torch as shown in FIG. 1 and FIG. 11 was electrically connected to an ESAB ESP150 plasma arc power supply ("PS"). The ESP150 PS was modified to operate in a load bank mode similar to a dead short. The ArcWhirl® Torch of FIG. 1 operated with voltage spikes which is typical of non-transferred arc torches due to the arc dancing around the anode nozzle. The minimum amps required to sustain an arc was 50 amps.

However, when an additional anode electrode 1102 was added as disclosed in FIG. 11 the current potentiometer was rotated to its minimum position at a current load of less than 30 amps. With a welders helmet with a #13 shield the arc was visibly seen and was indeed transferred between the carbon gouging electrodes. The arc was maintained in a steady state. Once again this allows for an unlimited flow rate of fluid through the anode nozzle without extinguishing the arc.

Example 9—Hybrid Microwave Pretreatment Arcwhirl® Torch for Calcining and Steam Reforming Petroleum Coke Petroleum coke in the form of a pressed filter cake with a moisture content of 85% produced from an oil sands gasifier was fired with an air ArcWhirl® plasma torch as shown in FIG. 6 utilizing the multi-inlet/outlet cyclone of FIGS. 20 and 21. The coke glowed to red heat within seconds but acted as a thermal insulator. However, as the pet coke particles broke off from the large piece, particle to particle collision comminuted the large piece. The smaller particles glowed red hot instantly when exposed to the air plasma. Thus, this gives rise to a system, method and apparatus for treating pet coke produced with delayed cokers in refineries and filter cake produced from quenching syngas produced from gasifying oil sand bitumen.

Next, the pet coke was placed inside an induction coil powered by an Ambrel 50/30 EKOHEAT® Induction Power Supply. The EKOHEAT® PS is rated at:
  Max Power (kW) 50
  Frequency (kHz) 15-45
  Line Voltage (Vac) 360-520, three phase
  Input Max (kVA) 58
The RF within the above frequency range did not couple to the pet coke. The pet coke was transparent to EMR within the 15-45 kHz frequency range.

Next, a sample from the same pet coke batch containing vanadium and nickel was placed in a standard microwave oven operating at a frequency of 2.45 GHz. Within seconds of energizing the microwave oven, arcs and sparks flashed within the oven producing bright white flashes of light. The oven was operated for 15 seconds. After opening the door the pet coke was fluctuating and flickering with red hot spots.

The sample was then crushed and placed back into the microwave oven. What occurred next was completely unexpected when compared and contrasted to the first sample. The pet coke began to turn red hot then burst into an orange flame. Within seconds the orange flame transitioned to a blue flame.

Another test was performed by placing a Pyrex cover over the sample to eliminate air. The pet coke sample with the cover was placed back in the microwave oven and irradiated for 15 seconds. An initial orange flame was observed for only a few seconds then extinguished and the pet coke began to glow red hot in the absence of oxygen.

The sample was taken out of the microwave and allowed to air cool for 2 hours. However, after 2 hours, particles were still glowing red hot within the crushed pet coke sample.

This microwave pretreatment process step prior to injection into a plasma torch gives rise to an entirely new system, method and apparatus for calcining, oxidizing and steam reforming. Quite simply by coupling microwaves to pet coke and allowing any leakage of microwaves to irradiate the plasma arc allows for a highly efficient and nearly leak free Hybrid Microwave Plasma Torch. In its simplest explanation any form of pet coke including coal may be used as a susceptor to ignite and sustain plasma. The addition of steam plasma to the pretreated red hot pet coke allows for a system for producing copious amounts of hydrogen and/or syngas.

Example 10—Hybrid Microwave Glow Discharge Steam/Hydrogen Water Gas System

As previously disclosed the pet coke was heated to red hot with only microwaves. Likewise, copious amounts of steam/hydrogen can be generated with the solid oxide high temperature glow discharge cell as disclosed in FIGS. 4 and 5. Consequently, this gives rise to an entirely unobvious and unique system for processing petroleum coke based upon the desired end product.

Returning back to FIGS. 22-26 steam and hydrogen can be produced with the ArcWhirl® when operated in a Glow Discharge Mode. The steam/$H_2$ mixture exits nozzle V3 and immediately comes into contact with red hot coke irradiated with microwaves. Thus, this novel process is a unique way for producing Water Gas, for example:

$H_2O+C \rightarrow H_2+CO (\Delta H=+131 \text{ kJ/mol})$

In the event a steam plasma is required then the Multi-Mode ArcWhirl® Torch is switched to the plasma arc mode. Another multi-mode ArcWhirl® Torch operated in a glow discharge mode would be placed upstream to produce steam/$H_2$ for the ArcWhirl® operated in a plasma arc mode.

This configuration is disclosed in FIG. 6 wherein ArcWhirl® 100 and Cyclone 610 are replaced with any one of the configurations disclosed in FIGS. 20 thru 27. The attachment devices selected from FIG. 18 would be the microwave waveguide, screw feeder (auger) and cyclone as retrofits to FIG. 6 in order to carry out the present invention.

Figure 27:
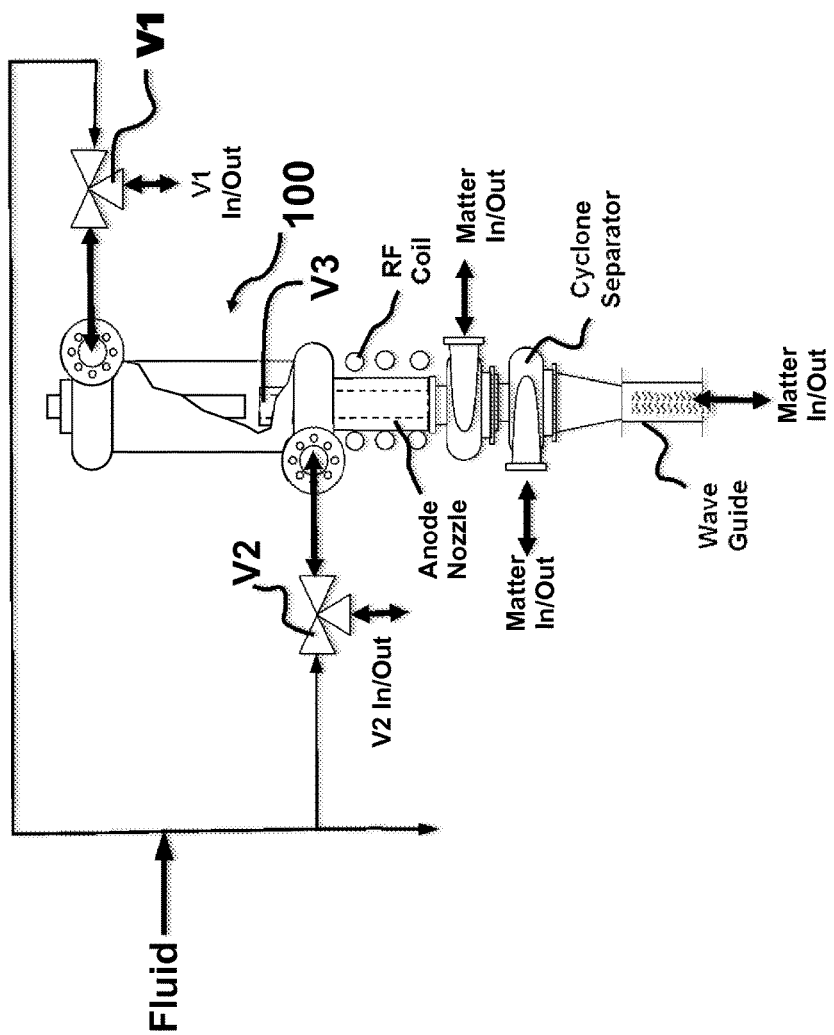
FIG. 27 discloses a means for adding additional EMR and heat to the gas stream exiting V3 by heating the anode nozzle with an induction coil in accordance with another embodiment of the present invention.

FIG. 27 discloses a means for adding additional EMR and heat to the gas stream exiting V3 by heating the anode nozzle with an induction coil. This allows for preserving the anode nozzle and simply using RF energy to heat the graphite nozzle.

Figure 28:
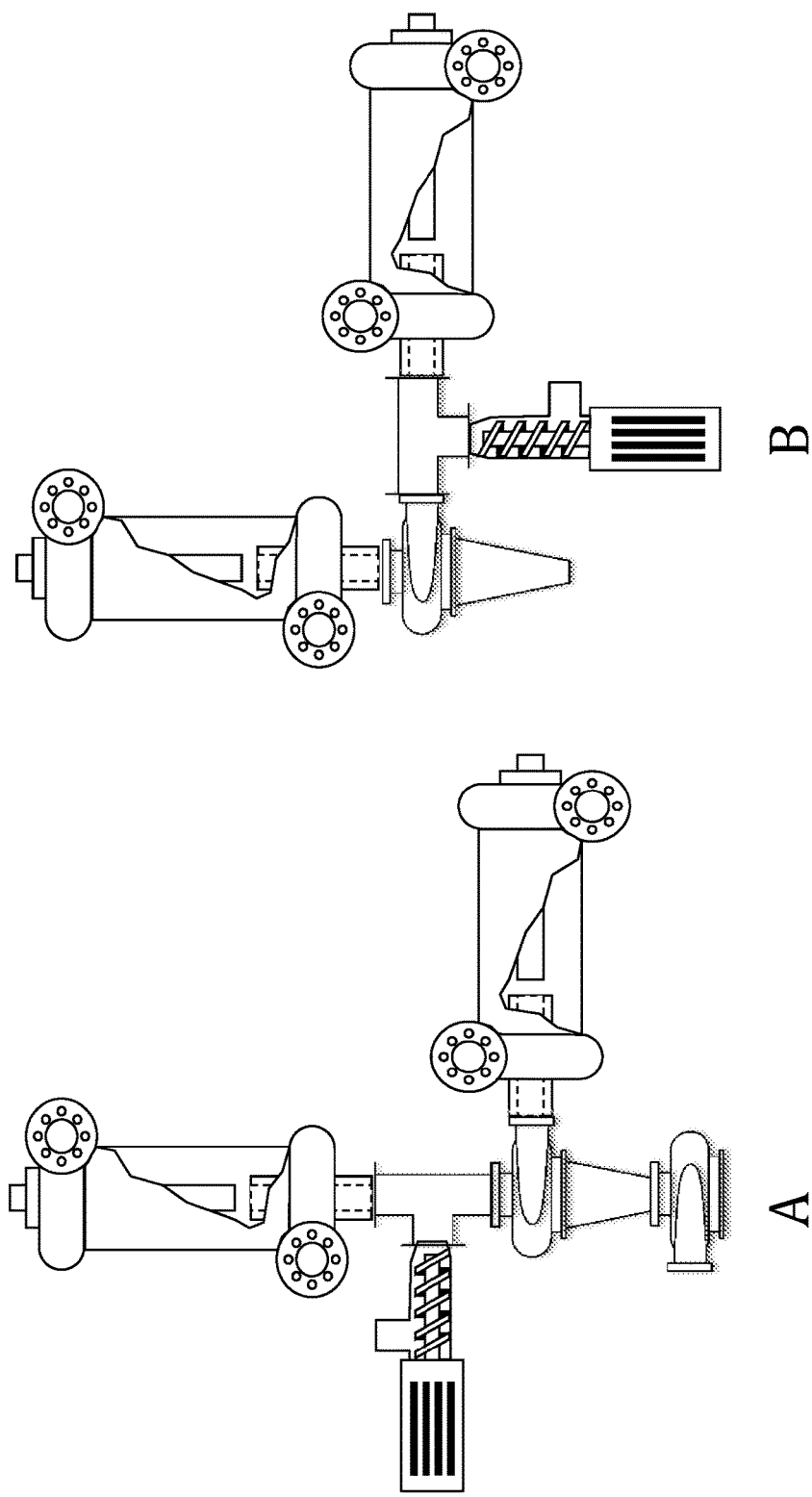
FIG. 28 discloses two ArcWhirls® in series to form a unique system for operating two identical multi-mode plasma torches in different modes in accordance with another embodiment of the present invention.

FIG. 28 discloses two ArcWhirls® in series to form a unique system for operating two identical multi-mode plasma torches in different modes.

Figure 29:
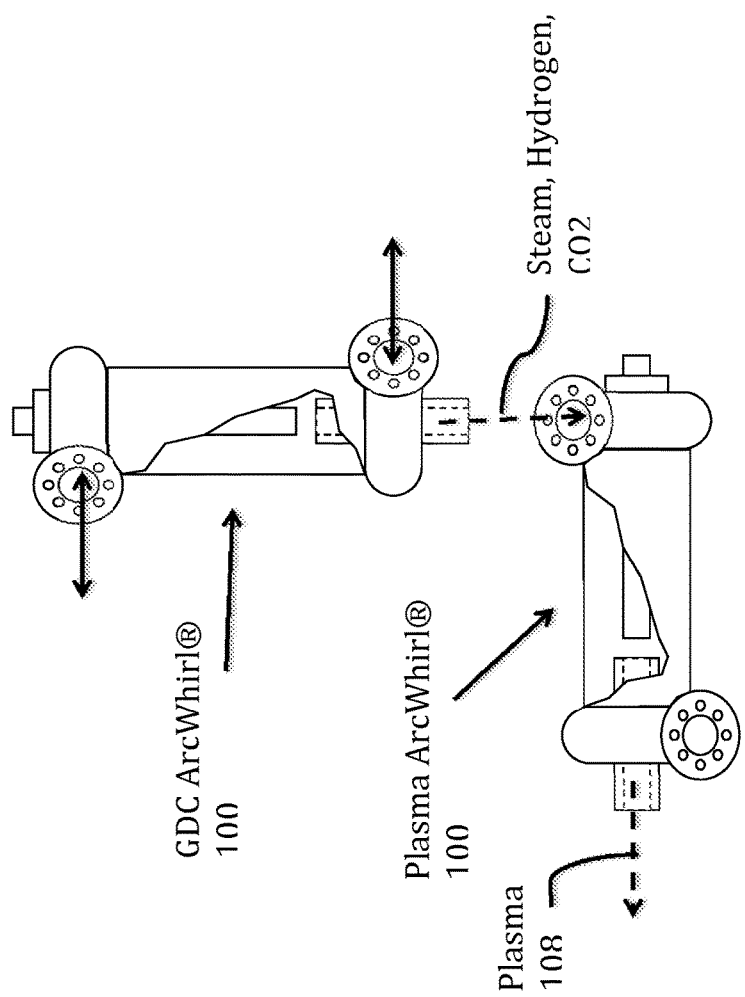
FIG. 29 discloses another configuration using two ArcWhirls® piped in series that can be operated in different modes based upon the application and desired end products in accordance with another embodiment of the present invention.

FIG. 29 discloses another configuration using two ArcWhirls® piped in series that can be operated in different modes based upon the application and desired end products.

Figure 30:
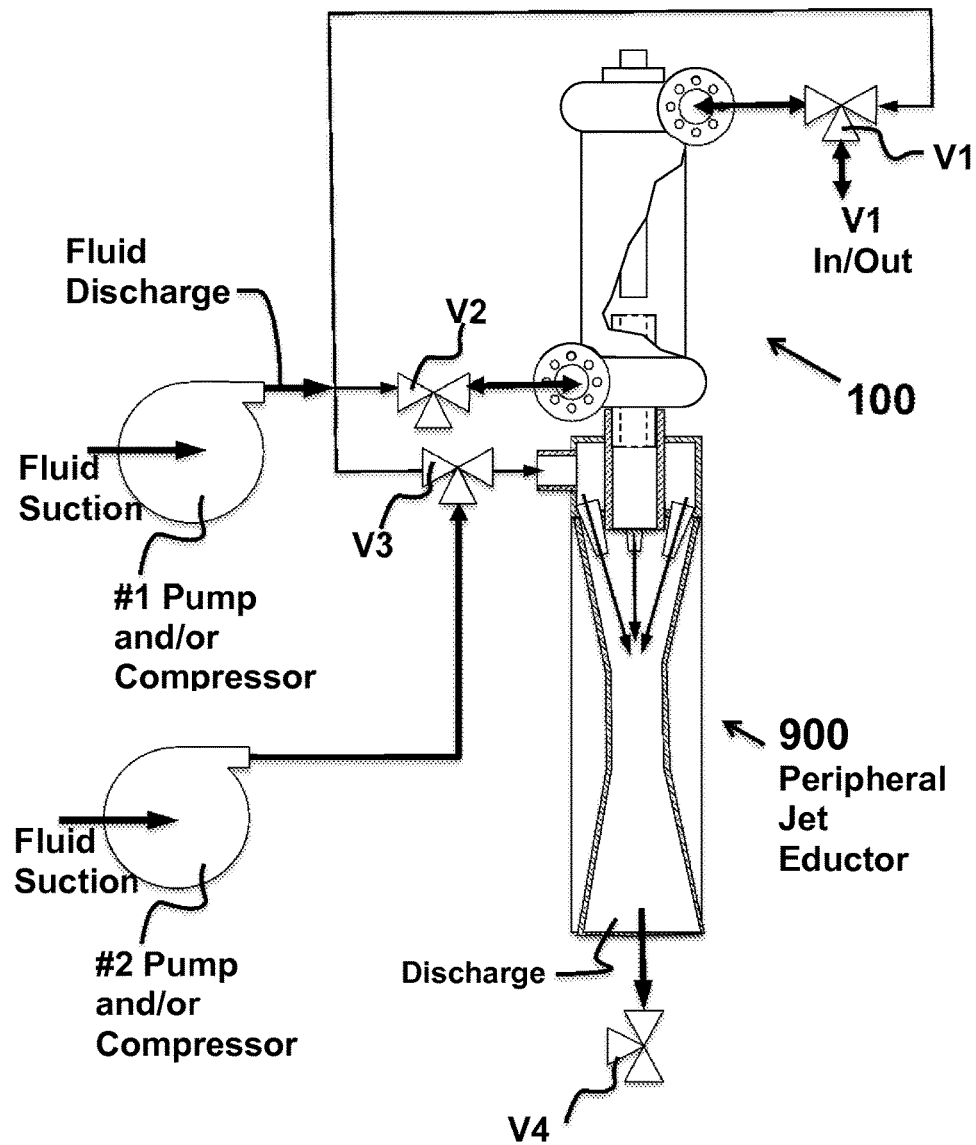
FIG. 30 discloses a means for combusting and/or quenching the products produced from the multi-mode Plasma ArcWhirl® Torch in accordance with another embodiment of the present invention.

FIG. 30 discloses a means for combusting and/or quenching the products produced from the multi-mode Plasma ArcWhirl® Torch. By attaching the ArcWhirl® Torch 100 to a peripheral jet eductor/ejector, products may be quenched when a quench fluid is flowed into the second compressor and/or pump. However, the syngas can be thermally oxidized or combusted by flowing air into the peripheral jet eductor/ejector via the second compressor. An extremely hot flame will exit the peripheral jet eductor at a very high velocity that can be used for thrust, heating and rotational energy.

Figure 31:
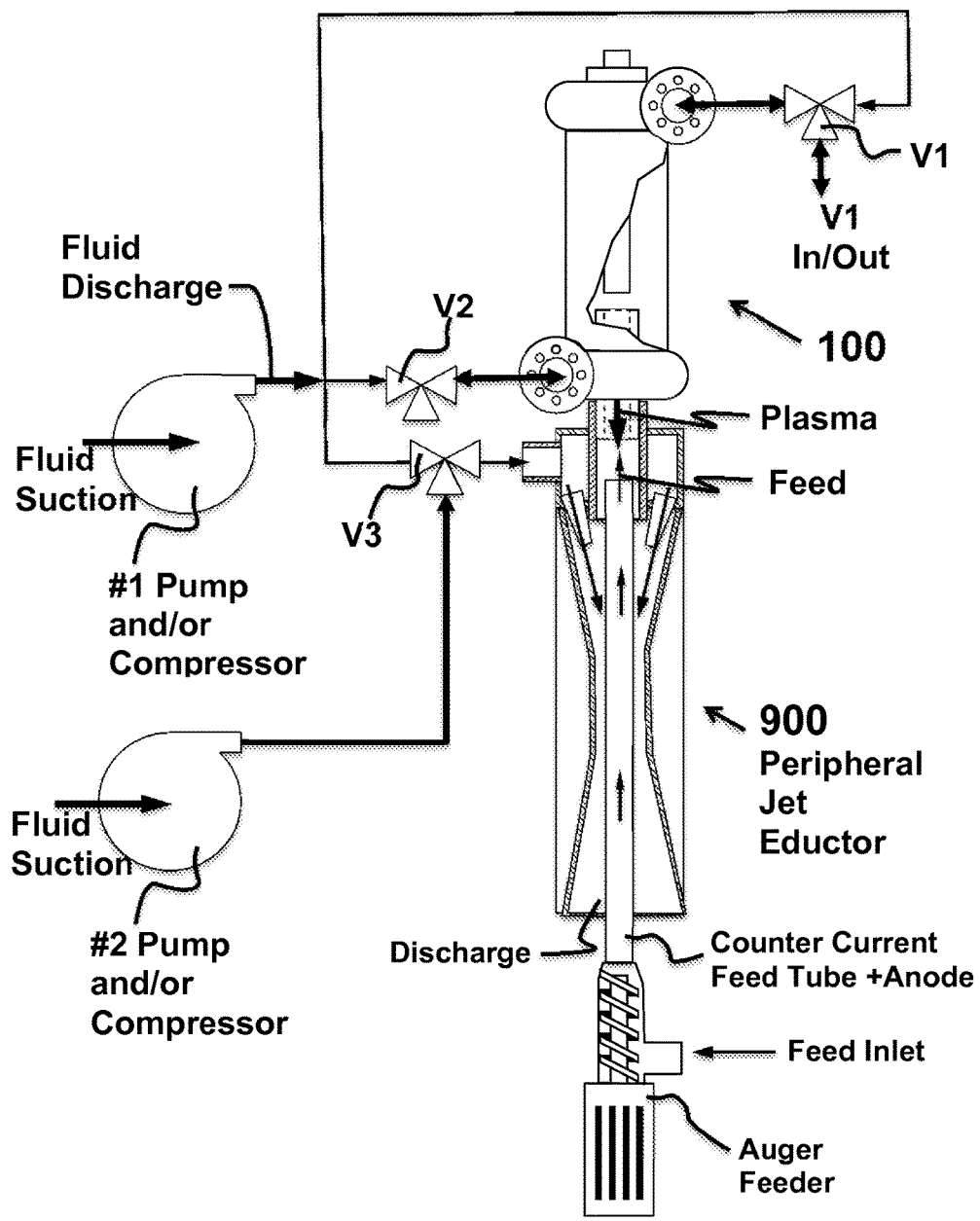
FIG. 31 discloses a means for countercurrent flowing material to be treated via an auger and stinger electrode aligned along the longitudinal axis of the multi-mode ArcWhirl® Torch in accordance with another embodiment of the present invention.

FIG. 31 discloses a means for countercurrent flowing material to be treated via an auger and stinger electrode aligned along the longitudinal axis of the multi-mode ArcWhirl® Torch. Returning to FIG. 11 and Example 8, the additional stinger electrode allows for high turn down rates. The peripheral jet eductor/ejector allows for rapid quenching or thermal oxidation based upon the desired solution. Once again, although not shown, microwaves can be introduced into the stinger tube to pretreat material, for example pet coke, prior to injection into the steam plasma or just steam if operated in a Glow Discharge Cell ("GDC") GDC mode.

Example 11—Blowback Arcwhirl® Torch

FIG. 32A discloses a unique configuration similar to the ArcWhirl® Torch 100 of FIG. 1 utilizing the electrode and piston configuration as shown in FIG. 15 that can be operated as a blowback torch. Blowback plasma torches are well known and well understood. By including a spring behind the piston, this keeps the electrode piston in contact with the electrode nozzle for operating in a dead short. Although not shown, the electrode rod may be controlled separately with a linear actuator. When it is necessary to operate in another mode, the valve on the tangential exit is throttled, thus forcing the electrode piston to move away from the electrode nozzle. If for example, air or steam is flowed into the torch, then a plasma arc will be formed between the electrode rod, electrode nozzle and electrode plasma.

As previously disclosed, the major problem with blowback torches and all other plasma torches is a lack of throttling the plasma gas. The gas is regulated prior to entry into the torch. However, the present invention's blowback torch regulates the gas on the discharge tangential exit. Consequently, this allows for high turn down rates. Likewise, the electrode piston allows for operating in any mode previously described—resistance heating, plasma arc, glow discharge, electrolysis and submerged arc.

Referring now to FIG. 32B, by replacing the spring with a hydraulic/pneumatic port and electrically isolating the electrode piston from the electrode rod, the system can be powered with two separate power supplies. Thus, this allows the same system to be operated in separate multi-modes. For example, by adding another electrode rod 1102 as shown in FIG. 11 to the discharge of the electrode nozzle, then the electrode nozzle and electrode piston can be operated in a glow discharge mode by utilizing an electrolyte while the two electrode rods can be operated in a plasma arc mode to convert the steam/H$_2$ mixture into a steam/H$_2$ plasma. This configuration does not require a solid oxide between the equidistant gap.

Example 12—Three Phase Ac Arcwhirl® Torch

Thus far the present invention has been disclosed with the use of a DC power supply. However, the invention as disclosed in FIGS. 33A and 33B allows for operation with alternating current ("AC") by electrically connecting the three electrodes, electrode rod, electrode piston and electrode nozzle to L1, L2 and L3 respectively of a three wire power cable to an AC source located on the surface.

Example 13—Multi-Mode Plasma Resistor

Figure 34:
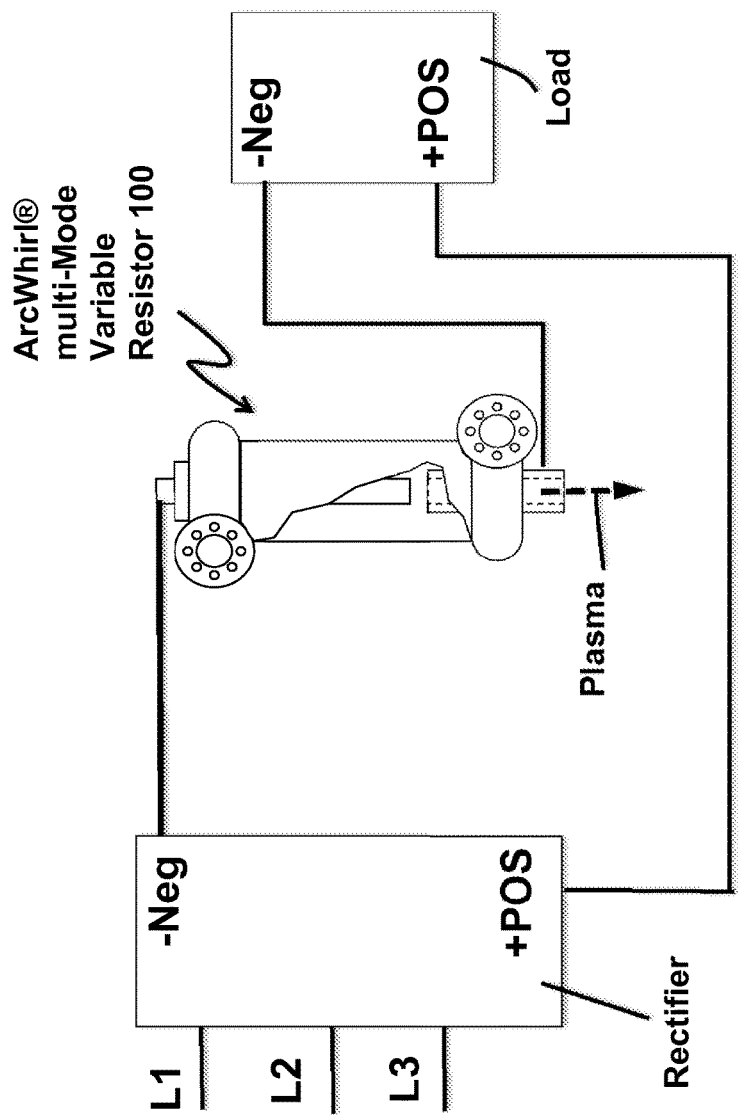
FIGS. 34 and 35 discloses a liquid resistor using the multi-mode ArcWhirl® Torch 100 as a resistor within a series circuit in accordance with another embodiment of the present invention.

FIG. 34 discloses a novel and unobvious liquid resistor using the multi-mode ArcWhirl® Torch 100 as a resistor within a series circuit. Liquid resistors are well known and well understood. Likewise, resistive wire type resistors are well known and well understood.

Wire Resistors typically produce waste heat. Likewise, liquid resistors produce steam and/or hot water as waste heat. Power supplies incorporating resistors normally are not designed to make use of the waste heat. However, the present invention has clearly shown that the multi-mode torch can make steam/H$_2$ from an electrolyte. Likewise, when the ArcWhirl® Torch 100 is operated in a glow discharge mode it operates in a very predictable manner. For example, an ESAB ESP 150 has been operated with ArcWhirl® Torch 100 and the device shown in FIGS. 4 and 5. When operated as a Glow Discharge Cell ("GDC") the only necessary control parameter is a pump or a linear actuator or combination of both.

Referring to the graph in FIG. 3, liquid level determines current flow (amps). Likewise, electrode depth for the ArcWhirl® Configuration as shown in FIG. 12 would determine current flow and voltage. Controlling liquid level and electrode depth would give precise control for varying resistance, by varying voltage and current. Hence, the use of the present invention as a variable resistor with the ability to recover heat by using the steam/H$_2$ mixture as the plasma gas in a separate ArcWhirl® Torch 100 or for general heating purposes.

Example 14—Variable Plasma Resistor for Heat, Hydrogen and 380 Vdc Buildings

Figure 35:
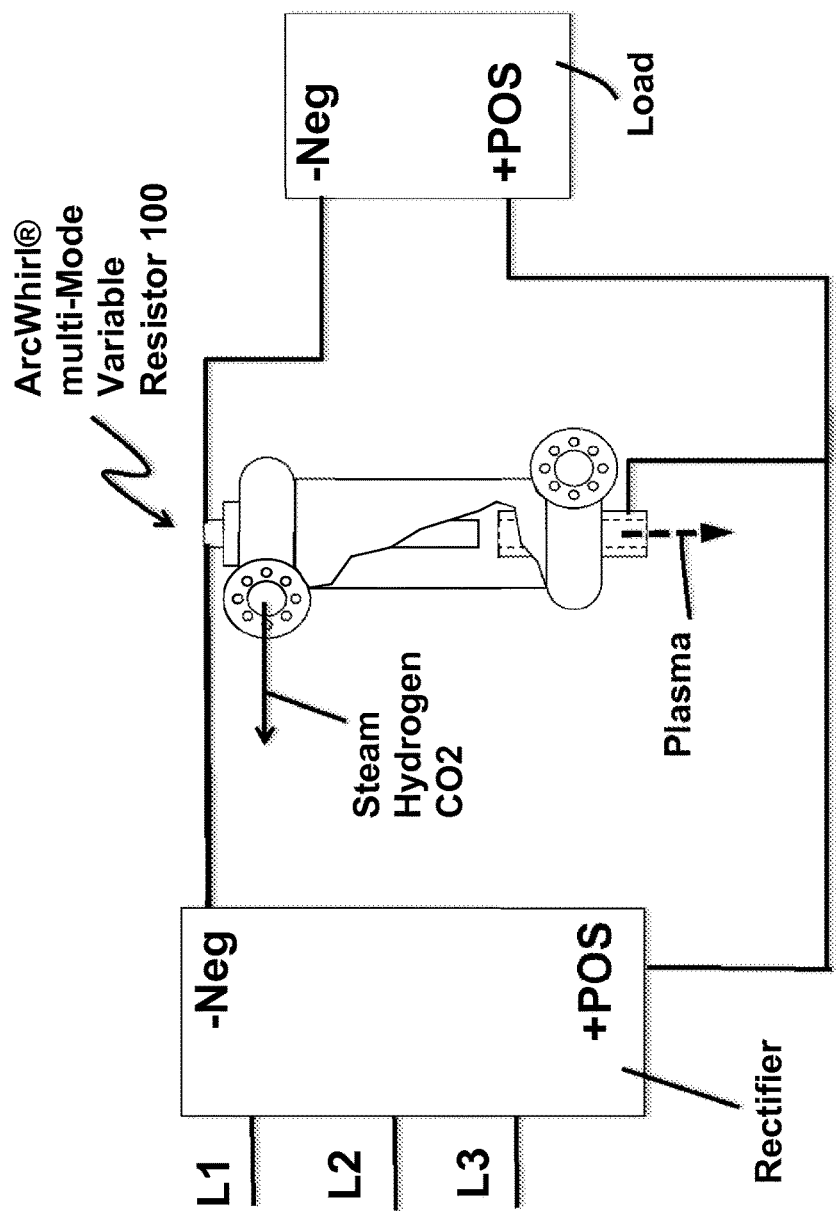

An exemplary use for the present invention's Variable Plasma Resistor ("VPR") is for rectifying three phase AC to 380 VDC. Turning now to FIG. 35, the Variable Plasma Resistor can be placed in parallel with a load in particular a 380 VDC load. By allowing the water to run at a low level within the VPR when operating in a steady state as a GDC only a small of amount of current is used, thus producing a small amount of heat for hotel services while providing full current load to a building. When more heat is required water is added to the VPR, thus increasing steam/H$_2$ production but reducing the available current to the 380 VDC Building.

Example 15—Downhole Enhanced Oil Recovery with Variable Plasma Resistor Heater

Figure 36:
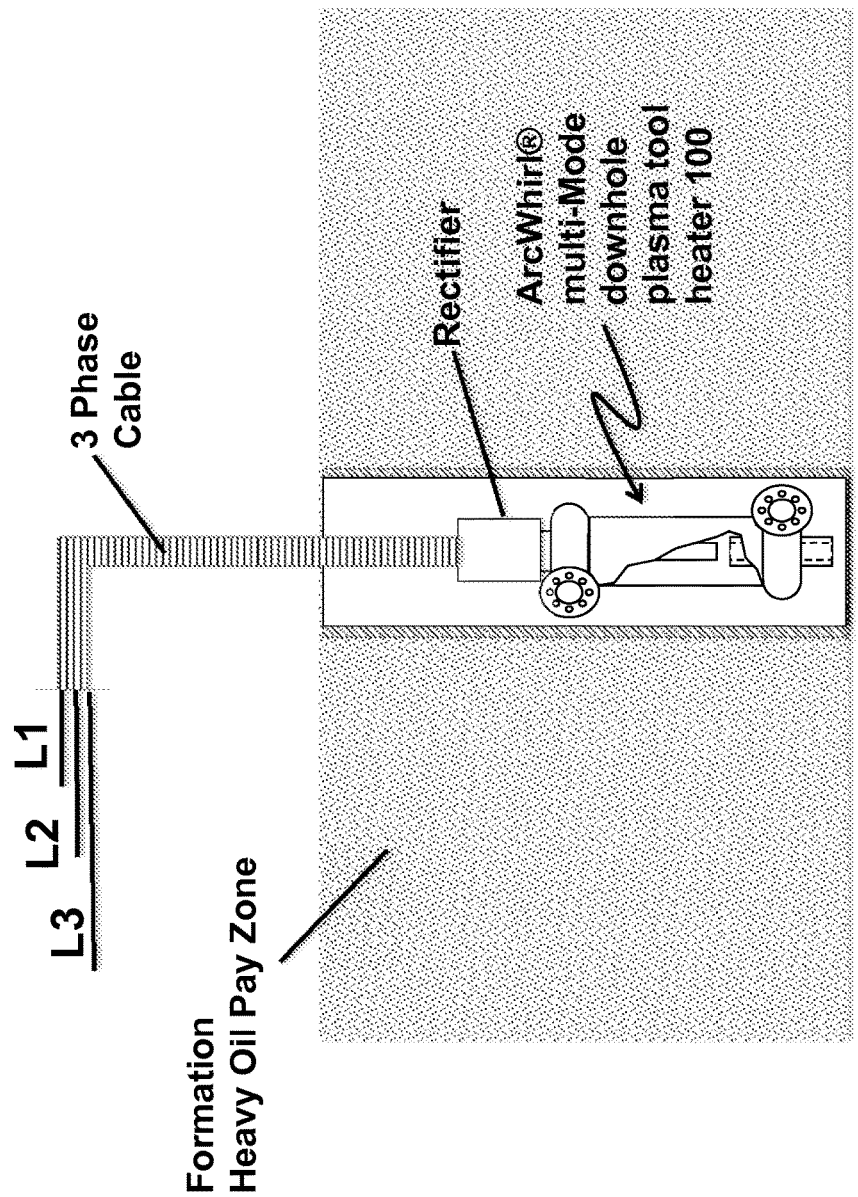
FIG. 36 discloses a unique system, method and apparatus for enhanced oil recovery in accordance with another embodiment of the present invention.

FIG. 36 discloses a unique system, method and apparatus for enhanced oil recovery. Returning back to Example 4 the GDC of FIGS. 4 and 5 discloses a surface method for generating steam for enhanced oil recovery ("EOR"). The device is well suited for surface production of steam using DC power. DC electrical leads from the power supply to the ArcWhirl® Torch are limited in length due to voltage drop.

However, when diodes (rectifier) are packaged with the GDC of the present invention the downhole heating tool may be small enough in diameter to insert within the well bore. Thus, widely available downhole power cable available from GE, Boret and Schlumberger can be used to provide AC power to the integrated Rectifier Variable Resistor Plasma Heater. Likewise, by selecting the appropriate electrolyte for the formation, hydrogen, steam and $CO_2$ can be produced for maintaining pressure within the formation by producing a non-condensible gas.

Example 16—Plasma Drilling in Plasma Arcwhirl® Mode

Figure 32:
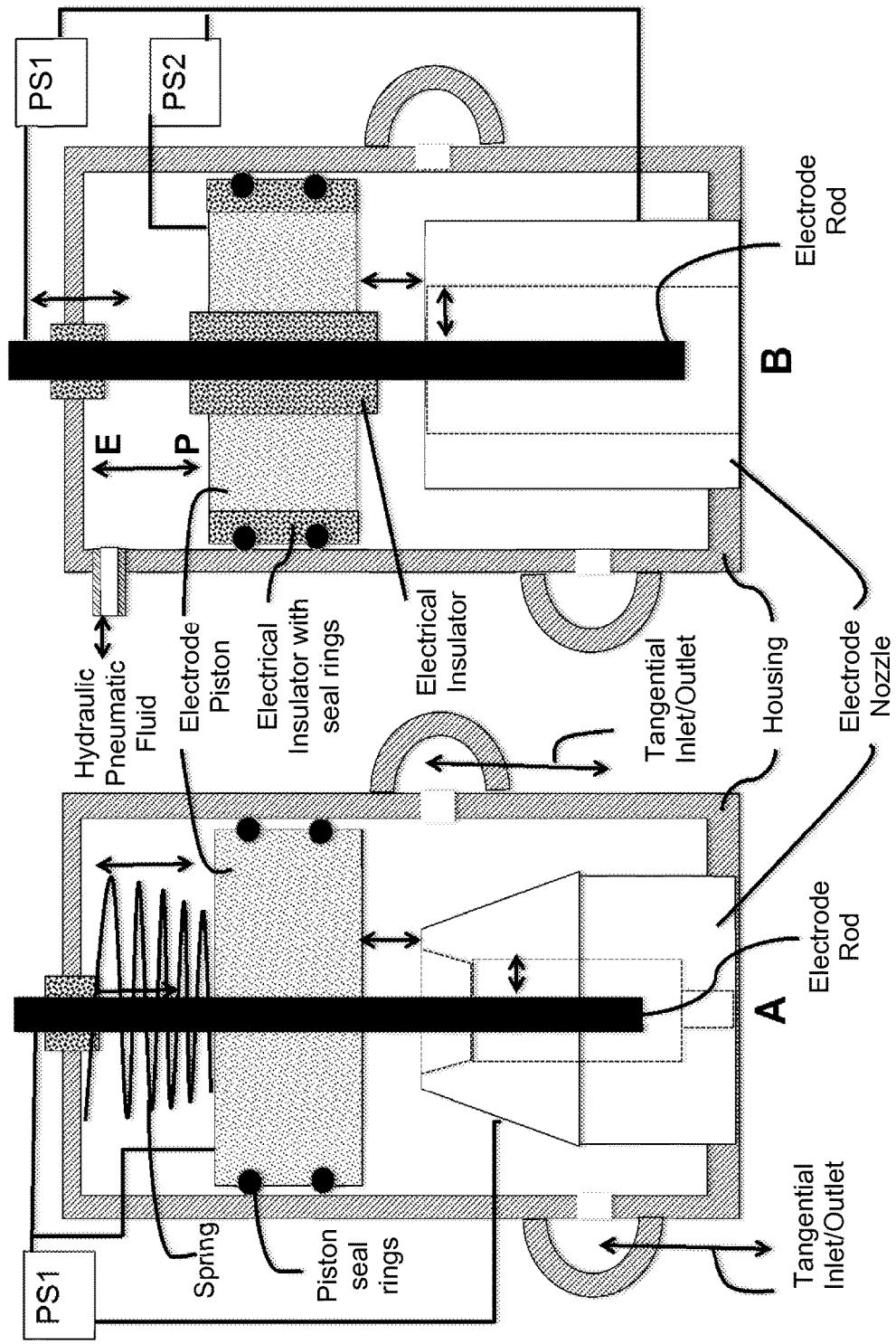
FIG. 32A discloses a unique configuration similar to the ArcWhirl® Torch of FIG. 1 utilizing the electrode and piston configuration as shown in FIG. 14 that can be operated as a blowback torch in accordance with another embodiment of the present invention.
FIG. 32B discloses a system that can be powered with two separate power supplies by replacing the spring with a hydraulic/pneumatic port and electrically isolating the electrode piston from the electrode rod in accordance with another embodiment of the present invention.
Figure 33:
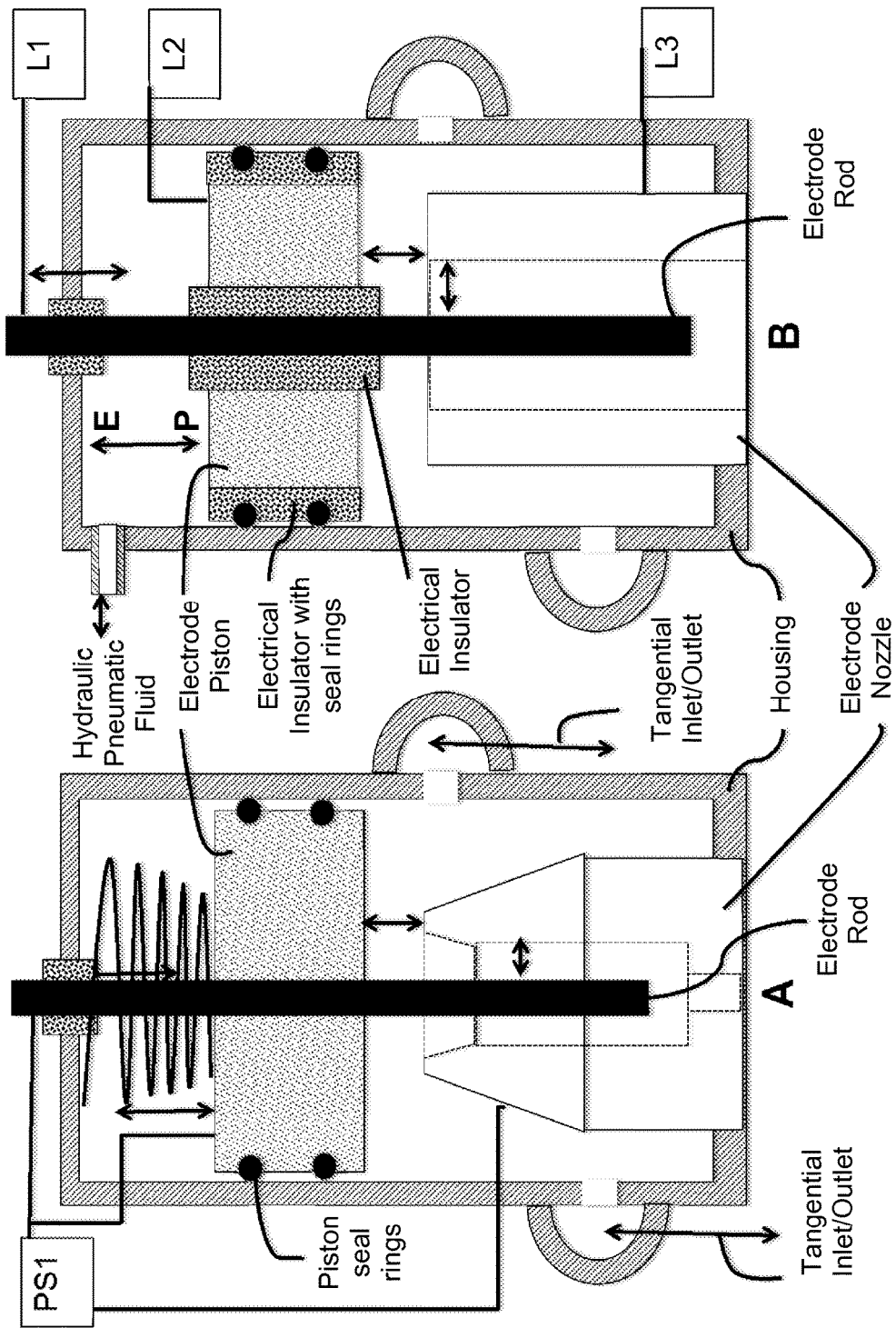
FIGS. 33A and 33B allows for operation with alternating current ("AC") by electrically connecting the three electrodes, electrode rod, electrode piston and electrode nozzle to L1, L2 and L3 respectively of a three wire power cable to an AC source located on the surface in accordance with another embodiment of the present invention.

The configuration as shown is FIG. 36 can be used to produce a true plasma arc downhole. First, steam would be produced on the surface with a separate GDC and then the steam would be flowed downhole into the Plasma ArcWhirl® Tool for plasma drilling. This allows for eliminating the entire mud system commonly found on drilling rigs by melting the formation and producing a slag that results in 90% volume reduction from original hole volume. In previous testing, the inventor of the present invention melted drill cuttings and achieved a 90% volume reduction. Consequently, the molten slag would form a ceramic type casing. The ideal ArcWhirl® design may be the blowback piston or pneumatic/hydraulic piston as shown in FIGS. 32 and 33.

Figure 37:
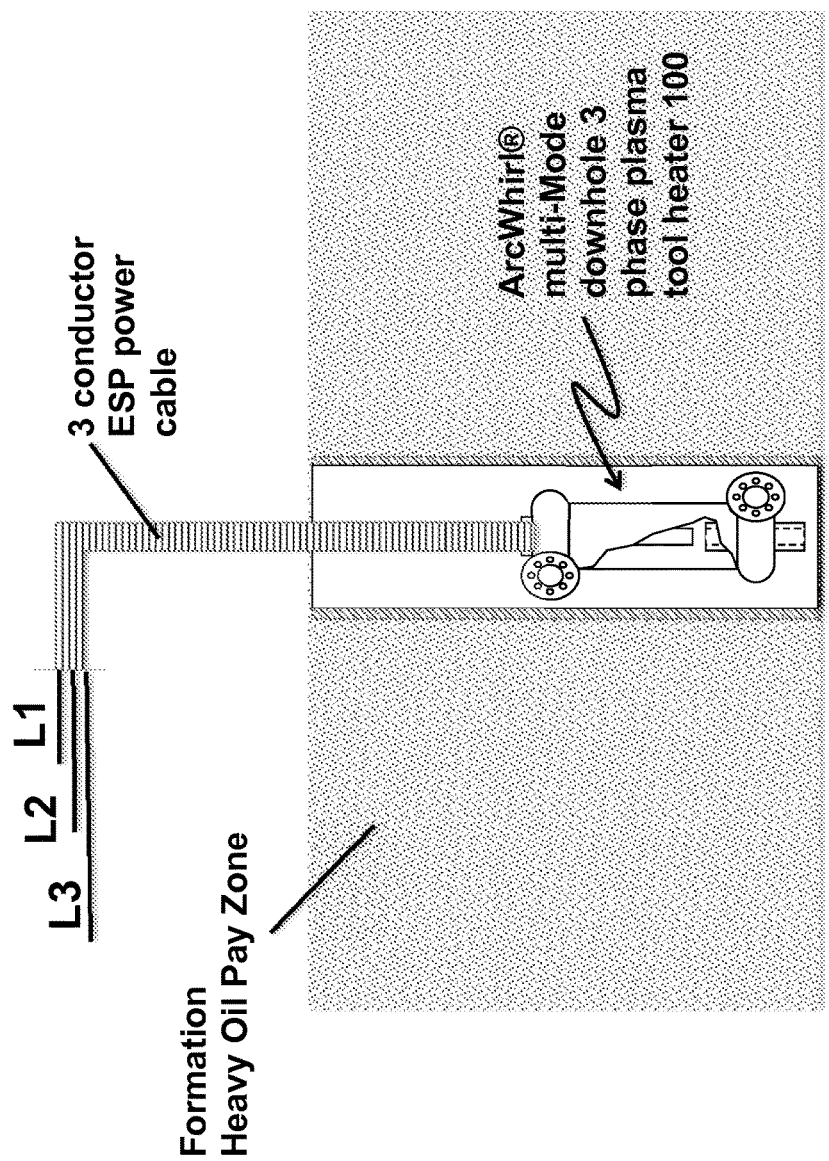
FIG. 37 discloses a three phase AC Plasma ArcWhirl® downhole tool that may also be used for downhole steam generation for EOR or for plasma drilling in accordance with another embodiment of the present invention.

FIG. 37 discloses a three phase AC Plasma ArcWhirl® downhole tool that may also be used for downhole steam generation for EOR or for plasma drilling. The ArcWhirl® shown in FIG. 33B can operate with three phase AC power. Likewise, FIG. 11 can be configured to be operated with three phase AC power.

Figure 38:
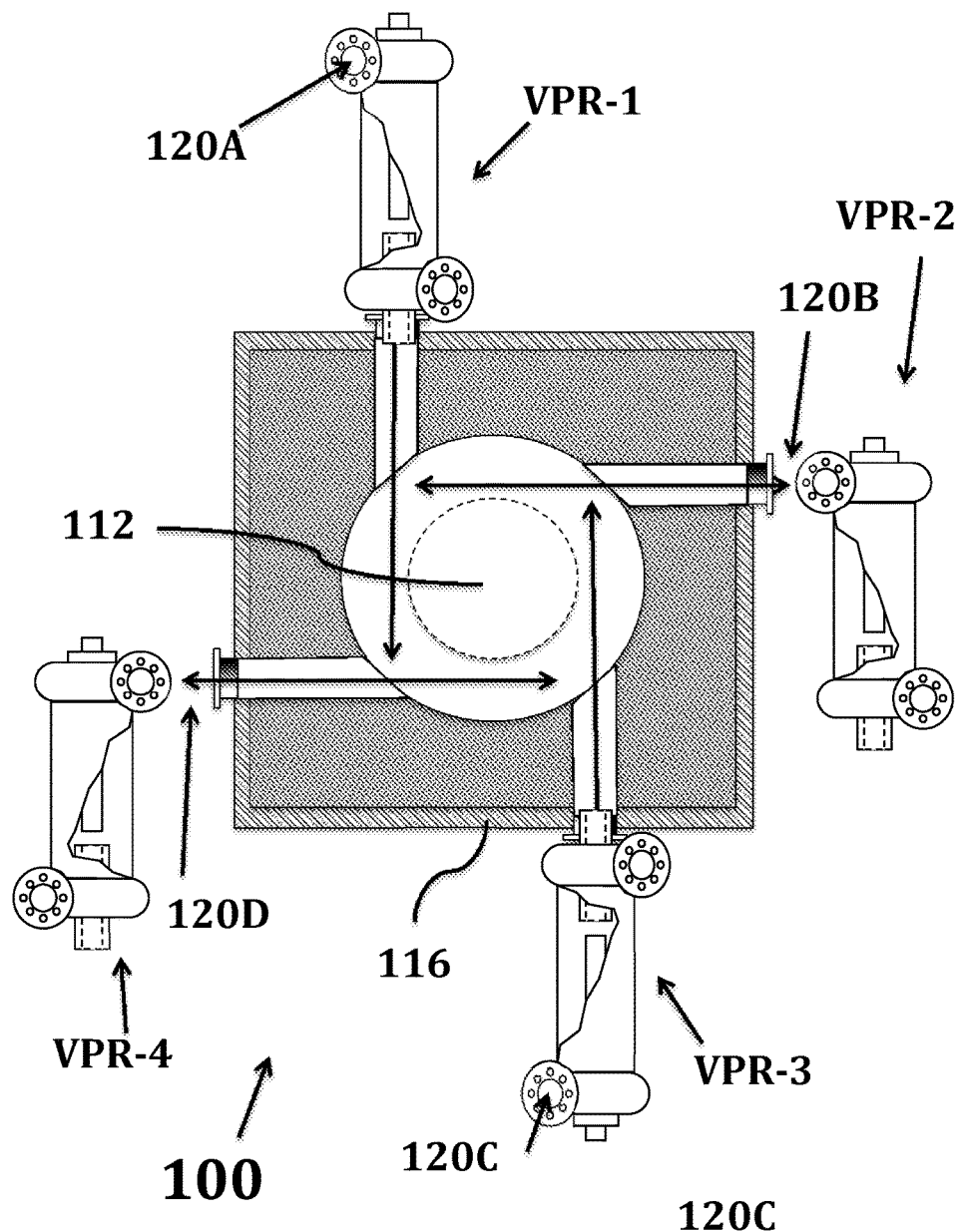
FIG. 38 discloses a novel material treating system that uses Variable Plasma Resistors (VPR) wired in parallel with a large ArcWhirl® Torch in accordance with another embodiment of the present invention.

FIG. 38 discloses a novel material treating system that uses Variable Plasma Resistors (VPR) wired in parallel with a large ArcWhirl® Torch. The bulk of the DC current would flow into the carbon electrode 112 and carbon electrode nozzle (not shown) while VPR-1 through VPR-4 are wired in parallel with the carbon electrode 112 and nozzle but operated individually to produce steam, hydrogen, disinfected water, ozone, air plasma, oxygen plasma and hot water that may be discharged into the large ArcWhirl® Torch are discharged through their respective outlets.

Figure 39:
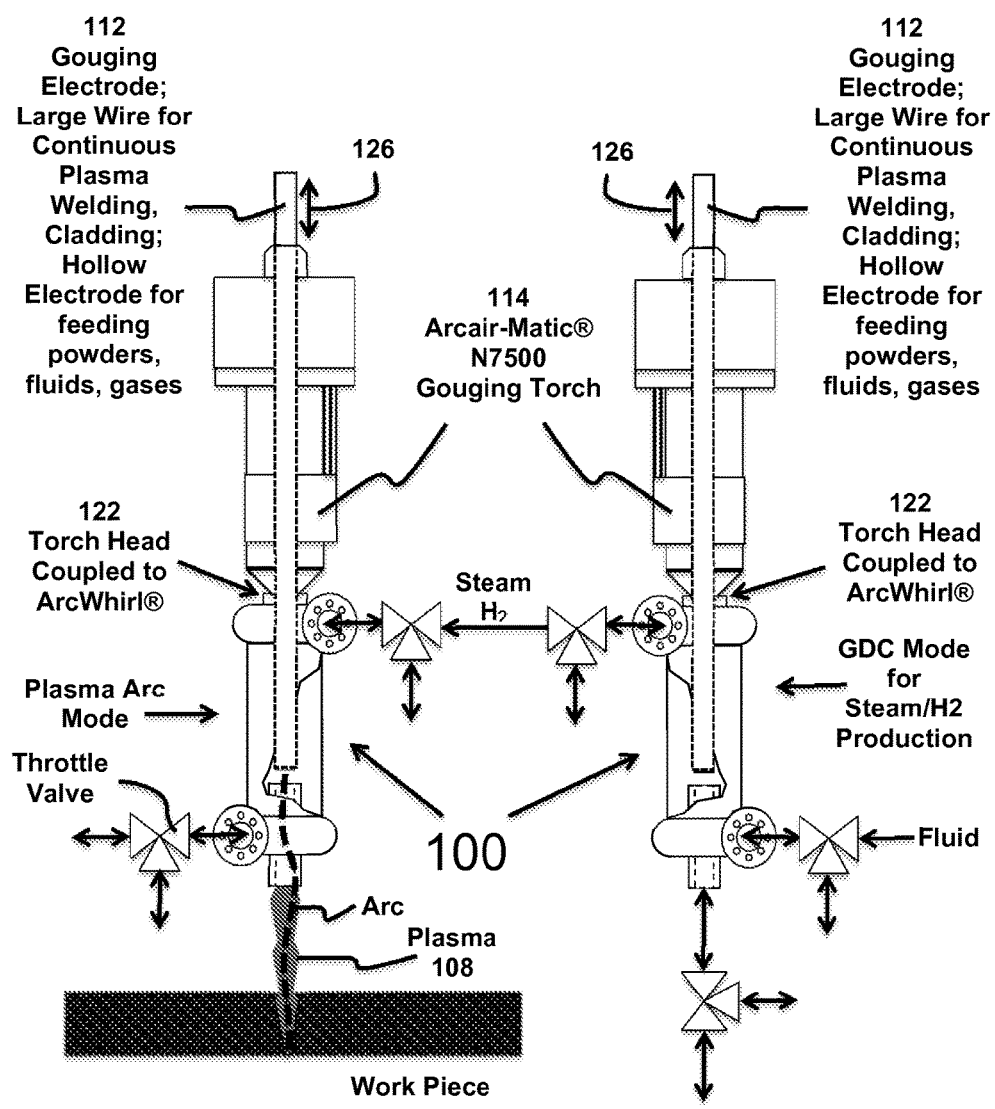
FIG. 39 discloses a system, method and apparatus for retrofitting and converting a carbon arc gouging torch into an ArcWhirl® Torch in accordance with another embodiment of the present invention.

Example 17—Plasma Arcwhirl® Kit for Converting Carbon Arc Gouging Torch into Plasma Torch/Welder FIG. 39 discloses a system, method and apparatus for retrofitting and converting a carbon arc gouging torch into an ArcWhirl® Torch. The carbon arc gouging torch with the Plasma ArcWhirl® Retrofit kit can now be operated in multi-modes for carbon arc gouging, plasma gouging, plasma welding, plasma marking, plasma spraying, plasma coating and plasma cutting applications.

Turning now to FIG. 39, a carbon arc gouging torch such as an Arcair® N7500 System is coupled to the ArcWhirl® First End 116 via the Arcair® torch head nozzle. Consequently, the Arcair® Gouging Torch then becomes both the electrode housing 122 and the linear actuator 114 for the ArcWhirl® 100.

The Plasma ArcWhirl® conversion kit now allows for a standard off-the-shelf carbon arc gouging torch to be operated as a non-transferred plasma arc torch, plasma welder, plasma sprayer, plasma cutter and plasma marker. When attached to an identical Plasma ArcWhirl® that is operated in a glow discharge mode, then the system can be operated with a steam/hydrogen plasma. This opens the door for reducing the costs for cutting risers off castings, plasma steam/hydrogen cutting thick plate steel and aluminum, steam plasma preheating ladles, steam plasma heat treating and steam plasma reforming.

In addition, the Plasma ArcWhirl® Gouging and Welding Torch can be operated as an inert Steam/Hydrogen Plasma Welder. For example, the carbon electrode would be replaced with a tungsten electrode. The plasma arc would be constricted with the steam/hydrogen gas. The Plasma ArcWhirl® torch differs from all other plasma torches by using the discharge valve to throttle the gas going through the nozzle. This allows for an extremely high turn down rate while also allowing for welding or cutting based upon the velocity of the plasma gas exiting from the nozzle. Quite simply, to weld the throttling valve would be fully open thus allowing for a low velocity plasma jet exiting from the nozzle. To plasma cut, the throttle would be shut thus forcing all of the gas through the nozzle to produce an extremely high velocity plasma jet for severing and blowing slag out of the way.

Example 18—Arcwhirl® Coanda Effect Plasma

Figure 40:
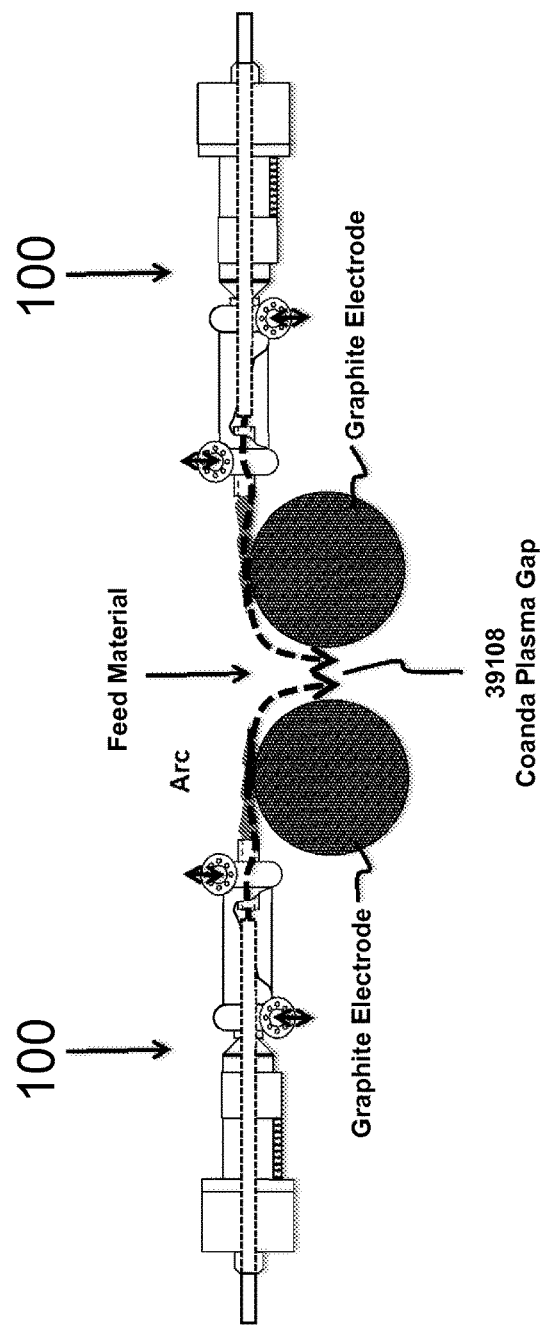
FIG. 40 discloses a unique system, method and apparatus for using the Coanda Effect to wrap plasma around a graphite electrode in accordance with another embodiment of the present invention.

FIG. 40 discloses a unique system, method and apparatus for using the Coanda Effect to wrap plasma around a graphite electrode. The Coanda Effect is the tendency of a fluid jet to be attracted to a nearby surface. The principle was named after Romanian aerodynamics pioneer Henri Coandă, who was the first to recognize the practical application of the phenomenon in aircraft development. Dual ArcWhirls® Torches 100 couple the arc to a graphite electrode thus allowing for 24/7 operation with an extremely steady voltage. The plasma wraps around the graphite electrode and enters into the coanda plasma gap 39108. Material to be treated is fed directly into the plasma gap 39108.

Figure 41:
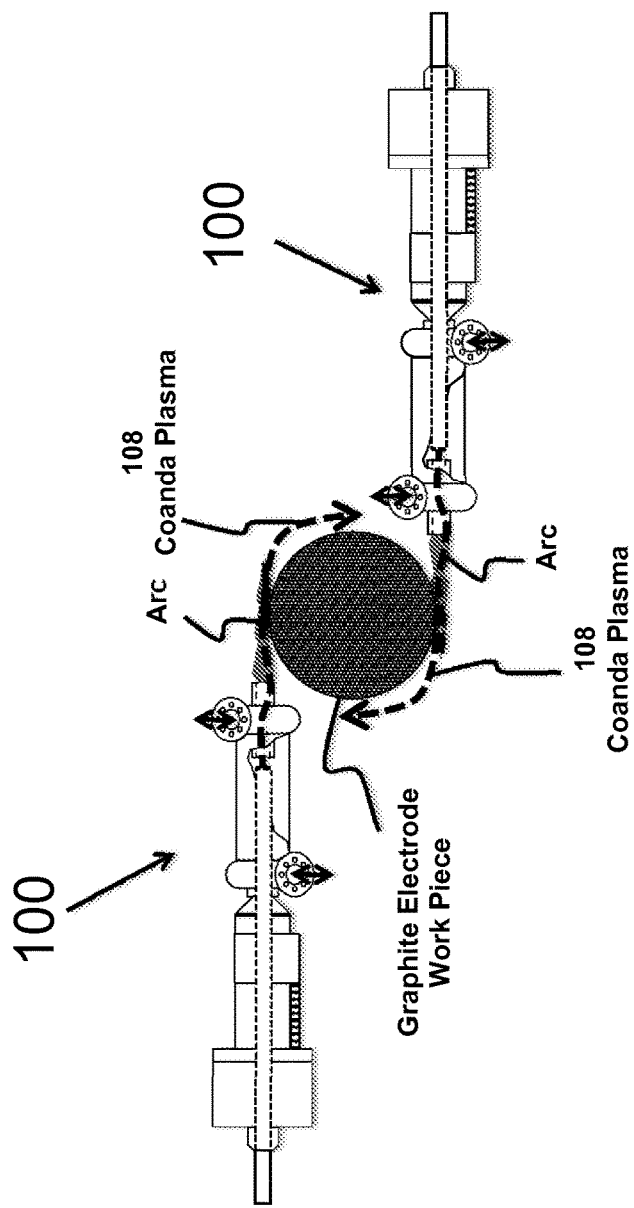
FIG. 41 discloses another system, method and apparatus for using the Coanda Effect to transfer an electrical arc to a graphite electrode thus sustaining and confining the plasma in accordance with another embodiment of the present invention.

FIG. 41 discloses another system, method and apparatus for using the Coanda Effect to transfer an electrical arc to a graphite electrode thus sustaining and confining the plasma. Although two ArcWhirl® torches are shown it will be understood that only one torch is necessary to operate as a Coanda Effect Plasma System. The ArcWhirl® Torch arc attaches itself to the central graphite electrode while the plasma wraps around the electrode. Thus, this allows for feeding a large central electrode and smaller electrodes within the torch for continuous duty operation.

Example 19—Recovering Mining Fluids from Mining Byproducts

Figure 42:
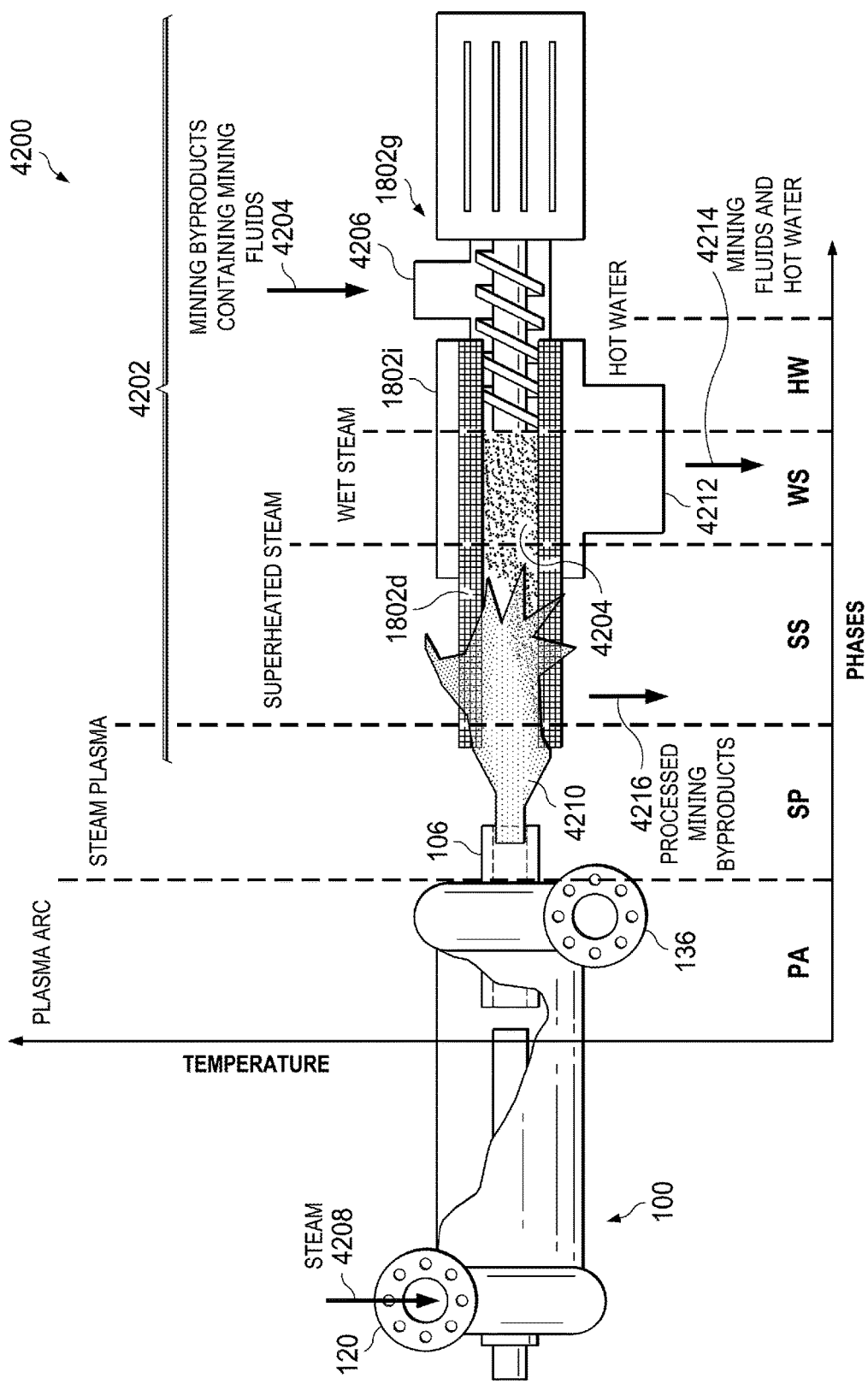
FIG. 42 discloses a counter current steam plasma system in accordance with one embodiment of the present invention.

Turning now to FIG. 42, an embodiment of the Steam Plasma Unit of FIG. 1 is disclosed as a counter current plasma system 4200 showing a graph with a temperature vs. phase graph. A plasma torch 100 is attached to a feed unit 4202. The plasma torch 100 may be selected from a DC arc torch, AC arc torch, microwave torch, inductively coupled plasma torch and/or any combination thereof. The feed unit 4202 may be selected from a screw press, hydraulic press, an auger with a well screen, a concrete pump with a sintered metal screen and/or any means for conveying solid material while separating fluids from the solids. As shown, the feed unit 4202 includes filter screen 1802d attached to the output of a screw feeder 1802g where a portion of the filter screen 1802d is enclosed within a tee 1802i. The longitudinal axis 124 of the plasma torch 100 is preferably aligned with a longitudinal axis of the feed unit 4202. Mining byproducts (e.g., drill cuttings, etc.) containing mining fluids (e.g., drilling fluids, etc.) (collectively 4204) are feed into the inlet 4206 of the feed unit 4202 where the screw feeder 1802g pushes the mining byproducts towards the nozzle 106 of the plasma torch 100.

Steam 4208 is flowed into the tangential inlet 120 of the Plasma ArcWhirl® torch 100 where the steam 4208 is converted to a steam plasma 4210 and exits through the nozzle 106. It is well known that there are 4 states of matter—solid, liquid, gas and plasma. The graph 4200 discloses the phases the steam plasma 4210 goes through as it contacts the byproducts (e.g., drill cuttings, etc.) containing mining fluids (e.g., drilling fluids, etc.) (collectively 4204) that are flowed counter current to the steam plasma 4210. As the steam 4208 enters into the ArcWhirl® Torch 100 through the tangential inlet 120, the steam 4208 traverses around, through and forms a Plasma Arc ("PA"). The ionized gas exiting from the nozzle 106 is a Steam Plasma ("SP") 4210. As shown in FIGS. 17-18, 22-27, 30-31 and 39 a valve may be attached to the tangential exit 136 of the ArcWhirl® Torch 100. This allows for throttling and controlling the amount of Steam Plasma 4210 exiting from the nozzle 106. Consequently, this allows for a 100:1 turn down rate of the system. Furthermore, the tangential exit 136 allows for backflowing mining byproducts (e.g., drill cuttings, etc.) containing mining fluids (e.g., drilling fluids, etc.) (collectively 4204) all the way into the ArcWhirl® Torch 100. This feature sets the Plasma ArcWhirl® Torch apart from all other plasma torches currently being marketed and sold today. The ArcWhirl® Torch can also be operated as a steam/water quench reactor.

As the Steam Plasma 4210 traverses through the filter screen 1802d and directly contacts the mining byproducts (e.g., drill cuttings, etc.) containing mining fluids (e.g., drilling fluids, etc.) (collectively 4204), the Steam Plasma 4210 gives up some of its heat and its temperature is reduced to form Super Heated Steam ("SS"). As the Super Heated Steam flows counter current to the mining byproducts (e.g., drill cuttings, etc.) containing mining fluids (e.g., drilling fluids, etc.) (collectively 4204) through the filter screen 1892d into tee 1802i, the Super Heated Steam continues to give up heat and is converted to Wet Steam ("WS"). The Wet Steam then gives up its last remaining available latent heat and may condense to Hot Water ("HW"). By pulling a vacuum on the discharge exit 4212 of the tee 1802i, the Hot Water washes the mining fluids (e.g., drilling fluids, etc.) from the mining byproducts (e.g., drill cuttings, etc.) without cracking the base fluids to light ends. This is very important for the recovery and reuse of the base fluids. The mining fluids (e.g., drilling fluids, etc.) and Hot Water 4214 exit through the discharge exit 4212 of the tee 1802i. The steam plasma 4210 continues to process or "incinerate" the mining byproducts (e.g., drill cuttings, etc.) such that the processed byproducts (e.g., drill cuttings, etc.) 4216 are inert and substantially reduced in volume and either fall through the filter screen 1802d or exit the end of the filter screen 1802d.

Figure 43:
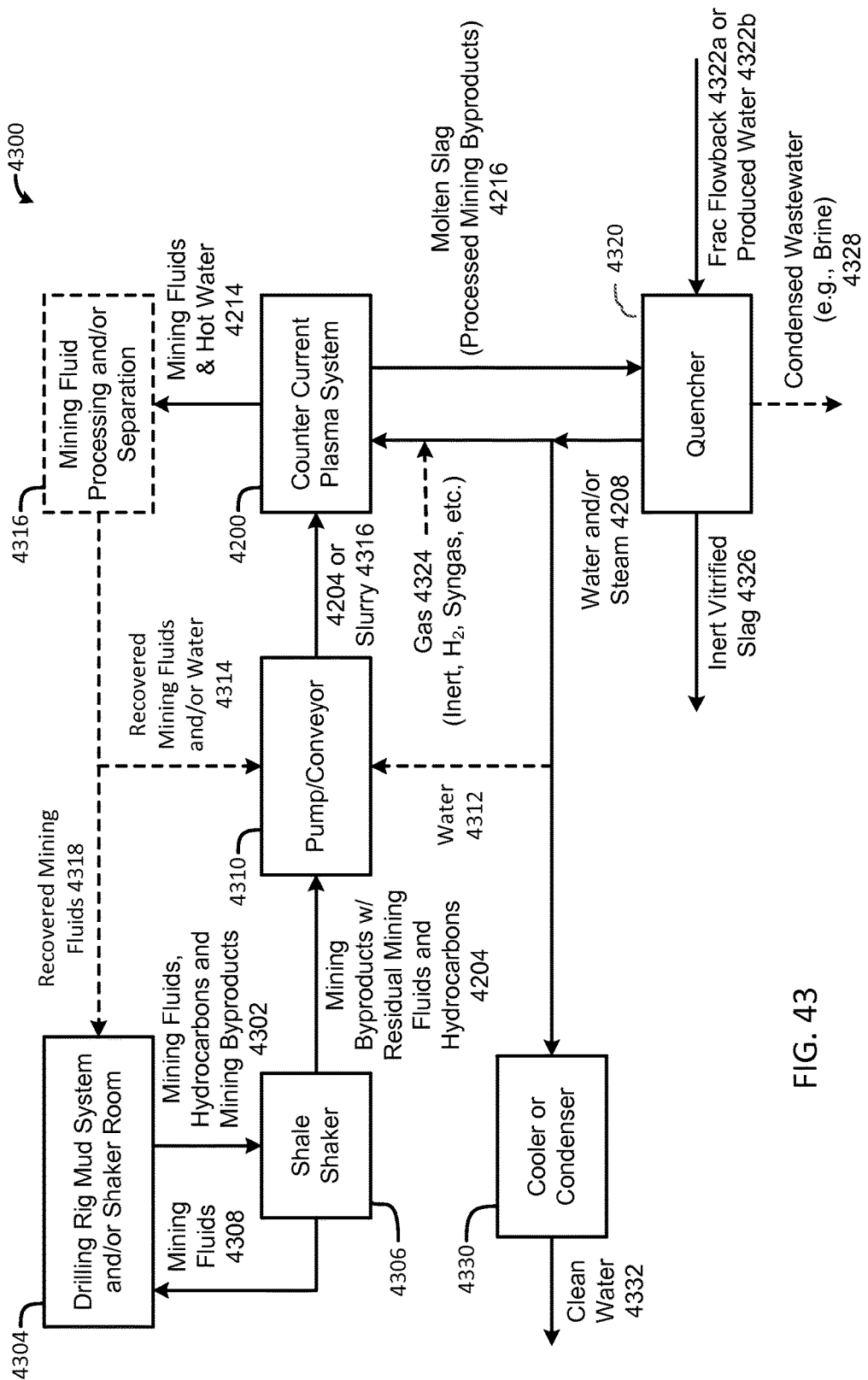
FIG. 43 is a block diagram of a closed loop mining waste steam plasma system in accordance with another embodiment of the present invention.

Now referring to FIG. 43, a block diagram of a Closed Loop Drilling Fluids Recovery System, Method and Apparatus 4300 is shown in accordance with one embodiment of the present invention. Mining fluids, Hydrocarbons and Mining Byproducts 4302 from a drilling rig mud system and/or shaker room 4304 report to a shale shaker 4306. Mining Fluids 4308 are returned to the drilling rig mud system 4304 while cuttings (mining byproducts with residual mining fluids and hydrocarbons) 4204 fall from the shaker 4306 and into a mud/cuttings pump/conveyor system 4310. The pump/conveyor system 4310 may be a cement/concrete pump, centrifugal pump, progressive cavity pump, screw conveyor, auger, eductor, ejector, ram feeder, pneumatic conveyor and/or any conveyance means for transporting the cuttings (mining byproducts with residual mining fluids and hydrocarbons) 4204 from the shaker 4306 to the counter current plasma system 4200. Alternatively, water 4312 or recovered mining fluids and/or water 4314 can be added to the cuttings (mining byproducts with residual mining fluids and hydrocarbons) 4204 to form a slurry 4316 to flow the materials through the counter current plasma system 4200 more easily.

The counter current plasma system 4200 produces recovered mining fluid and hot water 4214, which reports back to the drilling rig mud system 4304 and/or is used as a motive fluid 4314 in the mud/cuttings pump/conveyor 4310 for producing a slurry 4316 for transport back to the plasma system 4200. The recovered mining fluid and hot water 4214 may also undergo further processing and/or separation 4316 in which case the recovered mining fluid 4318 can be stored or sent back to the drilling rig mud system 4304. The plasma system 4200 heats and melts the mining byproducts or cuttings producing a molten slag 4216 that is quenched in a water quench system 4320. Ideal fluids for the water quench system 4320 are frack flowback 4322a from a well that has been hydraulically fractured and/or produced water 4322b from a producing well, but other sources can be used. This allows for recovering and recycling water in lieu of injection into a disposal well. Gases (e.g., inert gases, hydrogen, syngas, etc.) from a gas source 4324 may also be injected into the plasma system 4200.

An inert vitrified slag 4326 is removed from the water quench unit or vessel (quencher) 4320 that may be used in construction and metallurgical applications, such as roads on the farm, ranch or property where the well is drilled. The slag 4326 may be suitable for grinding and use as a cement additive for cementing the well. Likewise, another alternative use for the slag 4326 may be as a proppant or proppant ingredient. Hence, the slag 4326 is a fully fired ceramic material. Thus, the use of the slag 4326 as a cement or proppant additive allows for returning the material back into the well. It will be understood that frack flowback 4322a and/or produced water 4322b contains insoluble salts/chlorides. Thus, the quench water can be concentrated and thus only concentrated brine 4328 will need to be disposed of via an injection well. This will reduce transportation costs.

The water quench unit or vessel (quencher) 4320 can be rated for pressure. Thus, a mixture of steam and/or hot water 4208 can be produced within the quench vessel 4320. This allows for flowing hot water, steam and/or a combination of both to the plasma system 4200 and/or to the cooler/condenser 4330. It will be understood that the cooler/condenser 4330 may use any fluid available as the heat exchange fluid. Clean water 4332 exits from the cooler/condenser 4330 for reuse and recycle as drill water and/or frac water.

Figure 44:
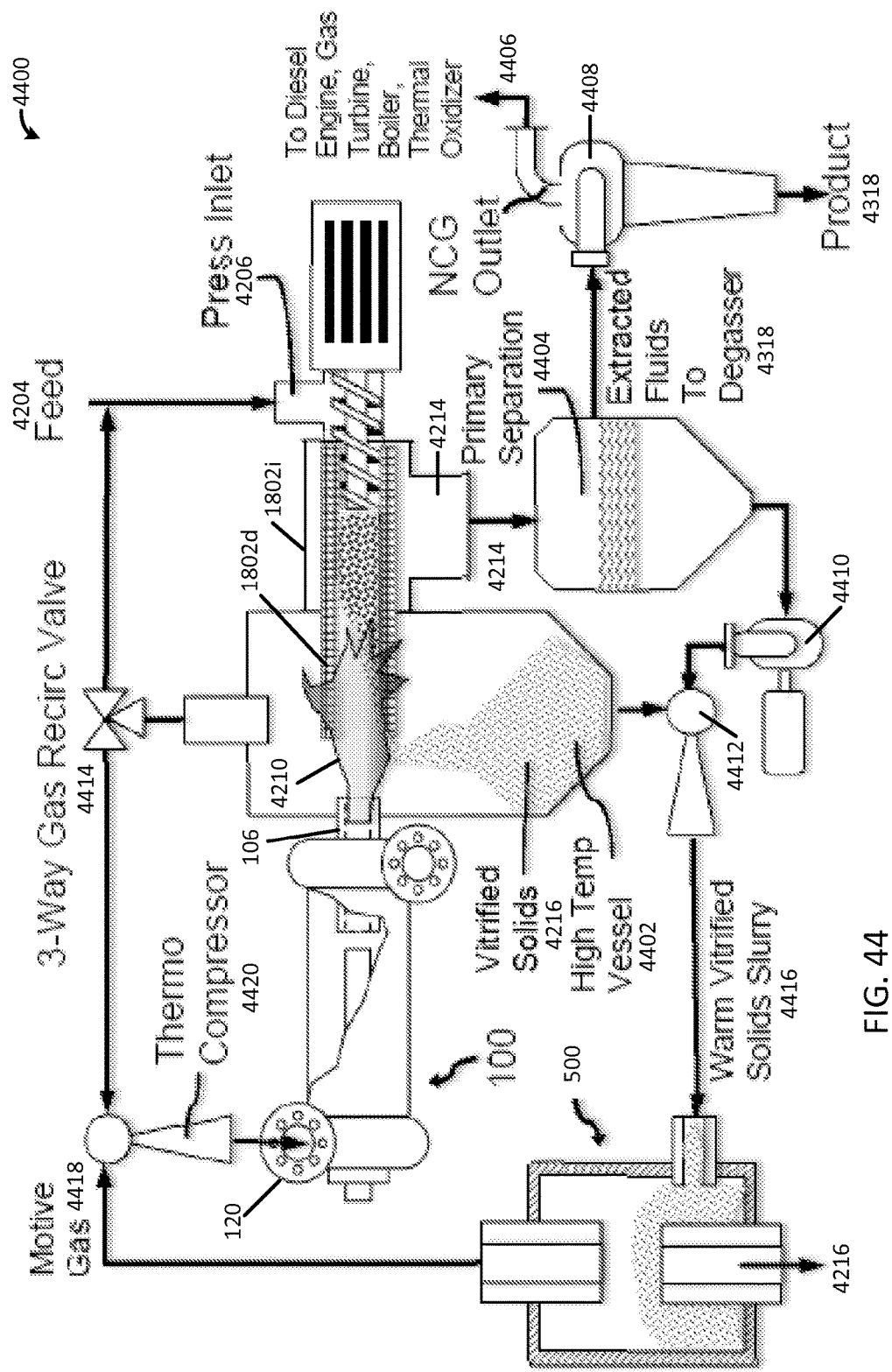
FIG. 44 is a block diagram of a closed loop mining waste steam plasma system in accordance with another embodiment of the present invention.

FIG. 44 is another embodiment of the present invention's plasma system 4400 disclosing a High Temperature Vessel 4402 for holding vitrified molten solids 4216. The operation of the counter current plasma torch 100, filter screen 1802d, screw feeder 1802g and a tee 1802i were described in reference to FIG. 42. The mining fluids and hot water 4214 flow out of the outlet of the tee 1802i into a primary separation system 4404, which separates the recovered mining fluids from the water. The extracted mining fluids 4318 can be further separated into a recovered mining fluids (product) 4318 and gases (e.g., hydrogen) 4406 using a degasser 4408. The recovered mining fluids (product) 4318 can be fed back to the mud system or stored. The gases 4406 can then be used to upgrade the fuels sources for diesel engine, gas turbines, boiler, thermal oxidizers, etc. The water from the primary separation system 4404 is feed to a pump or compressor 4410 to be used as the motive fluid for eductor 4412.

The high temperature vessel 4402 collects the vitrified solids 4216 dropping from the filter screen 1802d and allows steam and gases to be extracted to three-way gas recirculation valve 4414. The eductor 4412 is used to quench and recover heat from the vitrified solids 4216. The resulting vitrified solids slurry 4416 is flowed into the glow discharge system 500 of FIG. 5. The glow discharge system 500 produces steam and hydrogen 4418, which are used as the motive gas for thermo-compressor 4420 connected to the tangential inlet 120 of the counter current plasma torch 100. The cooled vitrified solids 4216 exit the bottom of the glow discharge system 500 Steam and gases from the three-way gas recirculation valve 4414 are fed to the thermo-compressor 4420 and/or the feed stream 4204 to the screw feeder 1802g. Hydrogen form the glow discharge cell 500 can also be co-fed with diesel and/or natural gas to engines to reduce combustion emissions via lean combustion.

Figure 45:
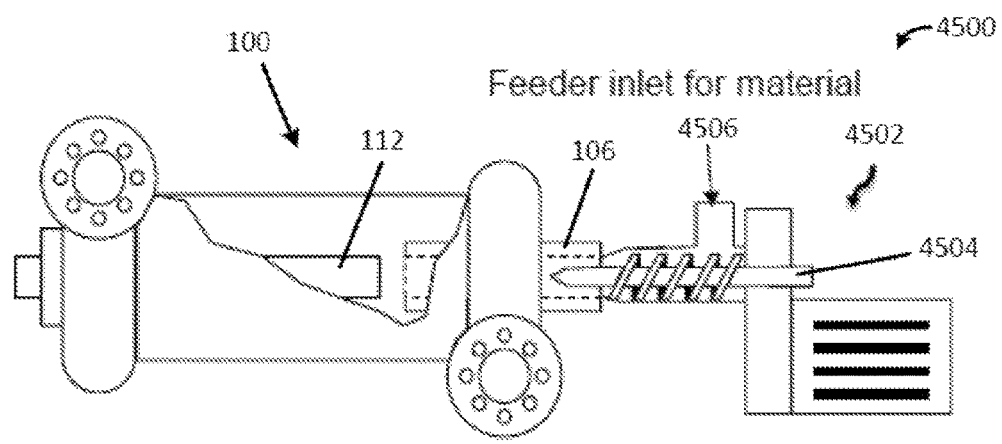
FIGS. 45-49 are diagrams of various steam plasma treatment systems using various types of screw feeders in accordance with the present invention.

FIG. 45 is another embodiment of the present invention 4500. Hollow shaft screw presses 4502 are well known and well understood. Although a screen for separating solids from liquids is not shown, it will be understood that one can be installed in the system 4500. Within the hollow shaft a stinger electrode 4504 is installed for continuous 24/7 operation of the ArcWhirl® torch 100. This configuration allows for feeding the first electrode 112 and the stinger electrode 4504 towards one another. Likewise, this configuration allows for transferring the arc from the nozzle 106 to the stinger electrode 4504 and thus centering the arc between the electrodes. Thus, it is extremely difficult to "BLOW" out the arc because the arc is confined between the electrodes. Drill cuttings or other mining byproducts are introduced into the feeder inlet 4506 and pressed towards the plasma generated by the arc in the ArcWhirl® torch 100. As previously disclosed the drill cuttings may be backflowed directly into the ArcWhirl® torch 100.

Figure 46:
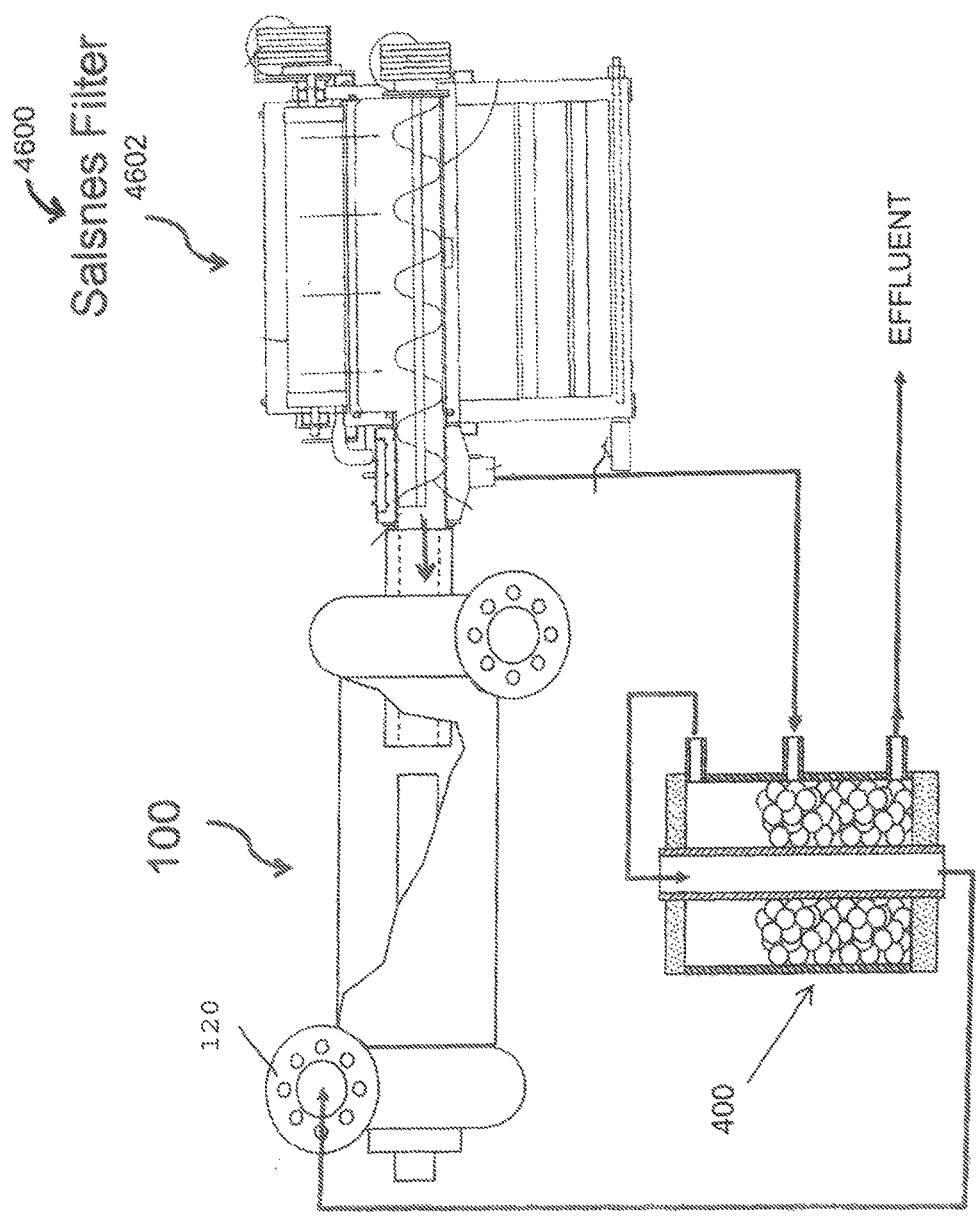

Various other steam plasma embodiments using different types of screw feeders are shown in FIGS. 46-49. FIG. 46 shows an embodiment 4600 of the present invention wherein a Salsnes Filter 4602 by Trojan UV (see U.S. Pat. No. 6,942,786 which is incorporated herein in its entirety) is attached to the ArcWhirl® torch 100. A glow discharge system 400 of FIG. 4 is attached between an outlet of the Salsnes Filter 4602 and the tangential inlet 120 of the ArcWhirl® torch 100.

Figure 47:
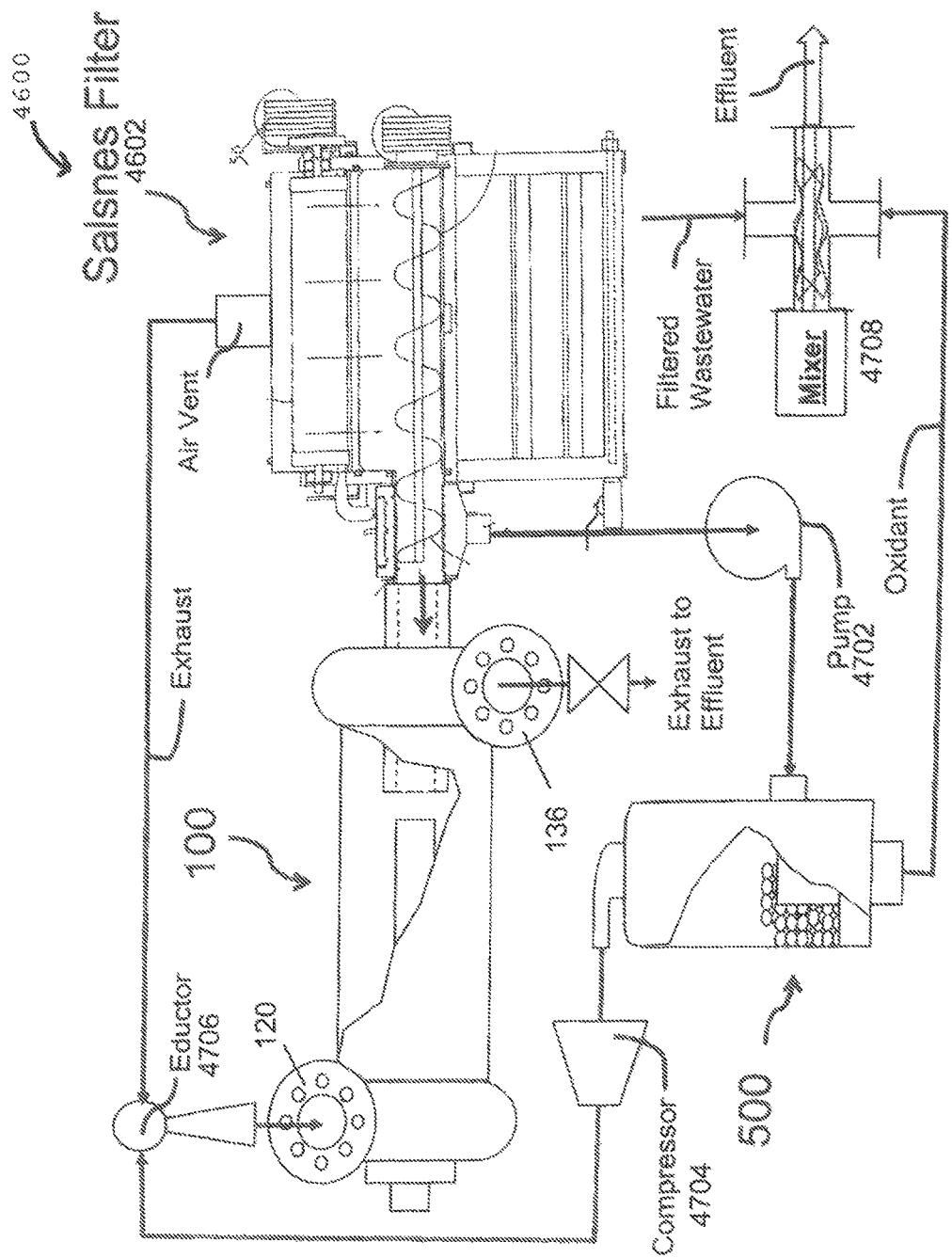

Similarly, FIG. 47 shows an embodiment 4700 of the present invention wherein a Salsnes Filter 4602 by Trojan UV (see U.S. Pat. No. 6,942,786) is attached to the ArcWhirl® torch 100. A glow discharge system 500 of FIG. 5 has an inlet attached a pump 4702 connected to an outlet of the Salsnes Filter 4602 and an outlet attached to a compressor 4704, which is connected to an eductor 4706. A mixer 4708 is also attached between an outlet (filtered wastewater) of the Salsnes Filter 4602 and the glow discharge system 500 to mix oxidant with the filtered wastewater to produce the effluent. The exhaust from the Salsnes Filter 4706 is vented and flowed to the eductor 4706 to be injected into the tangential inlet 120 of the ArcWhirl® torch 100. The exhaust from the tangential outlet 136 of the ArcWhirl® torch 100 is flowed to the effluent.

Figure 48:
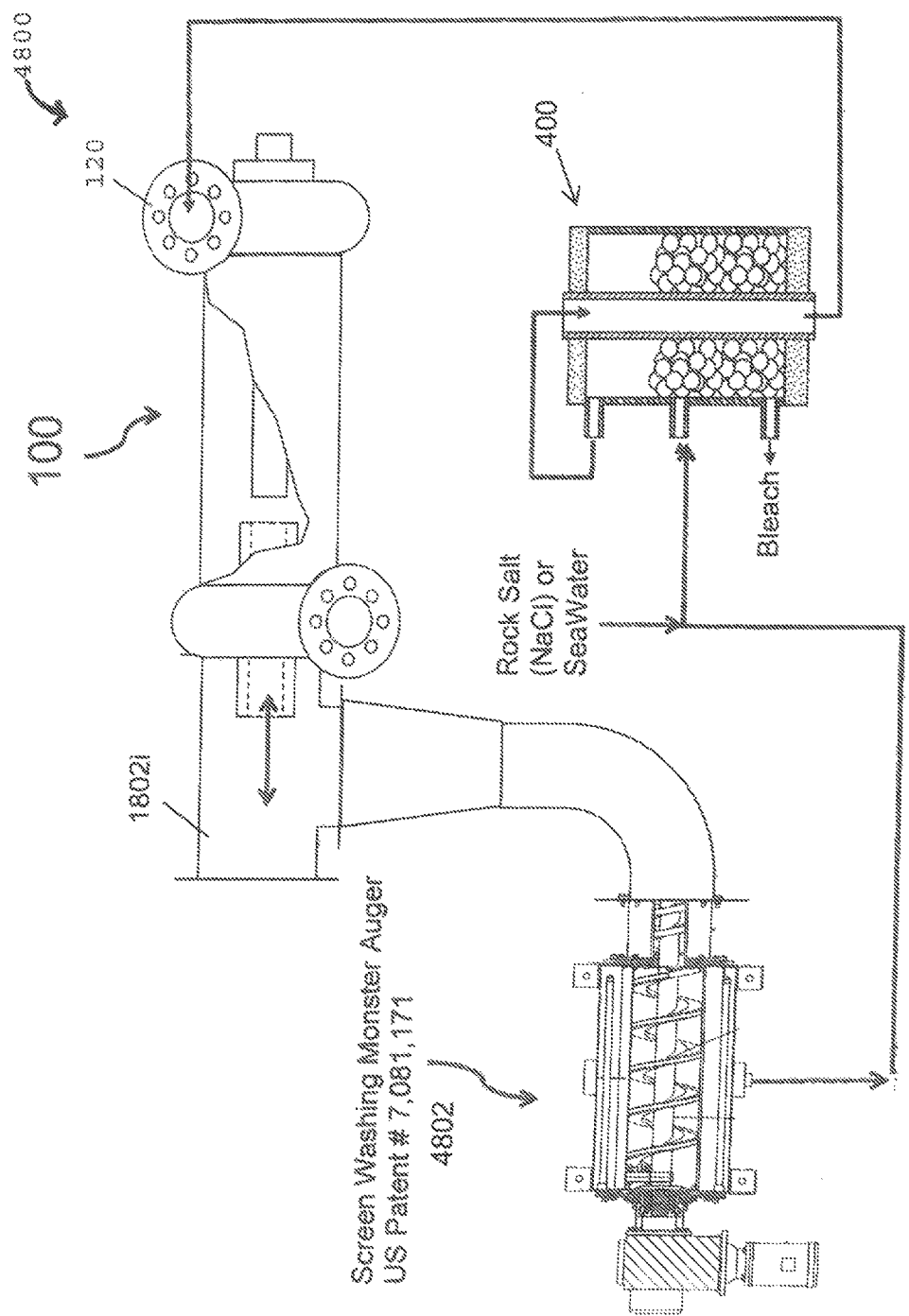

FIG. 48 shows an embodiment 4800 of the present invention in which a Screen Washing Monster Auger 4802 (see U.S. Pat. No. 7,081,171 which is incorporated herein in its entirety) is attached to a tee 1802i connected to the ArcWhirl® torch 100. A glow discharge system 400 of FIG. 4 is attached between an outlet of the Screen Washing Monster Auger 4802 and the tangential inlet 120 of the ArcWhirl® torch 100. The Screen Washing Monster Auger 4802 separates material to be processed into fluids and solids. The fluids are fed and mixed with rock salt or sea water to form an electrolyte that is then fed into the glow discharge system 400. The glow discharge system 400 produces bleach and steam. The steam is input into the tangential inlet 120 of the ArcWhirl® torch 100. The solids are pushed up into the tee 1802i where the plasma from the ArcWhirl® torch 100 reacts with and vitrifies the solids.

Figure 49:
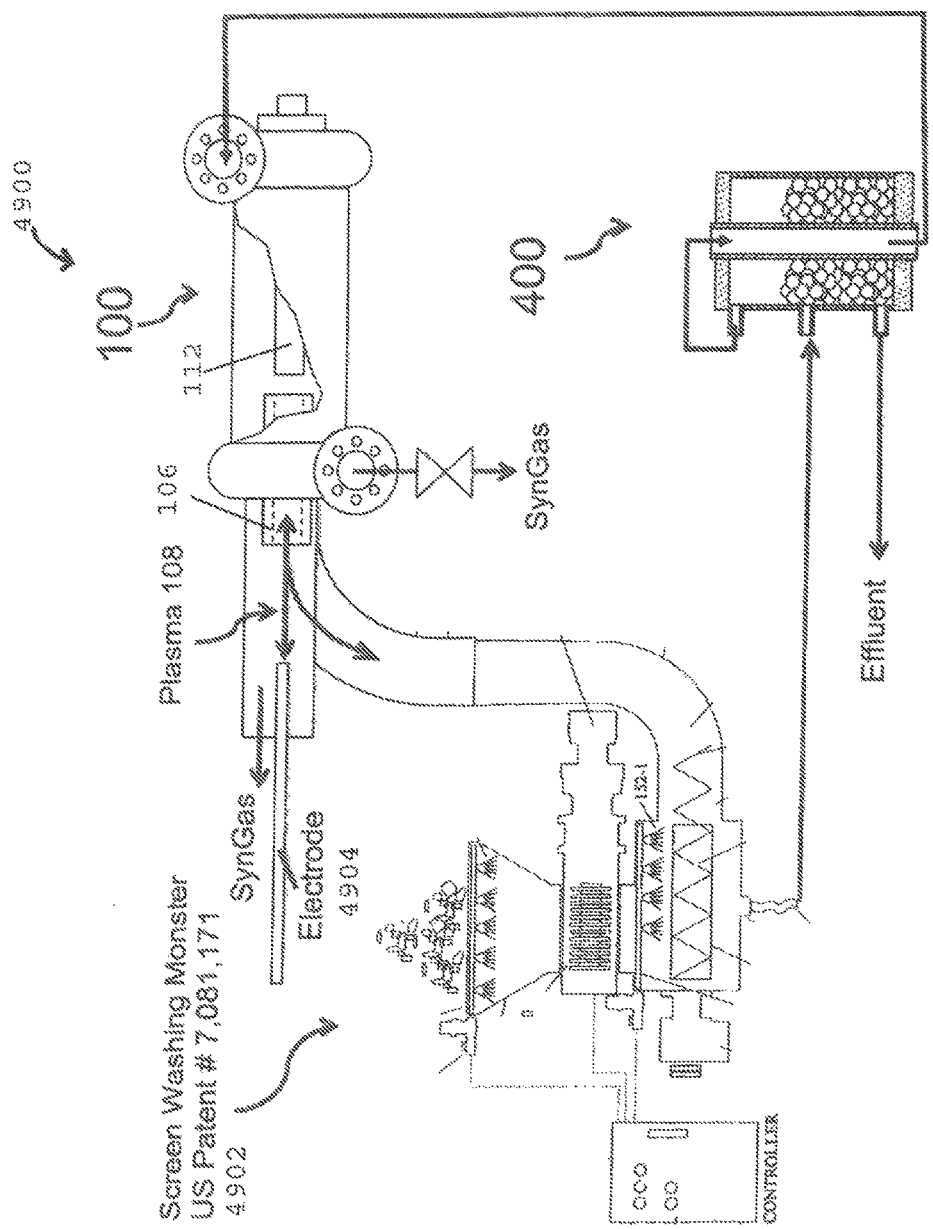

Similarly FIG. 49 shows an embodiment 4900 of the present invention in which a Screen Washing Monster Auger 4902 (see U.S. Pat. No. 7,081,171) is attached to a curved tee 1802i connected to the ArcWhirl® torch 100. A glow discharge system 400 of FIG. 4 is attached between an outlet of the Screen Washing Monster Auger 4802 and the tangential inlet 120 of the ArcWhirl® torch 100. The Screen Washing Monster Auger 4802 separates material to be processed into fluids and solids. The fluids are fed into the glow discharge system 400. The glow discharge system 400 produces effluent and steam. The steam is input into the tangential inlet 120 of the ArcWhirl® torch 100. The plasma 108 from the ArcWhirl® torch 100 reacts with and vitrifies the solids producing syngas. A stinger electrode 4904 is installed for continuous 24/7 operation of the ArcWhirl® torch 100. This configuration allows for feeding the first electrode 112 and the stinger electrode 4904 towards one another. Likewise, this configuration allows for transferring the arc from the nozzle 106 to the stinger electrode 4904 and thus centering the arc between the electrodes. Thus, it is extremely difficult to "BLOW" out the arc because the arc is confined between the electrodes.

Figure 50:
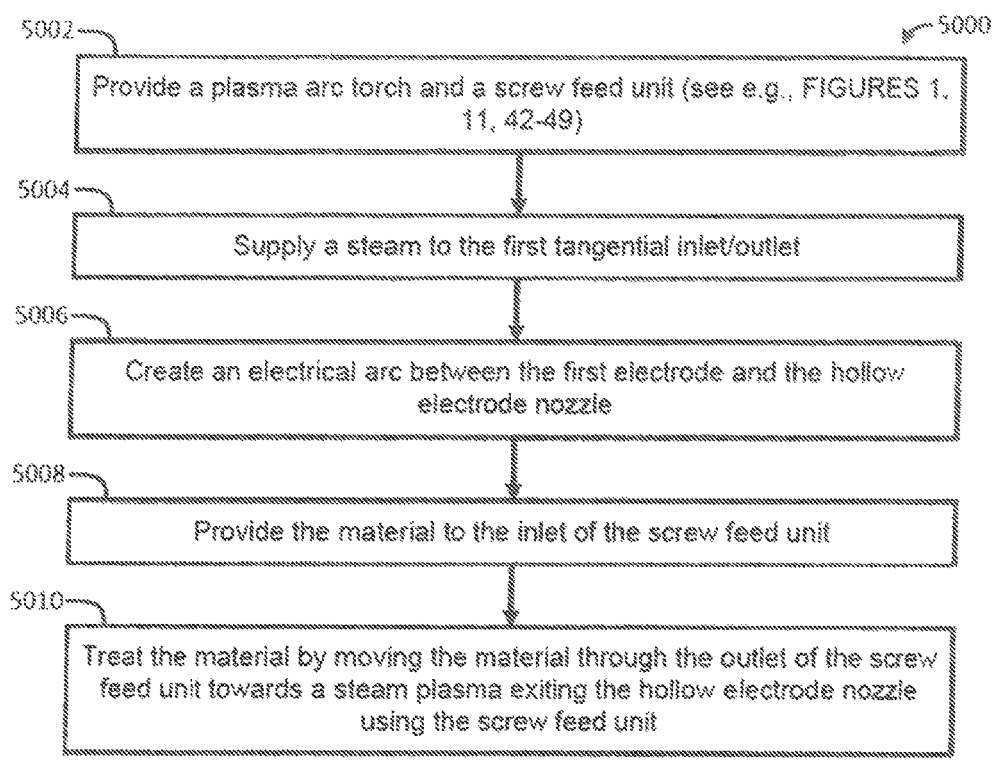
FIG. 50 is a flow chart of a method for treating a material in accordance with various embodiments of the present invention.

As illustrated in FIGS. 42-49 and shown in FIG. 50, the present invention provides a method 5000 for treating a material. A plasma arc torch and a screw feed unit are provided in block 5002, which can be any of the embodiments shown in FIGS. 1, 11 and 42-49, any combinations thereof, or modifications recognized by those skilled in the art. In its simplest form, the plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. The screw feed unit has an inlet and an outlet, the outlet aligned with the centerline and proximate to the hollow electrode nozzle. A steam is supplied to the first tangential inlet/outlet in block 5004. An electrical arc is created between the first electrode and the hollow electrode nozzle in block 5006. The material (e.g., a mining byproduct containing a mining fluid, etc.) is provided to the inlet of the screw feed unit in block 5008. The material is treated by moving the material through the outlet of the screw feed unit towards a steam plasma exiting the hollow electrode nozzle using the screw feed unit in block 5010. The treatment produces a fluid (e.g., a recovered mining fluid such as a recovered drilling fluid, etc.) and an inert vitrified slag (e.g., an inert vitrified mining byproduct slag such as an inert vitrified drill cuttings, etc.).

Other steps may include, but are not limited to: (a) injecting a gas into the steam before the steam is supplied into the first tangential inlet/outlet; (b) pumping or conveying the material to inlet of the screw feed unit; (c) quenching the vitrified material with water, frac flowback or produced water; (d) quenching the vitrified material produces the steam that is fed into the first tangential inlet/outlet; (e) separating the fluid into a recovered fluid and water; and/or (f) producing the steam using a glow discharge system. Additional steps are apparent to those skilled in the art in light of FIGS. 42-49.

Example 20—Enhanced Oil Recovery for Heavy Oil

An impediment to reducing production costs at SAGD facilities is heat transfer via thermal conduction through boiler tubes. The problem is indirect heat transfer. Heat is transferred via radiation, convection and conduction. Indeed, SAGD evaporators and boilers transfer heat via radiation, convection and conduction. Although the flame in the boiler transfers heat via radiation and convection to boiler tubes, heat transfer through boiler tubes is solely via thermal conduction.

When the heat transfer surface of the boiler tubes becomes coated with contaminants, for example silica, then heat transfer is reduced and the boiler and/or evaporator must be shut down for maintenance. At SAGD facilities this is a common problem, especially with silica, and is now being viewed as non-sustainable. The silica is produced with the oil sand. Hence, sand contamination via volatile silica compound evaporation, as well as volatile organic compounds ("VOCs") is an inherit problem in current EOR operations utilizing traditional water treatment methods with boilers and once through steam generation equipment.

If a non-plugging evaporator, boiler, steam generator and/or system, method or apparatus could use the water straight from the oil/water separator and produce 100% quality or superheated steam, then this eliminates the need and operating costs associated with water treatment and fossil fueled fired once through steam generators and boilers. Simply put it reduces the production costs of existing SAGD facilities as well as Capital Expenses for new facilities.

Furthermore, if the same system could be operated on just electricity, especially from renewable resources such as wind, solar, hydro or even biomass, then this allows for reduced, zero air emissions and/or carbon neutral operations. Furthermore, if the same all electrical system is capable of producing hydrogen, then this opens the door for upgrading at the wellhead and/or in situ. Thus, the true impetus is not oil at $60/barrel, but producing higher quality oil at the wellhead without the associated problems and costs for operating a large water treatment facility as well as a large upgrader.

The present invention provides a glow discharge electrode evaporator and/or boiler that can operate with produced water directly from an oil/water separator. Moreover, the present invention provides an electrode evaporator and/or boiler coupled to a plasma superheater for producing very high quality steam (approximately 100%) and hydrogen.

SAGD facilities refer to saturated or wet steam as steam that is less than 100% quality. For example, 85% quality steam in their words is steam that is 85% vapor and 15% moisture and/or water. On the other hand, 100% steam is just vapor with no moisture/water. The term, superheated steam, is rarely used or heard of in SAGD operations. Likewise another term commonly used in SAGD operations is Steam to Oil Ratio ("SOR"). SOR is the most relied upon number for calculating and predicting profitable operations based upon the price of crude oil. Simply put, the cost to produce steam is based upon water treatment and current fuel prices. And utilizing natural gas to produce bitumen from oil sands is no longer feasible for many reasons.

If the water treatment plant can be eliminated and fuel costs reduced or eliminated then this opens the door to a more sustainable SAGD plant. If the only residual waste is brine, then this helps eliminate the costs associated with hauling and disposal of waste.

Upgrading is another major obstacle with production of heavy oil. Heavy oil requires upgrading to decrease the viscosity in order to produce a marketable "CRUDE OIL" that can be refined in modern day refineries. Upgraders are very expensive to construct, maintain and operate. The upgrading spread similar to the term "CRACK SPREAD" is the value of the incoming raw product, for example bitumen, to the value of the upgraded bitumen—synthetic crude oil. It is the Upgrading Spread that allows for heavy oil producers to undertake a massive construction project such as an Upgrader.

Although an upgrader will produce a pipeline quality synthetic crude, the downside to COKING crude oil is the production of coke. And coke cannot be moved through a pipeline. Thus, this is a stranded byproduct that if could be used in an EOR process as fuel would change the game with respect to using clean burning natural gas for producing heavy oil.

Figure 51:
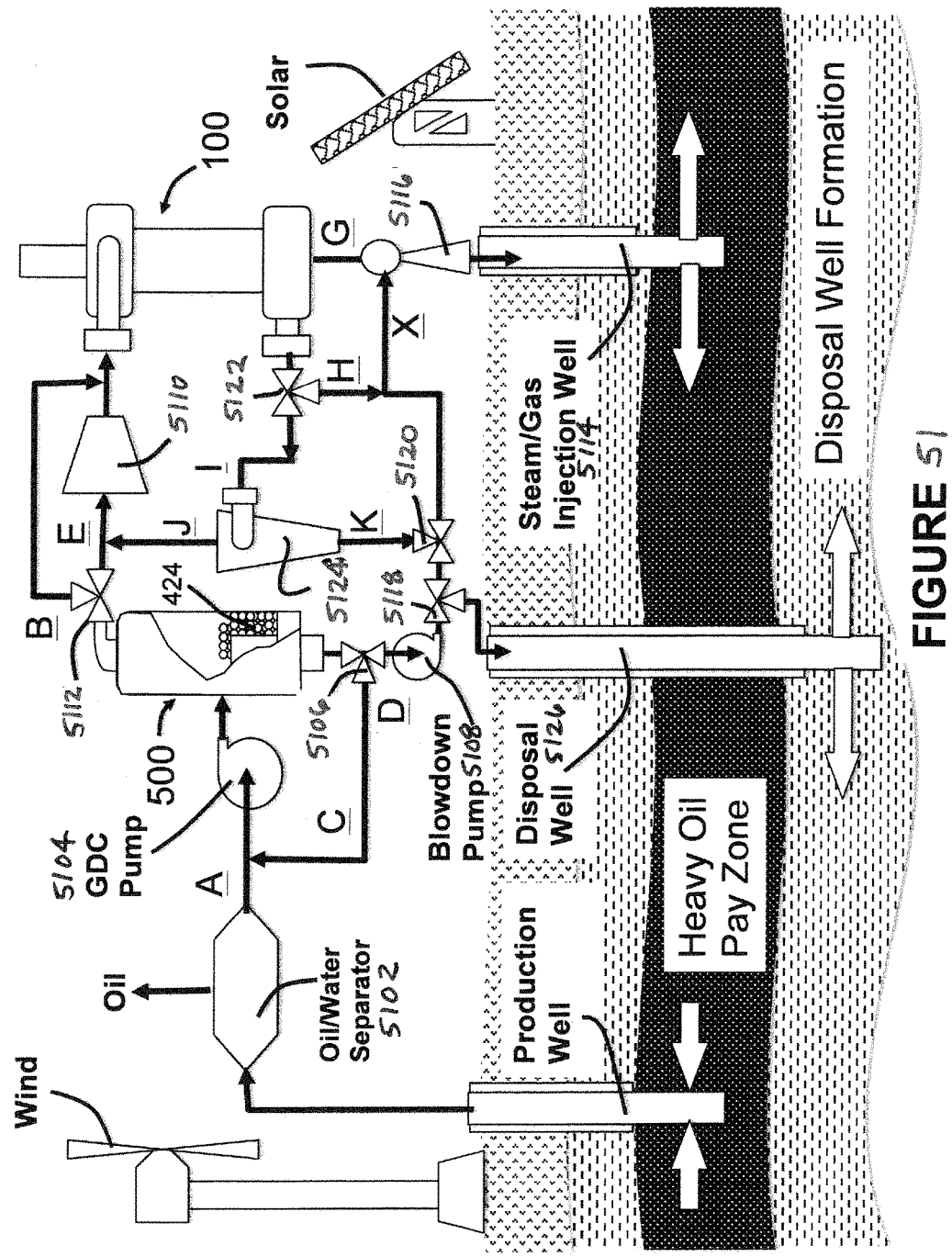
FIG. 51 is a cross-sectional view of a Solid Oxide Glow Discharge Cell and Plasma Arc Torch Enhanced Oil Recovery System in accordance with another embodiment of the present invention.

Turning now to FIG. 51, SOGD Plasma EOR, while referring to FIGS. 1, 4, 5, 6 and 7, and specifically units 100, 400, 500, 600 and 700, an all electrical system is disclosed for Enhanced Oil Recovery of Heavy Oil. Produced water A from an oil/water separator 5102 is flowed into a Glow Discharge Cell ("GDC") Pump 5104 then into the Solid Oxide High Temperature Glow Discharge Electrolysis Cell 500. The Cell 500 may be configured as shown in FIG. 4, 5 or 52. A very good granular media 424 for Enhanced Oil Recover is petroleum coke, commonly referred to as "petcoke". The petcoke may be used in a green or calcined state. Other types of granular media can be used 424.

Petroleum coke is produced through the thermal decomposition of heavy petroleum process streams and residues. The three most common feedstocks used in coking operations are: (1) reduced crude (vacuum residue); (2) thermal tar; and (3) decant oil (catalytically cracked clarified oil) (Onder and Bagdoyan, 1993). These feedstocks are heated to thermal cracking temperatures and pressures (485 to 505° C. at 400 kPa) that create petroleum liquid and gas product streams. The material remaining from this process is a solid concentrated carbon material, petroleum coke (Ellis and Paul, 2000b; EC, 2003). Additional information on petcoke can be found in: (1) the American Petroleum Institute's report to the EPA entitled "Petroleum Coke Category Analysis and Hazard Characterization" (Dec. 28, 2007) at http://www.epa.gov/hpv/pubs/summaries/ptrlcoke/c12563rr2.pdf; (2) an EPA report on the low level toxicity of Petroleum Coke at http://www.epa.gov/chemrtk/hpvis/hazchar/Category_Petroleum %20Coke_June_2011.pdf; and (3) a NASA report entitled "ELECTRICAL PROPERTIES OF PETROLEUM COKE FROM PIPELINE CRUDE OIL" (September 1976) at http://ntrs.nasa.gov/archive/nasa/casi.ntrs.nasa.gov/19760024217_1976024217.pdf.

U.S. Pat. No. 8,087,460 discloses a process for resistive heating oil shale in situ using petroleum coke as a resistor between two electrodes and/or electrical conductors. In addition, the specification states in part, "As an alternative, international patent publication WO 2005/010320 teaches the use of electrically conductive fractures to heat the oil shale. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation extending from horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity. The WO 2005/010320 process creates an "in situ toaster" that artificially matures oil shale through the application of electric heat. Thermal conduction heats the oil shale to conversion temperatures in excess of 300° C., causing artificial maturation."

Returning back to FIG. 51, a gas mixture B, consisting mainly of steam with small amounts of hydrogen and other non-condensible gases ("NCGs"), is generated within the Cell 500. Liquids are blown down from Cell 500 through a 3-way valve 5106. Liquids C can be recirculated to the suction side of the GDC Pump 5104 and/or liquids D can be flowed into the suction of a blowdown pump 5108. The NCGs produced within the Cell 500 are based upon the ions within the produced water in addition to electrolytes added to the water. For example, if sodium carbonate and/or bicarbonate are present, then the NCGs produced may be hydrogen and carbon dioxide. In addition, volatile material within the green petcoke 424 will produce additional gases. Likewise, the high temperature glow discharge will steam reform the petcoke near the cathode, thus enhancing the production of syngas.

In addition, electrolytes, such as sulfuric acid, may be added to change the composition of the gas produced within the Cell 500. The Cell 500 may be operated as an evaporator with the vapor compressor 5110 by flowing the gases E via a 3-way valve 5112 to the compressor 5110. On the other hand, the Cell 500 may be operated as a boiler using a high pressure feedwater GDC pump 5104 and opening the 3-way valve 5112 to flow as gas B bypassing the vapor compressor 5110. However, it will be understood that the Cell 500 can be operated as a hybrid evaporator boiler using both the vapor compressor 5110 and the pump 5104.

From Cell 500, the gases E and/or B are then flowed into the Plasma ArcWhirl Torch 100. The vapors are superheated and then converted to a steam/NCGs plasma G then discharged into the injection well 5114 for EOR. An eductor 5116, hereinafter to mean and include but not limited to a thermocompressor, ejector, injector, mixer, and desuperheater may be attached to the plasma G discharge. The eductor 5116 may be attached such that either fluids X or G are the motive fluid. The operation and use of eductors are well known and well understood thus need no further explanation.

Optical pyrometer measurements of the steam/hydrogen plasma G were taken when sodium carbonate was used as the electrolyte within the GDC 500. Temperatures were measured at +3,000° C. (+5,400° F.). Consequently, back mixing concentrated blowdown D via the Blowdown pump 5108 by aligning valves 5118 and 5120 allow for ZERO discharge into the disposal well.

The plasma arc torch 100 can be throttled by placing valve 5122 on the discharge volute of the ArcWhirl® Torch 100. This is completely unheard of within the plasma cutting industry. The amount of fluid flowing through the anode nozzle 106 as shown in FIG. 1 can be adjusted from 0 to 100%. Thus, the ArcWhirl® Plasma Torch as disclosed in FIG. 1 has an infinite turndown ratio. With the proper power supply it can be operated in a resistive heating mode by simply dead shorting the cathode 112 to the anode nozzle 106 thus shutting flow through the hollow portion 128 of the anode nozzle 106. As a result, all of the fluid will exit the Torch 100 tangentially via volute 102 through outlet 118 as the discharge 134.

Once again with the proper power supply, the ArcWhirl® Torch can be operated in a resistive heating mode. Thus, any fluid closely approaching and/or touching the anode 106 and/or cathode 112 will be heated with EMR emitted from the resistive element as well as via conduction and convection by heating gases and/or fluids near the resistive element. It will be understood, that if the ArcWhirl® Torch 100 is to be operated in a continuous resistive heating mode, then the anode 106 should be electrically isolated from the vessel 104 and volute 102. Resistive heating is also commonly referred to as Joule Heating.

As previously disclosed 100% steam quality is crucial for lowering the SOR in SAGD facilities. The Plasma ArcWhirl® Torch as disclosed in FIG. 1 is a liquid/gas separator and extreme steam superheater that can be controlled with the linear actuator and the 3-way valve 5122 attached to the tangential exit. As previously disclosed when the linear actuator 114 moves as shown by arrow 126 the cathode electrode 112 towards the anode nozzle 106, it is dead-shorted to the anode nozzle 106. Thus, no fluid will flow through the nozzle 106. The combination of the cathode electrode 112 and anode nozzle 106 form a valve. When dead shorted the valve is in the closed position. When the linear actuator 114 moves the cathode electrode 112 away from the anode nozzle 106, the valve opens. As previously disclosed, when in the closed and dead short position, the power supply is turned ON. Once again, the dead short causes resistive heating of the electrodes. When the cathode electrode 112 is moved away from the anode nozzle 106 and an arc is formed between the cathode 112 and anode 106. If fluid is discharged 134 from the tangential outlet 118, then a very small plasma 108 will be discharged from the anode nozzle 106.

Now returning back to FIG. 51, a 3-way valve 5122 is connected to the tangential outlet 118 of the ArcWhirl® Torch 100. During testing with the 3-way valve 5122 attached as shown, when the valve 5122 is fully closed, the plasma 108 was discharged from the ArcWhirl® Torch 100 and measured with an optical pyrometer. With the gases produced from the Cell 500, the plasma 108 was measured at +3,000° C. (+5,400° F.). With only air, the plasma 108 was measured at +2,100° C. (+3,800° F.). The system as shown in 700 was operated with a ceramic eductor 5116. The ceramic eductor 5166 was actually a ceramic TEE provided by Bausch Ceramics. However, the velocity of the plasma G was sufficient to pull a vacuum through the perpendicular entrance of the TEE, thus it operated as an eductor. To date the ceramic TEE has not cracked and has survived both rapid heating and cooling without any signs of deterioration.

The present invention provides a high quality steam (approximately 100%) for EOR. If the operator desires to reduce the temperature of the steam plasma 108 shown in FIG. 1 and shown as G in FIG. 51, the power supply amps and/or volts can be adjusted in addition to opening 3-way valve 5122 to discharge as a gas I to cyclone separator 5124 or a gas H and drawn back into the plasma G with an injection eductor 5116. However, if maximum steam quality, for example an extreme steam plasma G is required, then the 3-way valve 5122 will be shut. In order to reduce the temperature of the steam injected into the well and increase mass flow, then blowdown liquid stream D may be mixed with the plasma steam/NCGs plasma G. This will eliminate disposal into an injection well by using a 3-way valve 5118. The blowdown pump 5108 ensures that the liquid G is pressurized and can be used as the motive fluid X for the eductor 5116. An ideal injection eductor 5116 for this application is a peripheral jet eductor, for example the PeriJet® Eductor manufactured by Derbyshire Machine, Philadelphia, Pa. It will be understood that plasma G may be used as the motive fluid for the eductor 5166 by using a single jet eductor. If blowdown G from the Cell 500 must be discharged into the disposal well 5126, then the 3-way valve 5118 would be opened for injection into the disposal well 5126. A 3-way valve 5120 may be opened to allow fluid underflow K from the cyclone separator 5124 to flow into the eductor 5116. Overflow I from the cyclone separator 5124 would flow into the gas E entering into the compressor 5110.

The Plasma ArcWhirl® Torch 100 has nearly an infinite turndown. For example, by adjusting 3-way valve 5122, the amount of fluids going through the Anode Nozzle 106 as shown in FIG. 1 and converted to plasma G can be from 0% to 100% of total flow into the ArcWhirl Torch 100. Referring to FIGS. 1 and 51, the ArcWhirl Torch 100 may be started and operated in accordance with the following steps:

1. 3-way valve 5122 is fully opened to allow discharge through the second volute.
2. The Cathode Electrode is dead shorted to the Anode acting as a valve to prevent flow entering into the Anode Nozzle.
3. When Steam/NCGs flow into the ArcWhirl is established, the power supply is turned on and the Cathode Electrode is slowly withdrawn establishing an arc between the Cathode and Anode.
4. Voltage will increase as the distance between the cathode and anode increases.
5. Amps can be adjusted with the power supply's potentiometer.
6. Next, the 3-way valve 5122 is slowly closed so that all of the steam/NCGs must flow through the anode nozzle.
7. The 3-way valve 5122, the cathode position and distance from the anode, and the potentiometer can be adjusted to infinitely control the volume and temperature of the Steam/NCGs Plasma G discharged from the ArcWhirl® Torch.

A unique and unobvious method will be demonstrated for production of heavy oil with renewable energy and petcoke. Renewable energy may be in the form of solar, wind, hydro and/or biomass. Biomass would be converted to Plasma BioChar™ and syngas would be provided lean combustion (see U.S. Pat. No. 8,074,439). In addition, any waste material, such as Municipal Solid Waste could be converted to a fuel and energy for use in the present invention. Furthermore, Coke produced from upgrading bitumen would be an ideal fuel for lean combustion with the present invention. Likewise, as previously stated Coke is an ideal granular media 424 for use in the GDC Cell. However, it will be understood that granular petcoke can be directly injected into the Plasma G with the eductor 5116 and thus steam reformed as traveling down the Injection Well 5114.

On the other hand, the coke could be plasma steam reformed. By adding oxygen to the syngas it would be combusted and produce high temperature steam and carbon dioxide ("$CO_2$"). Once again, the steam and $CO_2$ would be flowed into the injection well 5114 for EOR. A very good configuration for adding coke and oxygen to the coupling plasma steam reforming with oxy combustion is the Plasma Whirl® Reactor disclosed in U.S. Pat. No. 7,622,693. By placing three or more torches on a reactor, the plasma will be confined and allow for complete gasification and oxy combustion of the coke. The oxygen may be reduced in order to produce only syngas.

Turning now to FIG. 52—SOGD CELL FOR EOR—the entire water treatment train as well as the once through steam generator and/or boiler as disclosed in the prior art can be eliminated by utilizing the Enhanced Oil Recovery system, method and apparatus of the present disclosure. Oil and water from the production well is fed to an oil & water separator 5200 where the oil is separated from the oily water. The oily water is fed into the inlet 408 of the Glow Discharge Cell 400 using pump 5201. Petcoke is used as a fuel for many industries. Many oil companies are advocating it as means for sequestering carbon. However, by using Petcoke as the granular media 424 in the Glow Discharge Cell 400 a portion of the Petcoke will be steam reformed and converted to a non-condensible gas. Likewise, as an oxidant selected but not limited to air, oxygen, hydrogen peroxide, ozone may be added to the oily water via the recirculation line 5202 or directly into the inlet 408 of the vessel 402 by means known in the art.

The oxidant will react with the syngas formed from steam reforming the petcoke 424. Consequently, makeup petcoke will have to be added to the replace the granular petcoke 424. This eliminates the need for removal of the granular media petcoke 424 from the vessel. The metals within the petcoke, such as nickel and vanadium may be coated to the cathode tubular 412 and/or may be discharged via outlet 410 and blown down via 3-way valve 5204 for recovery as valuable metals.

Not being bound by theory, it is believed that the sulfur within the petcoke 424 will be converted to sulfur trioxide and then to sulfuric acid and/or sodium sulfate. Thus, another valuable commodity may be recovered with the GDC 400 as disclosed herein.

For EOR purposes the gas exiting from 410 is looped around and flowed 5206 directly into the cathode tubular 412. As previously disclosed the cathode tubular 412 will glow at temperatures exceeding 1000° C. and upwards of the melting point of many metals. However, the typical temperature of the gases exiting the GDC 400 is based upon the pressure within the GDC 400. For example, when operating under one atmosphere using baking soda as the electrolyte and gravel as the granular media 424 the temperature is at or slightly above 100° C. Not being bound by theory, it is believed that the temperature increase above the standard boiling point is do in part to the production of oxygen and hydrogen within the GDC 400 and thus releasing additional heat upon oxidation. This gives rise to operating the GDC 400 as a submerged combustor by using petcoke 424 as the granular material and superheating the gases 5206 with the tubular cathode 412. The gases 5206 will flow down through the tubular and become a superheated gas and flowed into the injection well for EOR purposes.

Referring to FIG. 53—ArcWhirl® GD Cell for EOR—the ArcWhirl® 100 has been tested and operated as a glow discharge electrolysis cell without granular media. By closely comparing and contrasting FIG. 1 with FIG. 4 and FIG. 5, the only difference between the three systems is the means in which material is flowed into each system, straight or tangentially and the lack of a moveable electrode. Oil and water from the production well is fed to an oil & water separator 5200 where the oil is separated from the oily water. The oily water is fed into the inlet 408 of the Glow Discharge Cell 400 using pump 5201. As previously described, the Plasma ArcWhirl® Torch can easily be configured and operated in 4 different modes for EOR: (1) Resistive Heating; (2) Arc; (3) Electrolysis, and/or (4) Glow Discharge.

The Plasma ArcWhirl® can be configured and operated in any of the aforementioned modes simply requires valving and/or a manifold (not shown) for changing the outlet 134 as shown in FIG. 1 to be the inlet 120 as shown in FIG. 12. Now by cycling valve 5302 from shut to open, the ArcWhirl® GDC will be demonstrated for operating in all 4 modes. Likewise, but not shown a valve would be attached to outlet 118.

The ArcWhirl® GDC is started by dead-shorting the cathode to the anode with power supply in the off position. Next, the vessel is partially filled by jogging the pump. And the power supply is turned on allowing the system to operate in a resistive heating mode. The benefit to this system is preventing the formation of gases such as chlorine if sodium chloride is present within the oily water. Saturated gases will exit outlet 118 as a discharge 5304 to another ArcWhirl® Torch or GDC for superheating or to a boiler and/or to the injection well.

If the system is to be operated in an Arc Mode, the cathode is simply withdrawn from the anode. A submerged arc will be formed instantly. This will produced noncondensible gases such as hydrogen and oxygen by splitting water. In order to aid in forming a gas vortex around the arc gases such as but not limited to methane, butane, propane, air, oxygen, nitrogen, argon, hydrogen, carbon dioxide, argon, biogas and/or ozone or any combination thereof can be added between the pump and inlet 120 with an injector (not shown). However, it is well known that hydrogen peroxide will convert to oxygen and water when irradiated with UV light. Thus, the ArcWhirl® will convert hydrogen peroxide to free radicals and oxygen. In addition, it is well known that gases and condensates are produced along with heavy oil. Thus, a portion of the gases can be flowed into the ArcWhirl® GDC for forming a plasma vortex. The present invention has clearly demonstrated a system, method and apparatus for operating a plasma torch in an Arc mode as well as transitioning from a resistive heating mode an arc mode.

In order to transition to an electrolysis mode the electrode is withdrawn a predetermined distance from the anode. This distance is easily determined by recording the amps and volts of the power supply as shown by the graph in FIG. 3. The liquid level is held constant by flowing liquid into the ArcWhirl® GDC by jogging the pump or using a variable speed drive pump to maintain a constant liquid level. Although not shown in FIG. 53, a grounding clamp can be secured to the vessel in order to maintain an equidistant gap between the vessel and cathode, provided the vessel is constructed of an electrically conducted material. However, the equidistant gap can be maintained between the anode and cathode and electrically isolating the vessel for safety purposes. Glass and/or ceramic lined vessels and piping are common throughout many industries.

To transition to Glow Discharge, the distance between the cathode and anode is increased until the ArcWhirl® GDC goes into glow discharge. This is easily determined by watching volts and amps. When in glow discharge the power supply voltage will be at or near open circuit voltage. However, to rapidly transition from Electrolysis to Glow Discharge the valve 5302 is opened to allow the ArcWhirl® GDC 100 to blowdown the liquid to adjust the level for glow discharge. This novel feature also allows for FAIL SAFE OPERATION. If the pump is turned off and all of the water is blowndown from the ArcWhirl® GDC, then the system will not produce any gases. Likewise, a variable speed drive pump may be used to control the liquid level to maintain and operate in a glow discharge mode. Another failsafe feature, such as a spring, can be added to the linear actuator such that the system fails with the cathode fully withdrawn.

Note that the mode of operation can be reversed from Glow Discharge to Electrolysis to Arc and then to Resistive Heating. By simply starting with the cathode above the water level within the vessel, then slowly lowering the cathode to touch the surface of the liquid, the ArcWhirl® GDC will immediately go into glow discharge mode. Continually lowering the cathode will shift the system to electrolysis then to arc then to resistive heating.

Now to operate the ArcWhirl GDC as a plasma torch, water/liquid flow is reversed and blowdown valve 5302 is opened to allow the plasma to discharge from the ArcWhirl® GDC. However, if a sufficient amount of gas in entrained in the water and a gas vortex is formed, the water/liquid can be flowed through the ArcWhirl® GDC 100. However, if outlet 118 is obstructed or a downstream valve is shut, then all of the liquid/water will be flowed through the anode nozzle. The mode of operation, resistive heating, arc, electrolysis or glow discharge will be determined based upon the electrical conductivity of the water/liquid.

Although no granular media is needed for this configuration it will be understood that granular media may be added to enhance performance. Likewise, what has not been previously disclosed is that this configuration always for purging the vessel and removing the granular media by reversing the flow through the system, outlet 118 is used as the inlet and inlet 120 is used as the outlet. This configuration will work for any whether it is more dense or less dense than water and/or the liquid flowing through the system. If the material density is greater than the liquid the granular material will flow through 120. If the material is less dense then the liquid then it will flow the nozzle.

Now referring to FIG. 54—Dual ArcWhirls® for EOR—a second ArcWhirl® Plasma Torch 100 can be placed in series and/or parallel with the ArcWhirl® GDC 500 for operation as a complete system 5400. It will be understood that both units are piped series such that either one is the GDC while the other is the Plasma Torch and/or both are operated in parallel as Glow Discharge Cells or Plasma Torches. Manifolds, valves and headers are very common that allow for operation of filters, pumps and equipment in parallel and/or series.

The Dual ArcWhirl® System 5400 is extremely useful for EOR, especially SAGD applications because standard High Pressure and Low Pressure Steam Separators can be modified and converted to the ArcWhirl® GDC 500 and the ArcWhirl® Plasma Torch 100. By adding the Vapor Compressor between the GDC 500 and Torch 100, the gases from exit 5402 can be compressed to injection well pressure requirements. Once again the Torch 100 is controlled by means of a discharge valve 5404 connected to a compressor recirculation line. In addition, discharge through nozzle 5406 from the GDC 500 unit can be flowed via a 4-way manifold 5408 to the pump recirculation, or as blowdown to an injection well or to the eductor for mixing with the Plasma 5410 and discharge into the injection well. Mixing with the plasma thus allows for a ZERO DISCHARGE SYSTEM and not just a ZERO LIQUID DISCHARGE system.

Example 21—O&G Water Treatment—Produced Water, Frac Flowback, Tailings Water and Refinery Wastewater There are many applications within the Oil & Gas ("O&G") industry that do require steam injection. For example, produced water from producing wells and the current major problem of frac flowback. The frac flowback wastewater problem must be addressed with a simple solution. In contrast, existing systems are complicated and expensive.

Turning now to FIG. 55, by coupling the present invention with the current inventor's Plasma Thermal Oxidizer, U.S. Pat. No. 8,074,439 the costs for treating frac flowback and/or produced water can be reduced by using Petcoke and/or activated carbon as the granular media 424 in the GDC 400.

A MIX (mixture) of Gas, Fluid (produced water, frac flowback) and/or Fuel and/or any combination thereof is flowed into the inlet of the ArcWhirl® 100. The MIX is exposed to Wave Energy. Once again, the plasma 108 is discharged from the anode nozzle and into the Thermal Oxidizer of U.S. Pat. No. 8,074,439. The mixture is discharged B from the ArcWhirl® 100 and is flowed into the Glow Discharge Cell 400. A good granular media 424 is selected from a carbon containing material such as activated carbon, nutshell, woodchips, biochar and/or petcoke. The GDC 400 granular media will trap and filter organics and solids within the mixture. The mixture exits as a Gas through a Gas Outlet and/or as liquid via a Liquid Outlet. The Gas can be flowed via a 3-way valve to a mixing valve and/or to the compressor of the Thermal Oxidizer. The compressed GAS flows through a 3-way throttle valve for feed into the plasma 108 or recycled back into the ArcWhirl® 100.

The gas entering into the Mixing Valve may flow back into the INLET of the ArcWhirl® 100. Next, as disclosed in U.S. Pat. No. 8,074,439 an oxidant is combined with a hot plasma for lean combustion in the thermal oxidizer, Plasma Rocket of FIG. 7, the pump or for converting hot gases to rotational energy. Returning back to FIG. 16 of the present invention while viewing the Recuperators of U.S. Pat. No. 8,074,439 and comparing it to the GDC 400, by flowing the oxidant through the hot tubular cathode the GDC 400 is indeed operated as a recuperator. The Hot Oxidanat E exits through the outlet and to an Oxidant 3-way valve. The oxidant may flow to the mixing valve and to the Gas 3-Way valve or to the Inlet of the ArcWhirl® 100. However, in ordinary operations the oxidant will be flowed from the Oxidant 3-way valve to the Thermal Oxidizer Cyclone and/or combustion chamber of U.S. Pat. No. 8,074,439.

It was thoroughly disclosed that the exhaust from the turbochargers of U.S. Pat. No. 8,074,439 could be discharged directly into water. Consequently, this allows for submerged heating of water by discharging the exhaust of the turbine of the turbocharger underwater by adding an exhaust pipe to the turbine. This can be done in a final pretreatment process of the Liquid Outlet of the GDC 400 of FIG. 55 of the present invention. The present invention of FIG. 55 has disclosed a novel process for treating oily wastewater such as produced water, frac flowback, tailings water from Oil Sands Surface Mining, SAGD water and Refinery Wastewater.

Turning now to FIG. 56—Dual ArcWhirl® Flotation—the present invention is ideally suited for adapting to a flotation cell. Flotation cells such as a Dissolved Air Flotation ("DAF"), Induced Gas Flotation ("IGF") and/or Froth Flotation Cell are common amongst many industries. DAFs are common in the wastewater treatment industry. IGFs are common in refineries, O&G Production Platforms and O&G gathering facilities/pads. Froth Flotation Cells are common in the metals and minerals industries. Likewise, Froth Flotation Cells are used extensively within the Oil Sands surface mining industry.

The present invention dramatically improves the performance of a flotation cell by adding a First ArcWhirl® for production of UV Light, oxidants such as Ozone and also for operation as a submerged thermal oxidizer. For example by adding an oxidant such as air or oxygen to the Fluid 110 inlet, this will help push hydrophobic contaminants such as hydrocarbons to the arc. The rotating gaseous mixture of hydrocarbons and oxidants around the arc will form a plasma and will be combusted within the Whirlpool formed by the rotating water. Hence, the name ArcWhirl®. The mixture comprising water, solids and hot combustion gases is then discharged directly into the Flotation Cell. Floats and Skims are collected in a Collection Header and discharged into a 3-way valve. The floats/skims may then be recycled back to the ArcWhirl® UV/Ozone Oxidizer or to a second ArcWhirl® Submerged Thermal Oxidizer. Once again as previously disclosed the plasma 108 from the second ArcWhirl® may be discharged into the thermal oxidizer of U.S. Pat. No. 8,074,439.

However, the floats/skims can be boosted in pressure with a booster pump and discharged into a Graphite Electrode Plug Valve. The Plug Valve assembly is unique to the ArcWhirl® Plasma Torch in that it allows for continuous feeding of electrodes. Thus, the plasma torch does not need to be shut down for replacing electrodes as is common with all other electrode type plasma torches. The electrode feeder consists of a feeder housing in which a fraction feeder grips a second electrode.

By adding a second electrode in addition to the anode nozzle, the arc is fully stabilized by not having to attach itself to the anode nozzle. All non-transferred arc plasma torches are limited in operation and power based upon the volume and velocity of the gas flowing through the nozzle. This is easily explained by blowing unto any flame in particular a candle. Blow too hard and the candle goes out. However, by arcing directly within the center of the vortex and between two electrodes, this allows for continuous operation with unlimited fluid/gas flows. Hence, the use of a pump volute will introduce the floats/skims into the ArcWhirl® 100 tangentially thus enhancing the vortex and WHIRL flow. It will be understood that the pump volute will be oriented in the same direction as the volute for the Fluid inlet 110.

Returning now to the traction feeder, it operates similar to any track type conveyor belt system. By pushing the tracks together to compress against the electrode the tracks move the electrode in and out based upon the direction of the tracks. As previously disclosed graphite electrodes are screwed together similar to drill pipe found throughout the oil and gas industry. Likewise, a coiled tubing rig can be used that includes a traction drive system that is common throughout the Coiled Tubing Drilling Industry. The metal tubing would be used as a sacrificial anode. This allows for the introduction of micronized iron. When ozone and/or hydrogen peroxide are combined with micronized iron, in particular ferric oxide, a reaction known occurs which forms a very powerful oxidant known as the hydroxyl radical. This reaction is commonly referred to as Fenton's Reagent.

The electrode can be electrically connected to the anode lead cable via common DC brushes used on DC motors and/or generators. The anode lead is coupled to the housing via a power feed thru. For safety measures, a motor for driving the traction drive system can be an air or pneumatically operated motor. The traction drive electrode feeder of the present invention can also be used for the cathode. However, it will be understood that the traction feeder must be electrically isolated form the feeder housing and should be electrically isolated from the electrode.

The ArcWhirl® Submerged Thermal Oxidizer may also include the traction drive electrode feeder of the present invention. The purpose of the second ArcWhirl® is to ensure that contaminants are removed below permit discharge levels or to within limits for recycling and reuse of the water. The second ArcWhirl® polishes the water prior to reuse.

Referring to FIG. 57—Dual ArcWhirl® Thickener—the ArcWhirl® is attached to a thickener commonly employed within the oil sands mining industry. Tailings water may still contain extraction solvents such as naptha and/or asphaltenes and must be removed from the tailings prior to discharge into the tailings pond. However, for reuse and/or recycling the water the solvent must be removed from the water. Thus, this complicates the solution, because the solvent will be left with either the water and/or tailings.

However, the present invention provides a unique system, method and apparatus for solving the water recycling and tailings drying problem. The oil sands tailings pond problem is well known and is a legacy problem that if not solved will make surface mining unsustainable for several reasons. First, the withdrawal of large volumes of water from the Athabasca River is not sustainable. Second, a portion of the valuable resource bitumen, stays with the tailings and is not recovered from the ponds.

Returning back to FIG. 57, by operating the ArcWhirl® as submerged combustors the solvent and bitumen remaining with the water and tailings can be combusted to heat the water. Likewise as previously disclosed, the air plasma operates at well over 4,000° F., thus allowing for melting and vitrifying the sand. By dumping the vitrified glass back into the water, this allows for recovering energy into melting the glass. Thus, the present invention produces hot water for recycling and an inert glass particle thus eliminating tailings ponds all together.

The present invention produces unexpected results in that petcoke can be fed into the ArcWhirl® with the oxidant. Since the density of petcoke will allow reporting to the plasma vortex, then this allows for submerged combustion. Likewise, another ideal and near perfect feed point for the petcoke is through the anode nozzle or through a hollow cathode. Why is this a great petcoke feed location? Simply put, the petcoke is calcined by the extreme temperature of the carbon arc and then it becomes electrically conductive. Thus, the petcoke becomes the consumable electrode within the ArcWhirl®. In addition, as the petcoke is steam reformed, then combusted it adds a tremendous amount of heat to the Fluid 110 entering into the ArcWhirl®. The present invention gives rise to a new and undisclosed use for petcoke as both a consumable electrode as well as providing heat for submerged combustion for treating water.

A feed mechanism for the petcoke is shown in FIG. 56. The petcoke is slurried fed by injection into the suction of the Booster Pump via recirculation through an eductor. The petcoke slurry is then fed directly into the anode nozzle.

Example 22—Sogd Arcwhirl® Upgrader for Heavy Oil

Referring now to FIG. 58—SOGD ArcWhirl® Upgrader—petcoke is produced by upgrading heavy oil. Thus, using petcoke to enhance upgrading by gasifying and/or steam reforming the petcoke by using it as the granular media 424 for the GDC 500 helps eliminate the problem of petcoke disposal. In addition, it provides the needed hydrogen for upgrading. Moreover, since both the GDC 500 and the ArcWhirl® Plasma Torch Upgrader 100 operate with DC power, the system, method and apparatus as disclosed in FIG. 19 is ideal for renewable energy regions. For example, solar irradiation in the Middle East and North Africa ("MENA") is sufficient to drive a plasma EOR and Well Head Upgrader for daytime operations while using petcoke for night time operations. The use of natural gas for EOR and upgrading is not perceived as sustainable. If the price of natural gas rises, the field will be shut in.

Referring to both FIG. 51 and FIG. 58 jointly, the EOR system of FIG. 51 can be operated on Solar and Wind power for recovering the oil, while the Upgrader as disclosed in FIG. 58 can upgrade the heavy oil at the well head or on the pad. In FIG. 51, a heavy oil booster pump would supply heavy oil to the Graphite Electrode Plug Valve assembly. Steam and Hydrogen produced in the GDC 500, using petcoke as the granular material 424, would be compressed then flowed in the ArcWhirl® Upgrader 100. An oxidant such as oxygen may be used to partially combust the heavy oil to reduce electrical power to the ArcWhirl® 100. The high pressure and very hot Upgraded Oil would flow into a cyclone flash separator. The gas oil would be separated from the heavy fractions and condensed as a synthetic oil.

Returning to FIG. 51, while also referring to the submerged combustion ArcWhirl® Apparatus of FIGS. 56 and 57 the utilization of Petcoke as the granular media 424 allows for a unique system, method and apparatus for EOR with steam, nitrogen and carbon dioxide. By adding air stoichiometrically into GDC 500, the compressor inlet via the 3-way valve, the hydrogen and carbon dioxide produced from the GDC 500 will be combusted in the ArcWhirl® 100. Thus, very little or no oxygen will be flow downhole into the injection well. The present inventions EOR system allows for injection of steam, hydrogen, nitrogen, carbon dioxide or a combination thereof by simply adding AIR or an oxidant into the system.

The present invention as disclosed in FIG. 58 was operated with woodchips and an auger feeder in lieu of a booster pump. A mixture of steam and hydrogen produced by the GDC 500 was flowed into the ArcWhirl® 100 forming a steam plasma in excess of 3,000° C. (5,400° F.). The results from the test clearly demonstrate that the system is not only capable of upgrading heavy oil, but also capable of producing a syngas suitable for Fischer Tropschs ("FT") Fuels. Thus, this allows for a micro-refinery to be installed at the wellhead or on the pad.

Heavy oil contains copious amounts of sulfur. The GDC 500 will produce caustic soda for scrubbing $H_2S$ and sulfur species produced in the ArcWhirl® Upgrader. However, the ideal electrolyte is weak sulfuric acid. Not being bound by theory, it is believed that the $H_2S$ will be converted to sulfur trioxide by operating several ArcWhirl® GDC 100 systems as shown in FIG. 14 as Hot Gas Cleanup systems in a glow discharge, electrolysis or arc mode.

Sulfuric acid is a good electrolyte for the glow discharge cell of the present invention because electrical conductivity does not decrease with increasing concentration. It is the only electrolyte that provides that benefit for use in the present invention. Consequently, the present invention also includes a system, method and apparatus for disposal of large sulfur piles from heavy oil upgrading by manufacturing sulfuric acid.

Wood has been carbonized with the Plasma ArcWhirl® Torch 100 using a plasma gas generated from the Glow Discharge Cell 500 configured as shown in FIG. 7. In addition, recent testing has shown that the gases exiting from the Plasma ArcWhirl® Torch 100 using baking soda within the Glow Discharge Cell 500 as the plasma gas produced a plasma G temperature of 2,900° C. (5,250° F.) as measured with an optical pyrometer. Likewise, sawdust was flowed directly into the steam/hydrogen plasma G and were formed producing syngas with a composition shown in the following Syngas Table:

| Component | Sample 1 Concentration % | Sample 2 Concentration % | Sample 3 Concentration % |
| --- | --- | --- | --- |
| $H_2$ | 38.702591 | 23.993687 | 31.965783 |
| $O_2$ | 7.603821 | 3.777238 | 5.671720 |
| $N_2$ | 5.730443 | 4.424545 | 4.803373 |
| $CH_4$ | 1.042843 | 3.770582 | 2.923456 |
| CO | 9.465042 | 14.879737 | 10.633168 |
| $CO_2$ | 30.015818 | 33.110154 | 32.207613 |
| $H_2$/CO | 4.08/1 | 1.61/1 | 3.01/1 |

The syngas produced from the present invention is now ready for lean combustion with the Plasma ArcWhirl® Turbine as disclosed in U.S. Pat. No. 8,074,439. Likewise, it will be understood that the syngas can be converted to liquid biofuels using a Fischer Tropschs catalyst or any suitable process and/or catalyst that will convert syngas to liquid fuels. On the other hand, the syngas may be mixed with the Oil and upgraded to meet pipeline quality oil standards.

Syngas and/or a hot gas and char are produced from the Plasma ArcWhirl® Torch's plasma plume G. The hot syngas and/or hot gas is used to rotate a turbine that is connected to a compressor, pump, generator and/or mixer. Referring to U.S. Pat. No. 8,074,439 which is incorporated in its entirety, the Plasma ArcWhirl® Turbine '439 may be operated in a lean combustion mode to simply drive a turbocharger for providing compression via the vapor compressor 5110 as disclosed in FIG. 51.

The System 700 as shown in FIG. 7 rated at 35 kw was operated at only 9 kw-hr for plasma steam reforming woodchips for conversion to Plasma BioChar™. By simply using the Plasma Plume of 100 to gasify woodchips, the carbon in the wood is sequestered as a usable form of BioChar™ for water treatment. The off-gas temperature was measured at over 900° C. and dumped directly into a recirculating water bath. The total process demonstrated that for every 1 kw of out of the wall power, 2 kw of energy could be recovered within the water as hot water.

The Biochar produced from the present invention was visually analyzed and determined to be a suitable BioChar™ for water treatment purposes. Consequently, as previously disclosed the Plasma BioChar™ could be used as the media for the glow discharge cell 400 or 500 as shown in FIGS. 4-9 and 51-58 of the present invention. BioChar™ makes and excellent water filtration aid and can be used in conjunction with the petcoke.

The foregoing description of the apparatus and methods of the invention in preferred and alternative embodiments and variations, and the foregoing examples of processes for which the invention may be beneficially used, are intended to be illustrative and not for purpose of limitation. The invention is susceptible to still further variations and alternative embodiments within the full scope of the invention, recited in the following claims.

What is claimed is:

1. A system for treating a mining byproduct comprising:
 a glow discharge cell having a side inlet to receive the mining byproduct, a top outlet and a bottom outlet;
 a first valve connected to the bottom outlet of the glow discharge cell;
 a plasma arc torch comprising:
  a cylindrical vessel having a first end and a second end,
  a first tangential inlet connected to or proximate to the first end,
  a second tangential outlet connected to or proximate to the second end,
  an electrode housing connected to the first end of the cylindrical vessel such that a first electrode is (a) aligned with a longitudinal axis of the cylindrical vessel, and (b) extends into the cylindrical vessel, and
  a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel;
 a second valve connected between to the top outlet of the glow discharge cell and the first tangential inlet of the plasma arc torch; and
 a third valve connected to the second tangential outlet of the plasma arc torch.

2. The system as recited in claim 1, further comprising:
 a mining byproduct source;
 a first pump having a first pump inlet connected to the mining byproduct source and the first valve, and a first pump outlet connected to the side inlet of the glow discharge cell.

3. The system as recited in claim 2, the mining byproduct source comprising an oil and water separator connected to a production well.

4. The system as recited in claim 2, the mining byproduct source comprising a source of a frack flowback water, a produced water, a wastewater or a tailings pond water.

5. The system as recited in claim 1, wherein:
 the glow discharge cell produces a gas mixture from the mining byproduct that exits through the top outlet;
 the gas mixture comprises a steam, hydrogen, syngas, non-condensable gases or a combination thereof; and
 the plasma arc torch produces a steam plasma that exits through the hollow electrode nozzle.

6. The system as recited in claim 1, the glow discharge cell comprising:
 an electrically conductive cylindrical vessel having a first end and a closed end, the top outlet disposed in the closed end;
 a hollow electrode aligned with a longitudinal axis of the cylindrical vessel and extending at least from the first end into the cylindrical vessel, wherein the hollow electrode has an inlet and an outlet comprising the bottom outlet;

a first insulator that seals the first end of the cylindrical vessel around the hollow electrode and maintains a substantially equidistant gap between the cylindrical vessel and the hollow electrode;

a second insulator that seals the second end of the cylindrical vessel around the hollow electrode and maintains the substantially equidistant gap between the cylindrical vessel and the hollow electrode; and a non-conductive granular material disposed within the substantially equidistant gap, wherein (a) the non-conductive granular material allows the mining byproduct to flow between the cylindrical vessel and the hollow electrode, and (b) the combination of the non-conductive granular material and the mining byproduct prevents electrical arcing between the cylindrical vessel and the hollow electrode during a electric glow discharge, wherein: (1) the electric glow discharge is created whenever (a) the glow discharge cell is connected to a DC electrical power supply source such that the cylindrical vessel is an anode and the hollow electrode is a cathode, and (b) the mining byproduct is introduced into the gap, and (2) the cathode heats up during the electric glow discharge.

7. The system as recited in claim 6, wherein the non-conductive granular material is petroleum coke, marbles, ceramic beads, molecular sieve media, sand, limestone, activated carbon, zeolite, zirconium, alumina, rock salt, nut shells or wood chips.

8. The system as recited in claim 1, further comprising a compressor connected between the second valve and the first tangential inlet of the plasma arc torch.

9. The system as recited in claim 8, further comprising a compressor bypass line connected between the second valve and the first tangential inlet of the plasma arc torch.

10. The system as recited in claim 9, wherein the glow discharge cell operates as a boiler when the compressor bypass line is used, an evaporator when the compressor is used, or a hybrid boiler-evaporator when both the compressor bypass line and the compressor are used.

11. The system as recited in claim 1, further comprising a cyclone separator having a tangential inlet connected to the third valve, an underflow, and an overflow connected to the compressor.

12. The system as recited in claim 11, further comprising a fourth valve connected to the third valve and the underflow of the cyclone separator.

13. The system as recited in claim 12, further comprising a second pump having a second pump inlet connected to the first valve, a second pump outlet connected to the fourth valve.

14. The system as recited in claim 13, further comprising a fifth valve connected between the second pump outlet and the fourth valve.

15. The system as recited in claim 14, wherein the fifth valve is further connected to a disposal well.

16. The system as recited in claim 1, further comprising an eductor connected to the hollow electrode nozzle of the plasma arc torch and the third valve.

17. The system as recited in claim 16, wherein the eductor is further connected to a steam or gas injection well.

* * * * *